(12) United States Patent
Steinmetz et al.

(10) Patent No.: US 8,006,046 B2
(45) Date of Patent: Aug. 23, 2011

(54) INTEGRATED-CIRCUIT IMPLEMENTATION OF A STORAGE-SHELF ROUTER AND A PATH CONTROLLER CARD FOR COMBINED USE IN HIGH-AVAILABILITY MASS-STORAGE-DEVICE SHELVES AND THAT SUPPORT VIRTUAL DISK FORMATTING

(75) Inventors: Joseph Harold Steinmetz, Roseville, CA (US); Murthy Kompella, Roseville, CA (US); Matthew Paul Wakeley, Roseville, CA (US)

(73) Assignee: Sierra Logic, Roseville, CA (US)

( * ) Notice: Subject to any disclaimer, the term of this patent is extended or adjusted under 35 U.S.C. 154(b) by 0 days.

(21) Appl. No.: 12/590,682

(22) Filed: Nov. 12, 2009

(65) Prior Publication Data

US 2010/0064104 A1 Mar. 11, 2010

Related U.S. Application Data

(63) Continuation of application No. 10/702,137, filed on Nov. 4, 2003, now Pat. No. 7,634,614, which is a continuation-in-part of application No. 10/602,529, filed on Jun. 23, 2003, now Pat. No. 7,353,321, which is a continuation-in-part of application No. 10/341,835, filed on Jan. 13, 2003, now abandoned.

(51) Int. Cl.
*G06F 12/00* (2006.01)

(52) U.S. Cl. .......................................... 711/154; 711/112
(58) Field of Classification Search .................. 711/112, 711/154
See application file for complete search history.

(56) References Cited

U.S. PATENT DOCUMENTS

| 5,802,584 | A | * | 9/1998 | Kool et al. | 711/154 |
| 6,191,712 | B1 | * | 2/2001 | Still | 341/95 |
| 7,127,798 | B1 | * | 10/2006 | Reger et al. | 29/603.03 |

* cited by examiner

*Primary Examiner* — Jared I Rutz
(74) *Attorney, Agent, or Firm* — Olympic Patent Works PLLC

(57) ABSTRACT

One embodiment of the present invention is a virtual disk formatting system includes a mass-storage device having physical sectors that each contains a data payload of a first data length and additional information, including one or more of a sector number, error-detection, and error-correction information and a virtual disk interface to the mass-storage device, implemented in an integrated circuit, that maps access operations, received from external entities by the virtual disk interface, directed to a virtual disk having virtual sectors containing a data payload of a second data length by contiguously mapping an array of virtual-sector data payloads to a contiguous array of physical-sector data payloads without introducing padding data into physical-sector data payloads or into virtual-sector data payloads to align the initial bytes of virtual sectors and physical sectors.

12 Claims, 77 Drawing Sheets

| | INITIATOR | | | TARGET |
|---|---|---|---|---|
| STATE | | | | STATE |
| BUS FREE 646 | | | | BUS FREE |
| ARBITRATION 648 | | ASSERT BSY AND DX ASSERT SEL AND I/O | | ARBITRATION |
| RESELECTION 650 | | ASSERT DX AND ATN DROP SEL | | RESELECTION |
| MESSAGE IN 652 | | IDENTIFY LUN ← 654 | | MESSAGE IN |
| MESSAGE IN | | QUEUE TAG MESSAGE SIMPLE QUEUE TAG / QUEUE TAG ← 656 | | MESSAGE IN |
| DATA IN (read) DATA OUT (write) 658 | ACK DATA REQ ○○○ → WRITE READ ← | | | DATA IN (read) DATA OUT (write) |
| OPTIONAL DISCONNECT/ RECONNECT 660 | MESSAGE IN | SAVE POINTERS ← | MESSAGE IN | |
| | MESSAGE IN | DISCONNECT ← | MESSAGE IN | |
| | BUS FREE | | BUS FREE | |
| | ARBITRATION | | ARBITRATION | |
| | RESELECTION | | RESELECTION | |
| | MESSAGE IN | ← IDENTIFY | MESSAGE IN | |
| | MESSAGE IN | QUEUE TAG MESSAGE ← | MESSAGE IN | |
| | ACK DATA REQ ○○○ → WRITE READ ← | | | DATA |
| MESSAGE IN 662 | | DISCONNECT ← | | MESSAGE IN |
| BUS FREE 664 | | DROP BSY | | BUS FREE |

Figure 6B

| INITIATOR | | TARGET | |
|---|---|---|---|
| STATE | | | STATE |
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | IDENTIFY<br>⬜ LUN  ~ 674<br>⟵ | | MESSAGE IN |
| MESSAGE IN | QUEUE TAG MESSAGE<br>SIMPLE QUEUE TAG \| QUEUE TAG ~ 676<br>⟵ | | MESSAGE IN |
| STATUS 678 | 00h ~ 680<br>⟵ | | STATUS |
| MESSAGE IN 682 | COMMAND COMPLETE<br>00h ~ 684<br>⟵ | | MESSAGE IN |
| BUS FREE 686 | | DROP BSY | BUS FREE |

Figure 6C

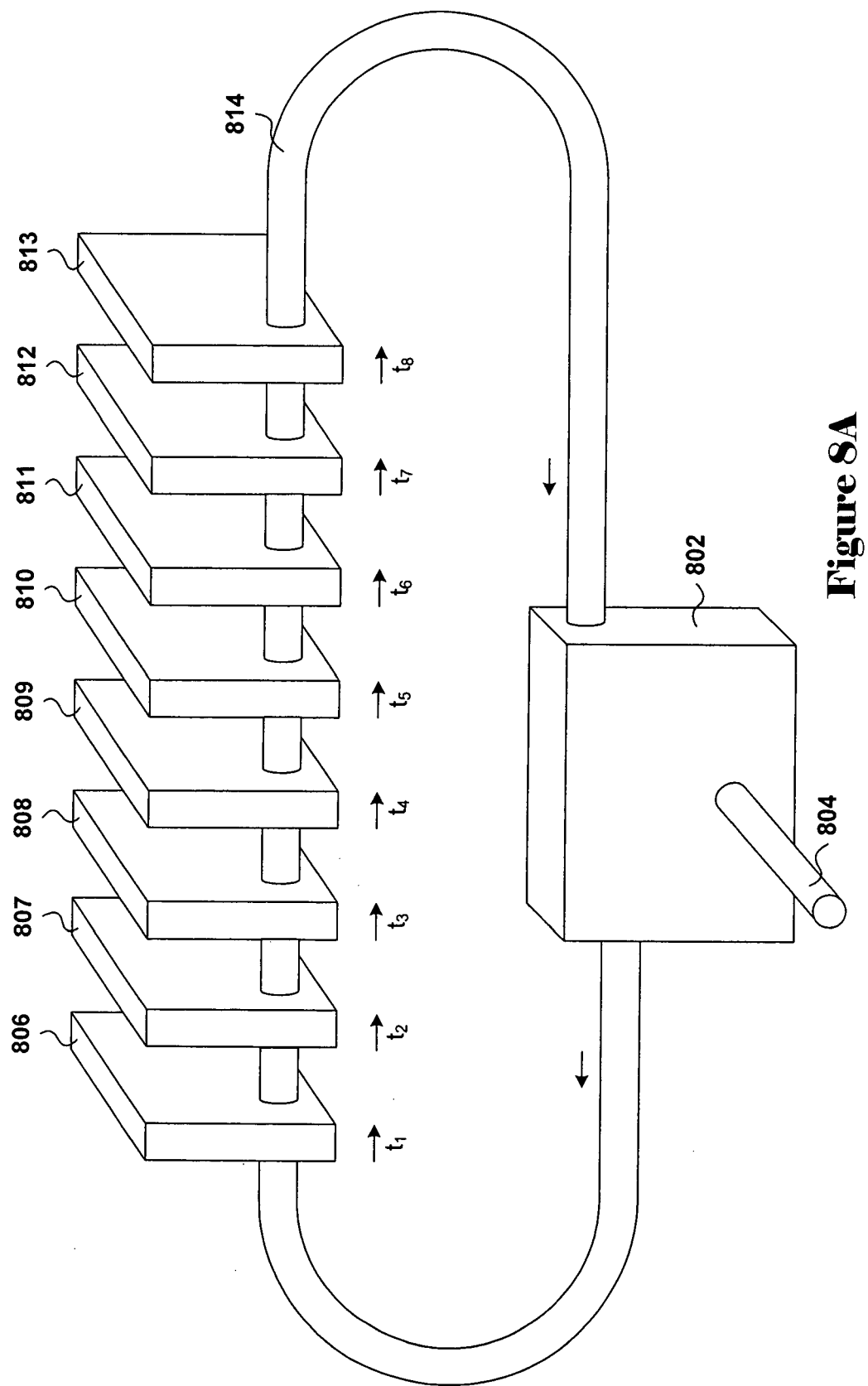

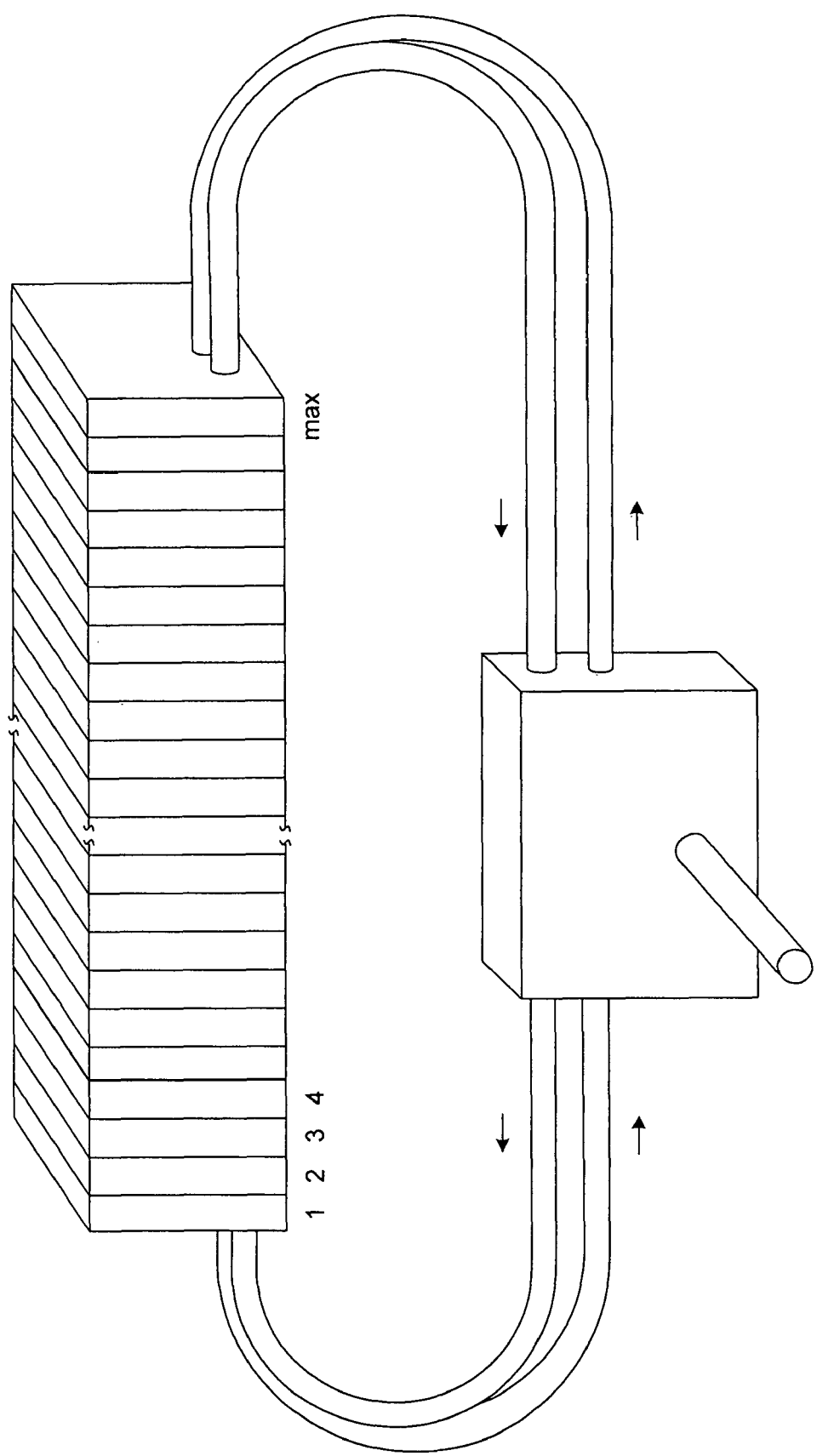

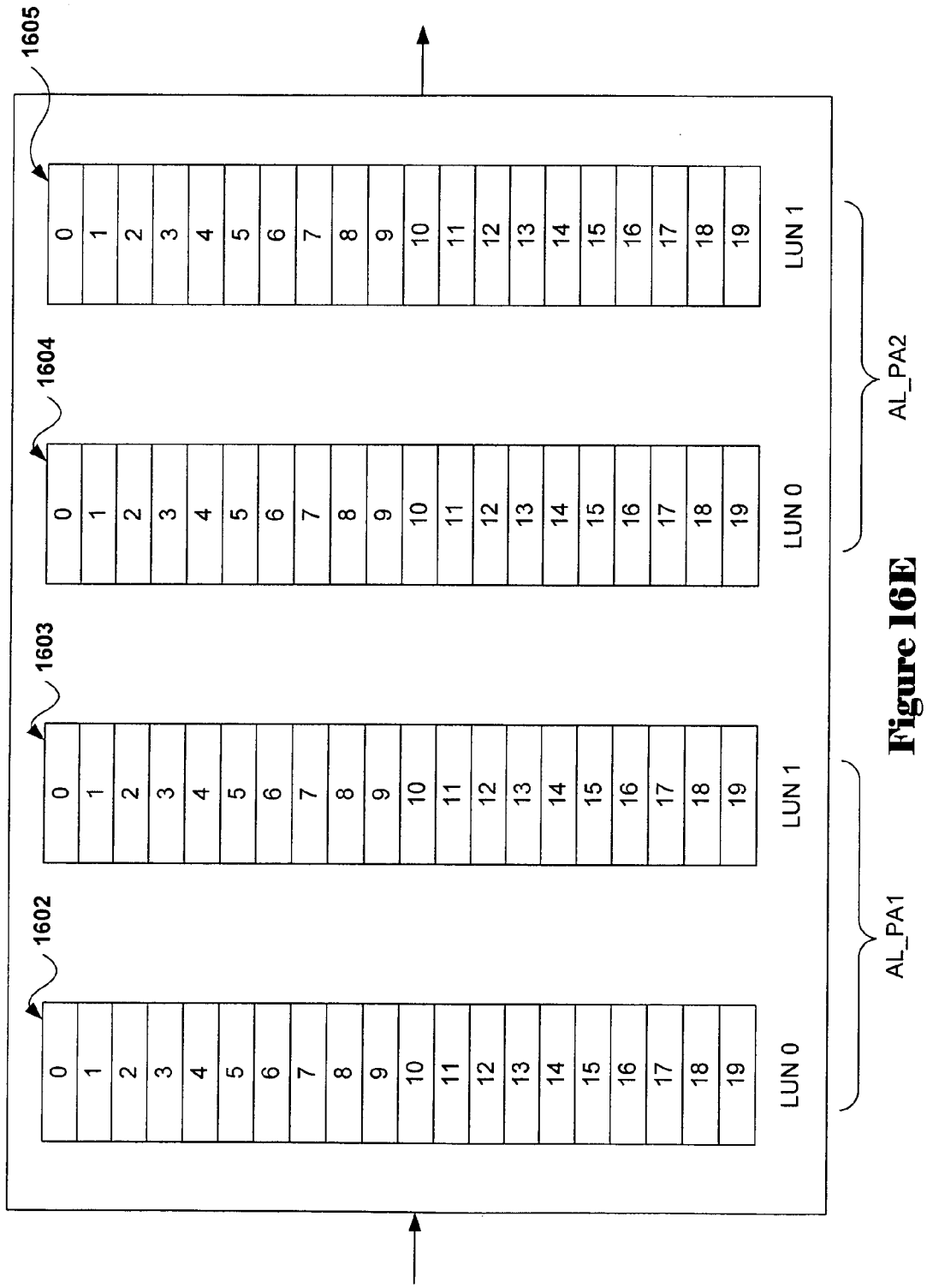

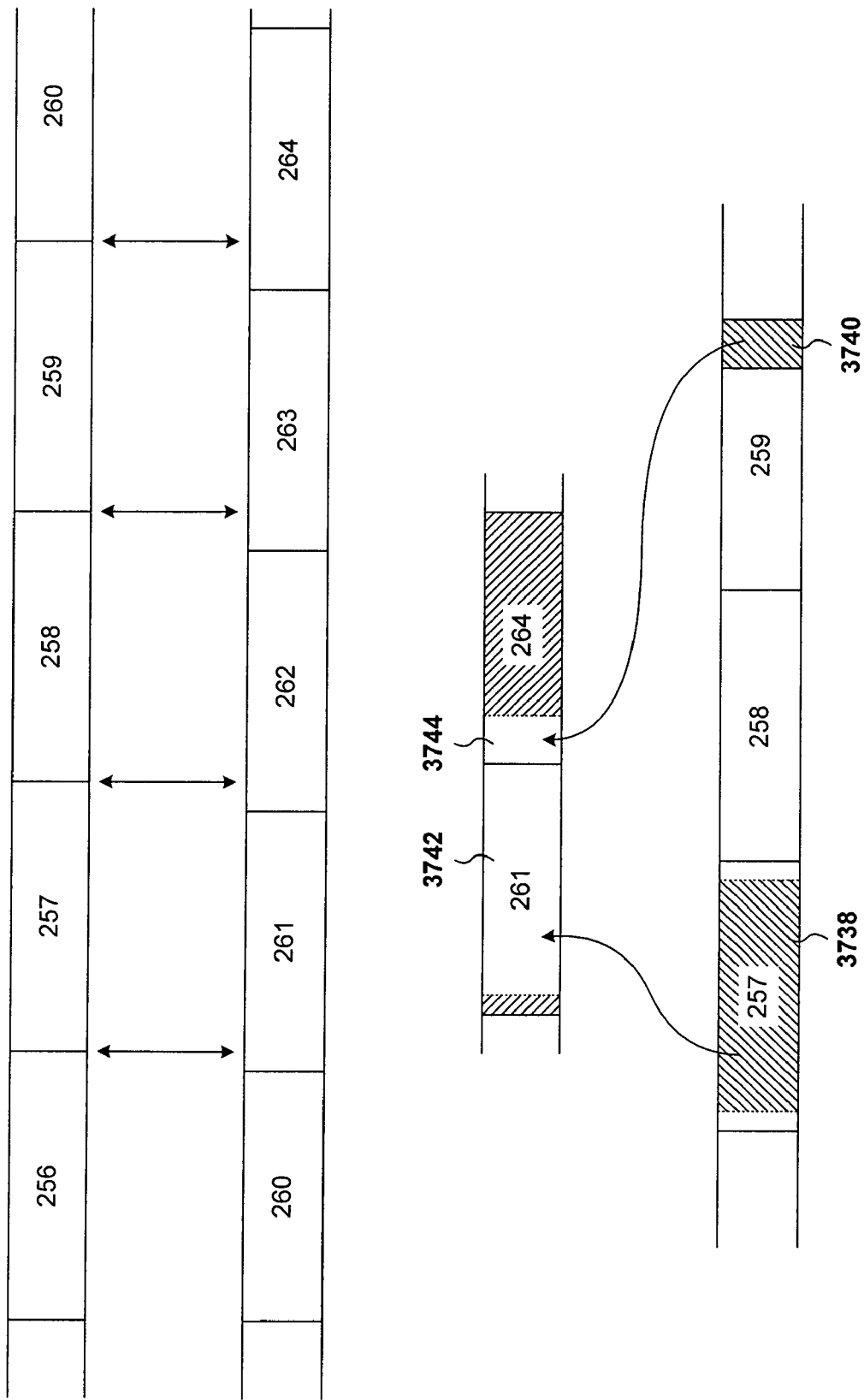

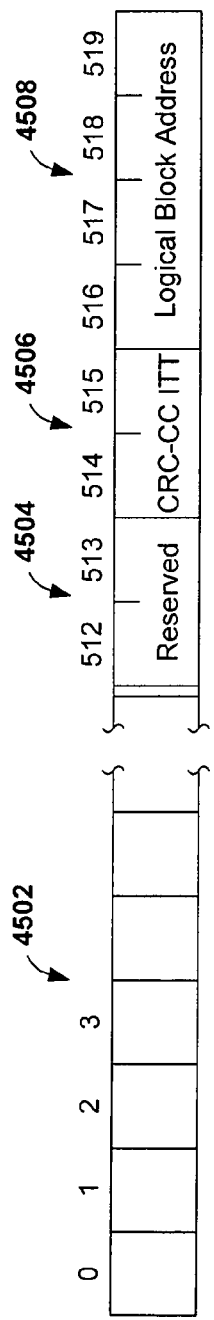
Figure 45
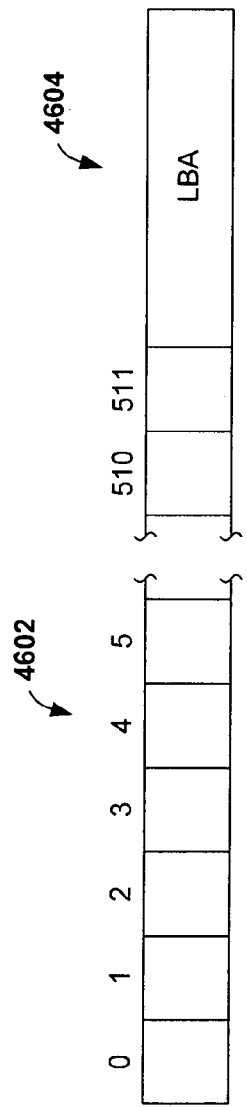
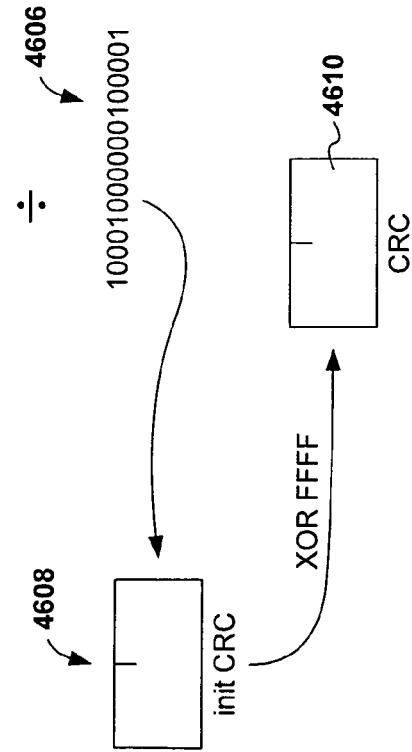
Figure 46

INTEGRATED-CIRCUIT IMPLEMENTATION OF A STORAGE-SHELF ROUTER AND A PATH CONTROLLER CARD FOR COMBINED USE IN HIGH-AVAILABILITY MASS-STORAGE-DEVICE SHELVES AND THAT SUPPORT VIRTUAL DISK FORMATTING

CROSS-REFERENCES TO RELATED APPLICATIONS

This application is continuation of application Ser. No. 10/702,137, filed Nov. 4, 2003, now U.S. Pat. No. 7,634,614, issued Dec. 15, 2009, which is a continuation-in-part of application Ser. No. 10/602,529, filed Jun. 23, 2003, now U.S. Pat. No. 7,353,321, Issued Apr. 1, 2008, which is a continuation-in-part of application Ser. No. 10/341,835, filed Jan. 13, 2003, now abandoned.

TECHNICAL FIELD

The present invention relates to disk arrays and other mass-storage-devices composed of numerous individual mass-storage-devices and, in particular, to an integrated-circuit implementation of a storage-shelf router and to path controller cards that provide a virtual disk formatting facility through which the high-availability storage-shelf router provides a virtual disk formatting interface to external controllers and computers in order to isolate disk-drive-specific formatting within a storage shelf and in order to increase error-detection capabilities of a storage shelf.

BACKGROUND OF THE INVENTION

The fibre channel ("FC") is an architecture and protocol for a data communication network that interconnects a number of different combinations of computers and peripheral devices. The FC supports a variety of upper-level protocols, including the small computer systems interface ("SCSI") protocol. A computer or peripheral device is linked to the network through an FC port and copper wires or optical fibers. An FC port includes a transceiver and an interface controller, and the computer peripheral device in which the FC port is contained is called a "host." The FC port exchanges data with the host via a local data bus, such as a peripheral computer interface ("PCI") bus. The interface controller conducts lower-level protocol exchanges between the fibre channel and the computer or peripheral device in which the FC port resides.

A popular paradigm for accessing remote data in computer networks is the client/server architecture. According to this architecture, a client computer sends a request to read or write data to a server computer. The server computer processes the request by checking that the client server has authorization and permission to read or write the data, by mapping the requested read or write operation to a particular mass storage device, and by serving as an intermediary in the transfer of data from the client computer to the mass storage device, in case of a write operation, or from the mass storage device to the client, in case of a read operation.

In common, currently-available and previously-available communication network architectures, the server computer communicates with the client computer through a local area network ("LAN") and the server computer communicates with a number of mass storage devices over a local bus, such as a SCSI bus. In such systems, the server is required to store and forward the data transferred as a result of the read or write operation because the server represents a bridge between two dissimilar communications media. With the advent of the FC, client computers, server computers, and mass storage devices may all be symmetrically interconnected by a single communications medium. The traditional client/server architecture is commonly ported to the FC using the same type of client/server protocols as are used in the LAN and SCSI networks discussed above.

SCSI-bus-compatible mass-storage devices, including high capacity disk drives, are widely available, and widely used, particularly in mid-sized and large-sized computer systems, and many FC-based systems employ FC-compatible disk drives, each including one or more FC ports and logic needed for the disk drives to function as FC responders. In smaller systems, including personal computers ("PCs"), a different family of disk drives, referred to as Integrated Drive Electronics ("IDE") or Advanced Technology Attachment ("ATA") disk drives is widely employed. A serial ATA disk ("SATA") generally interconnects with a system via an Industry Standard Architecture ("ISA") bus.

The present invention is related to FC, SCSI, and IDE/ATA technologies. Each will be discussed, in turn, in three separate subsections, below. Those familiar with any or all of these technologies may wish to skip ahead to the final subsection of this section, describing FC-based disk arrays, and to the Summary of the Invention section that immediately follows that subsection.

Fibre Channel

The Fibre Channel ("FC") is defined by, and described in, a number of ANSI Standards documents, including the standards documents listed below in Table 1:

TABLE 1

| Acronym | Title | Publication |
|---|---|---|
| 10 Bit Interface TR | 10-bit Interface Technical Report | X3.TR-18: 1997 |
| 10GFC | Fibre Channel - 10 Gigabit | Project 1413-D |
| AE-2 Study | AE-2 Study Group | Internal Study |
| FC-10KCR | Fibre Channel - 10 km Cost-Reduced Physical variant | NCITS 326: 1999 |
| FC-AE | Fibre Channel Avionics Environment | INCITS TR-31-2002 |
| FC-AL | FC Arbitrated Loop | ANSI X3.272: 1996 |
| FC-AL-2 | Fibre Channel $2^{nd}$ Generation Arbitrated Loop | NCITS 332: 1999 |
| FC-AV | Fibre Channel - Audio-Visual | ANSI/INCITS 356: 2001 |
| FC-BB | Fibre Channel - Backbone | ANSI NCITS 342 |
| FC-BB-2 | Fibre Channel - Backbone - 2 | Project 1466-D |
| FC-CU | Fibre Channel Copper Interface Implementation Practice Guide | Project 1135-DT |

TABLE 1-continued

| Acronym | Title | Publication |
|---|---|---|
| FC-DA | Fibre Channel - Device Attach | Project 1513-DT |
| FC-FG | FC Fabric Generic Requirements | ANSI X3.289: 1996 |
| FC-FLA | Fibre Channel - Fabric Loop Attachment | NCITS TR-20: 1998 |
| FC-FP | FC - Mapping to HIPPI-FP | ANSI X3.254: 1994 |
| FC-FS | Fibre Channel Framing and Signaling Interface | Project 1331-D |
| FC-GS | FC Generic Services | ANSI X3.288: 1996 |
| FC-GS-2 | Fibre Channel $2^{nd}$ Generation Generic Services | ANSI NCITS 288 |
| FC-GS-3 | Fibre Channel - Generic Services 3 | NCITS 348-2000 |
| FC-GS-4 | Fibre Channel Generic Services 4 | Project 1505-D |
| FC-HBA | Fibre Channel - HBA API | Project 1568-D |
| FC-HSPI | Fibre Channel High Speed Parallel Interface (FC-HSPI) | NCITS TR-26: 2000 |
| FC-LE | FC Link Encapsulation | ANSI X3.287: 1996 |
| FC-MI | Fibre Channel- Methodologies for Interconnects Technical Report | INCITS TR-30-2002 |
| FC-MI-2 | Fibre Channel - Methodologies for Interconnects - 2 | Project 1599-DT |
| FC-MJS | Methodology of Jitter Specification | NCITS TR-25: 1999 |
| FC-MJSQ | Fibre Channel - Methodologies for Jitter and Signal Quality Specification | Project 1316-DT |
| FC-PH | Fibre Channel Physical and Signaling Interface | ANSI X3.230: 1994 |
| FC-PH-2 | Fibre Channel $2^{nd}$ Generation Physical Interface | ANSI X3.297: 1997 |
| FC-PH-3 | Fibre Channel $3^{rd}$ Generation Physical Interface | ANSI X3.303: 1998 |
| FC-PH: AM 1 | FC-PH Amendment #1 | ANSI X3.230: 1994/ AM1: 1996 |
| FC-PH: DAM 2 | FC-PH Amendment #2 | ANSI X3.230/AM2-1999 |
| FC-PI | Fibre Channel - Physical Interface | Project 1306-D |
| FC-PI-2 | Fibre Channel - Physical Interfaces - 2 | Project |
| FC-PLDA | Fibre Channel Private Loop Direct Attach | NCITS TR-19: 1998 |
| FC-SB | FC Mapping of Single Byte Command Code Sets | ANSI X3.271: 1996 |
| FC-SB-2 | Fibre Channel - SB 2 | NCITS 349-2000 |
| FC-SB-3 | Fibre Channel - Single Byte Command Set - 3 | Project 1569-D |
| FC-SP | Fibre Channel - Security Protocols | Project 1570-D |
| FC-SW | FC Switch Fabric and Switch Control Requirements | NCITS 321: 1998 |
| FC-SW-2 | Fibre Channel - Switch Fabric - 2 | ANSI/NCITS 355-2001 |
| FC-SW-3 | Fibre Channel - Switch Fabric - 3 | Project 1508-D |
| FC-SWAPI | Fibre Channel Switch Application Programming Interface | Project 1600-D |
| FC-Tape | Fibre Channel - Tape Technical Report | NCITS TR-24: 1999 |
| FC-VI | Fibre Channel - Virtual Interface Architecture Mapping | ANSI/NCITS 357-2001 |
| FCSM | Fibre Channel Signal Modeling | Project 1507-DT |
| MIB-FA | Fibre Channel Management Information Base | Project 1571-DT |
| SM-LL-V | FC - Very Long Length Optical Interface | ANSI/NCITS 339-2000 |

The documents listed in Table 1, and additional information about the fibre channel, may be found at the World Wide Web pages having the following addresses: "http://www.t11.org/index.htm" and "http://www.fibrechannel.com."

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node, and that implements, in hardware and firmware, the lower levels of the FC protocol. The FC node generally exchanges data and control information with the FC port using shared data structures in shared memory and using control registers in the FC port. The FC port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

The FC architecture and protocol support three different types of interconnection topologies, shown in FIGS. 1A-1C. FIG. 1A shows the simplest of the three interconnected topologies, called the "point-to-point topology." In the pointto-point topology shown in FIG. 1A, a first node 101 is directly connected to a second node 102 by directly coupling the transmitter 103 of the FC port 104 of the first node 101 to the receiver 105 of the FC port 106 of the second node 102, and by directly connecting the transmitter 107 of the FC port 106 of the second node 102 to the receiver 108 of the FC port 104 of the first node 101. The ports 104 and 106 used in the point-to-point topology are called N_Ports.

FIG. 1B shows a somewhat more complex topology called the "FC arbitrated loop topology." FIG. 1B shows four nodes 110-113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional non-participating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119-122 are connected. The N_Ports 123-126 within the FC nodes 119-122 are connected to F_Ports 127-130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-bit characters or bytes. Certain FC primitives are employed to carry control information exchanged between FC ports. The next level of data organization, a fundamental level with regard to the FC protocol, is a frame. Seven frames 202-208 are shown in FIG. 2. A frame may be composed of between 36 and 2,148 bytes, including delimiters, headers, and between 0 and 2048 bytes of data. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202-205. The second sequence 212 is composed of frames five through seven 206-208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202-208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION ID 316, is a 24-bit FC address indicating the destination FC port for the frame. The source identifier ("S_ID"), or SOURCE_ID 318, is a 24-bit address that indicates the FC port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326-329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format. The FCP_DATA format is used for transferring the actual data that is being read from, or written to, a SCSI data storage device as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-RQM drives, and tape drives 424-426 are connected to the SCSI bus 416. The SCSI bus is interconnected with the PCI bus 412 via a SCSI-bus adapter 430. The SCSI-bus adapter 430 includes a processor component, such as a processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424-426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513-

515 and 516-517 to be attached to a single SCSI bus. In FIG. 5, SCSI devices 513-515 are attached to SCSI bus 518 controlled by SCSI-bus adapter 506, and SCSI devices 516-517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522-524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513-515 and 516-517 receive the I/O commands from the SCSI bus. The target devices 513-515 and 516-517 then implement the commands by interfacing with one or more logical devices that they control to either read data from the logical devices and return the data through the SCSI bus to the initiator or to write data received through the SCSI bus from the initiator to the logical devices. Finally, the target devices 513-515 and 516-517 respond to the initiator through the SCSI bus with status messages that indicate the success or failure of implementation of the commands.

FIGS. 6A-6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B-6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424-426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424-426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued; as well as providing the target with a queue tag 627. The queue tag is a byte that identifies the I/O command. A SCSI-bus adapter can therefore concurrently manage 256 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A-6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

FIGS. 7A and 7B illustrate a mapping of FCP sequences exchanged between an initiator and target and the SCSI bus phases and states described in FIGS. 6A-6C. In FIGS. 7A-7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND 702 data payload through the FC to a target SCSI adapter. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device re-arbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A-B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722-725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

IDE/ATA Disk Drives

IDE/ATA drives were developed in order to integrate a disk logic controller and a hard disk together as a single module. IDE/ATA drives were specifically designed for easy integration, via an ISA bus, into PC systems. Originally, IDE/ATA drives were designed with parallel, 16-bit interconnections to permit the exchange of two bytes of data between the IDE/ATA drives and the system at discrete intervals of time controlled by a system or bus clock. Unfortunately, the parallel bus interconnection is reaching a performance limit, with current data rates of 100 to 133 MB/sec., and the 40 or 80-pin ribbon cable connection is no longer compatible with the cramped, high-density packaging of internal components within modern computer systems. For these reasons, a SATA ("SATA") standard has been developed, and SATA disk drives are currently being produced, in which the 80-pin ribbon cable connection is replaced with a four-conductor serial cable. The initial data rate for SATA disks is 150 MB/sec, expected to soon increase to 300 MB/sec and then to 600 MB/sec. Standard 8B/10B encoding is used for serializing the data for transfer between the ATA serial disk drive and a peripheral component interconnect ("PCI")-based controller. Ultimately, south-bridge controllers that integrate various I/O controllers, that provide interfaces to peripheral devices and buses, and that transfer data to and from a second bridge that links one or more CPUs and memory, may be designed to fully incorporate SATA technology to offer direct interconnection of SATA devices.

The ATA interface, in particular the ATA-5 and ATA-6 standard interfaces, support a variety of commands that allow an external processor or logic controller to direct the logic controller within the ATA disk drive to carry out basic data transfer commands, seeking, cache management, and other management and diagnostics-related tasks. Table 2, below, relates a protocol number, such as protocol "1," with a general type of ATA command. The types of commands include programmed input/output ("PIO"), non-data commands, and direct-memory-access ("DMA") commands.

TABLE 2

| protocol | type of command |
| --- | --- |
| 1 | PIO DATA-IN COMMAND |
| 2 | PIO DATA OUT COMMAND |
| 3 | NON-DATA COMMAND |
| 4 | DMA COMMAND |
| 5 | DMA COMMAND |

Table 3, provided below, lists a number of ATA commands, along with a corresponding protocol indicating the command type to which the command belongs, as defined above in Table 2:

TABLE 3

| protocol | ATA Command |
| --- | --- |
| 3 | CHECK POWER MODE |
| 2 | DOWNLOAD MICROCODE |
| 3 | EXECUTIVE DEVICE DIAGNOSTICS |
| 3 | FLUSH CACHE |
| 3 | FLUSH CACHE EXTENDED |
| 1 | IDENTIFY DEVICE |
| 3 | IDLE IMMEDIATE |
| 4 | READ DMA |
| 4 | READ DMA EXTENDED |
| 3 | READ VERIFY SECTORS |
| 3 | READ VERIFY SECTORS EXTENDED |
| 3 | SEEK |
| 3 | SET FEATURES |
| 3 | SLEEP |

TABLE 3-continued

| protocol | ATA Command |
|---|---|
| 4 | WRITE DMA |
| 4 | WRITE DMA EXTENDED |

The CHECK POWER MODE command allows a host to determine the current power mode of an ATA device. The DOWNLOAD MICROCODE command allows a host to alter an ATA device's microcode. The EXECUTIVE DEVICE DIAGNOSTICS command allows a host to invoke diagnostic tests implemented by an ATA device. The FLUSH CACHE command allows a host to request that an ATA device flush its write cache. Two versions of this command are included in the table, with the extended version representing a 48-bit addressing feature available on devices supporting the ATA-6 standard interface. Additional extended versions of commands shown in Table 3 will not be discussed separately below. The IDENTIFY DEVICE command allows a host to query an ATA device for parameter information, including the number of logical sectors, cylinders, and heads provided by the device, the commands supported by the device, features supported by the device, and other such parameters. The READ DMA command allows a host to read data from the device using a DMA data transfer protocol, generally much more efficient for large amounts of data. The READ VERIFY SECTORS command allows a host to direct an ATA device to read a portion of the data stored within the host and determine whether or not any error conditions occur without transferring the data read from the device to the host. The SEEK command allows a host to inform an ATA device that the host may access one or more particular logical blocks in a subsequent command, to allow the device to optimize head positioning in order to execute the subsequent access to the specified one or more logical blocks. The SET FEATURES command allows the host to modify various parameters within an ATA device to turn on and off features provided by the device. The SLEEP command allows a host to direct an ATA device to spin down and wait for a subsequent reset command. The WRITE DMA command allows a host to write data to an ATA device using DMA data transfer that is generally more efficient for larger amounts of data.

FC-Based Disk Arrays

In mid-sized and large computer systems, data storage requirements generally far exceed the capacities of embedded mass storage devices, including embedded disk drives. In such systems, it has become common to employ high-end, large-capacity devices, such as redundant arrays of inexpensive disks ("RAID"), that include internal processors that are linked to mid-sized and high-end computer systems through local area networks, fibre-optic networks, and other high-bandwidth communications media. To facilitate design and manufacture of disk arrays, disk manufacturers provide disk drives that include FC ports in order to directly interconnect disk drives within a disk array to a disk-array controller. Generally, the FC arbitrated loop topology is employed within disk arrays to interconnect individual FC disk drives to the disk-array controller.

FIGS. 8A-D illustrate several problems related to the use of FC disks in disk arrays. FIG. 8A shows a relatively abstract rendering of the internal components of a disk array. FIGS. 8B-D and FIG. 9, discussed below, employ the same illustration conventions. In FIG. 8A, the disk-array controller 802 is interconnected to remote computer systems and other remote entities via a high-bandwidth communications medium 804. The disk-array controller includes one or more processors, one or more generally relatively large electronic memories, and other such components that allow disk-array-control firmware and software to be stored and executed within the disk-array controller in order to provide, to remote computer systems, a relatively high level, logical-unit and logical-block interface to the disk drives within the disk array. As shown in FIG. 8A, the disk-array includes the disk-array controller 802 and a number of FC disk drives 806-813. The FC disk drives are interconnected with the disk-array controller 802 via an FC arbitrated loop 814. An FC-based disk array, such as that abstractly illustrated in FIG. 8A, is relatively easily designed and manufactured, using standard and readily available FC disks as a storage medium, an FC arbitrated loop for interconnection, and standard FC controllers within the disk-array controller. Because the FC is a high-speed, serial communications medium, the FC arbitrated loop 814 provides a generous bandwidth for data transfer between the FC disks 806-813 and the disk-array controller 802.

However, at each FC node within the FC arbitrated loop, such as an FC disk drive, there is a significant node delay as data is processed and transferred through the FC ports of the node. Node delays are illustrated in FIG. 8A with short arrows labeled with subscripted, lower case letters "t." The node delays are cumulative within an FC arbitrated loop, leading to significant accumulated node delays proportional to the number of FC nodes within the FC arbitrated loop.

A second problem with the disk-array implementation illustrated in FIG. 8A is that the FC arbitrated loop represents a potential single point of failure. Generally, FC disks may be augmented with port bypass circuits to isolate nonfunctional FC disks from the arbitrated loop, but there are a number of different modes of failure that cannot be prevented by port bypass circuits alone.

A third problem arises when an FC port that links a node to the arbitrated loop fails. In such cases, complex, and unreliable techniques must be employed to try to identify and isolate the failed FC port. In general, a failed FC port disrupts the loop topology, and the disk-array controller must sequentially attempt to activate port bypass circuits to bypass each node, in order to isolate the failed node. However, this technique may fail to identify the failed node, under various failure modes. Thus, node failure is a serious problem with arbitrated loop topologies.

FIG. 8B illustrates a solution to the potential single-point failure problem. As shown in FIG. 8B, the disk-array controller 802 is interconnected with the FC disks 806-813 via two separate, independent FC arbitrated loops 814 and 816. Using two separate FC arbitrated loops largely removes the single-point failure problem. However, the node-delay problem is not ameliorated by using two FC arbitrated loops. Moreover, because each FC disk must include two separate FC ports, the individual FC disks are rather more complex and more expensive. Finally, the failed port identification and isolation problem is only partly addressed, because, in the case of a node failure that disrupts one of the two arbitrated loops, the other arbitrated loop continues to function, but there is no longer a two-fold redundancy in communications media. In order to restore the two-fold redundancy, the disk-array controller still needs to attempt to identify and isolate the failed node, and, as noted above, many failure modes are resistant to identification and isolation.

FIG. 8C illustrates yet an additional problem with the FC-based implementation of disk arrays. In general, greater and greater amounts of available storage space are required from disk arrays, resulting in the addition of a greater number of individual FC disks. However, the inclusion of additional disks exacerbates the node-delay problem, and, as discussed above, a single FC arbitrated loop may include up to a maximum of only 127 nodes. In order to solve this maximum-node problem, additional independent FC arbitrated loops are added to the disk array. FIG. 8D illustrates a higher capacity disk array in which a first set of FC disks 818 is interconnected with the FC controller 802 via two separate FC arbitrated loops 814 and 816, and a second set of FC disks 820 is interconnected with the disk-array controller 802 via a second pair of FC arbitrated loops 822 and 824. Each of the sets of FC disks 818 and 820 are referred to as shelves, and are generally included in separate enclosures with redundant power systems, redundant control paths, and other features that contribute to the overall fault tolerance and high-availability of the disk array. However, the addition of each shelf increases the number of FC controllers and FC ports within the disk-array controller 802. Note also that each separate FC arbitrated loop experiences cumulative node delay of the FC nodes included within the FC arbitrated loop. Designers, manufacturers, and users of disk arrays have thus recognized the need for a more flexible, more cost effective, and more efficient method for interconnecting disk-array controllers and FC disks within FC-based disk arrays. In addition, designers, manufacturers, and users of disk arrays have recognized the need for a method for interconnecting disk-array controllers and FC disks within FC-based disk arrays that allows for easier and more reliable identification of port failures and other communications and component failures.

Disk-Drive-Specific Formatting and Disk-Drive Error Detection

Disk-drive technologies and implementations, as with other types of mass storage devices, continues to evolve. Disk-array manufactures wish to use the most cost-effective and technologically advanced disk drives in disk arrays. However, disk-array controllers may be implemented to interface to only one or a few currently available disk-drive interfaces, and incorporating new disk drives with new interfaces, including new formatting conventions, may involve costly and time-consuming re-engineering of disk-array controllers.

Although currently available disk drives generally provide rudimentary error checking and error correction, using parity check codes and other techniques. However, this level of error checking provided by current disk drives may fall short of the error-detection requirements for disk-array storage devices used in commercial applications. Although additional error detection can be programmed into disk-array controllers, disk-array-controller-based techniques may be costly, requiring re-implementation of complex disk-array controller software and firmware, and may also be inefficient, involving increased data transfer between disk-array controllers and storage devices. Moreover, the disk-array controller error-detection techniques would require a great deal of disk-drive specific logic.

Designers, manufacturers, and users of disk arrays and other mass-storage devices have therefore recognized the need for cost-effective and efficient methods for incorporating new types of disk drives within disk arrays and other mass storage devices, and for increasing error-detection capabilities of disk arrays without needing to re-implement disk-array controllers

SUMMARY OF THE INVENTION

One embodiment of the present invention is an integrated circuit implementing a storage-shelf router, used in combination with path controller cards and optionally with other storage-shelf routers to interconnect SATA disks within a storage shelf or disk array to a high-bandwidth communications medium, such as an FC arbitrated loop. A storage shelf employing a single storage-shelf router that represents one embodiment of the present invention does not provide the component redundancy required of a high-availability device. When two, four, six, or eight or more storage-shelf routers are used within a storage shelf, and the interconnections between the storage-shelf routers, disk drives, and external communications media are properly designed and configured, the resulting storage shelf constitutes a discrete, highly-available component that may be included in a disk array or in other types of electronic devices.

In various embodiments, the present invention provides virtual disk formatting by a storage shelf router and the storage shelf in which the storage-shelf is included, to external computing entities, such as disk-array controllers and host computers. Virtual disk formatting serves several purposes. First, disk-array controllers may expect one or a few specific disk formatting conventions in the disks included in storage shelves managed by the disk-array controller. By providing virtual disk formatting, a storage-shelf router can provide to a disk-array controller, and other external computing entities, the disk-formatting convention expected by the disk-array controller, even though disk drives and other storage systems that do not conform to the expected formatting conventions may be included in the storage shelf and interconnected to a disk-array controller and other external processing entities via an interface provided by a storage-shelf router. Thus, virtual disk formatting isolates disk-drive-specific formatting conventions and other characteristics from the external computing entities, such as disk-array controllers. Virtual disk formatting, in addition, allows a storage-shelf router to format a disk drive differently from the disk formatting expected by external computing entities, so that the storage-shelf router can transparently include additional information into disk sectors, such as additional error detection and error-correction information. Thus, virtual disk formatting allows a storage-shelf router to isolate storage-shelf-router-specific formatting conventions within a storage shelf, preserving the expected disk-formatting interface exported to external computing entities, such as disk-array controllers and host computers.

BRIEF DESCRIPTION OF THE DRAWINGS

FIGS. 6A-6C illustrate the SCSI protocol involved in the initiation and implementation of read and write I/O operations.

FIGS. 8A-D illustrate several problems related to the use of FC disks in disk arrays.

FIGS. 16A-G illustrate a number of different logical interfaces provided by a high-availability storage shelf incorporating one or more storage-shelf routers that represent one embodiment of the present invention.

FIGS. 37A-D illustrate a storage-shelf virtual-disk-formatting implementation for handling a 520-byte WRITE access by an external entity, such as a disk-array controller, to a storage-shelf-internal, 512-byte-based disk drive.

FIG. 41 illustrates calculated values needed to carry out the virtual formatting method and system representing one embodiment of the present invention.

FIG. 45 illustrates the content of an LRC field included by a storage-shelf router in each first-level virtual 520-byte sector in the two-virtual-level embodiment illustrated in FIG. 41.

FIG. 46 illustrates computation of a CRC value.

DETAILED DESCRIPTION OF THE INVENTION

One embodiment of the present invention is an integrated circuit implementation of a storage-shelf router that may be employed, alone or in combination, within a storage shelf of a disk array or other large, separately controlled mass storage device, to interconnect disk drives within the storage shelf to a high-bandwidth communications medium that, in turn, interconnects the storage shelf with a disk-array controller, or controller of a similar high capacity mass storage device. The described embodiment also includes path controller cards that provide redundant communications links between disk drives and one or more storage-shelf routers. As discussed above, with reference to FIGS. 8A-D, disk arrays may currently employ FC-compatible disk drives within storage shelves, each FC-compatible disk drive acting as an FC node on one or two FC arbitrated loops, or other FC fabric topologies, that interconnect the FC compatible disk drives with a disk-array controller. By contrast, the storage-shelf router that represents, in part, one embodiment of the present invention serves as an intermediary communications hub, directly connected by point-to-point serial communications media to each disk drive within the storage shelf, and interconnected with the disk-array controller via one or more high-bandwidth communications media, such as fibre channel arbitrated loops.

Overview

Figure 8B:
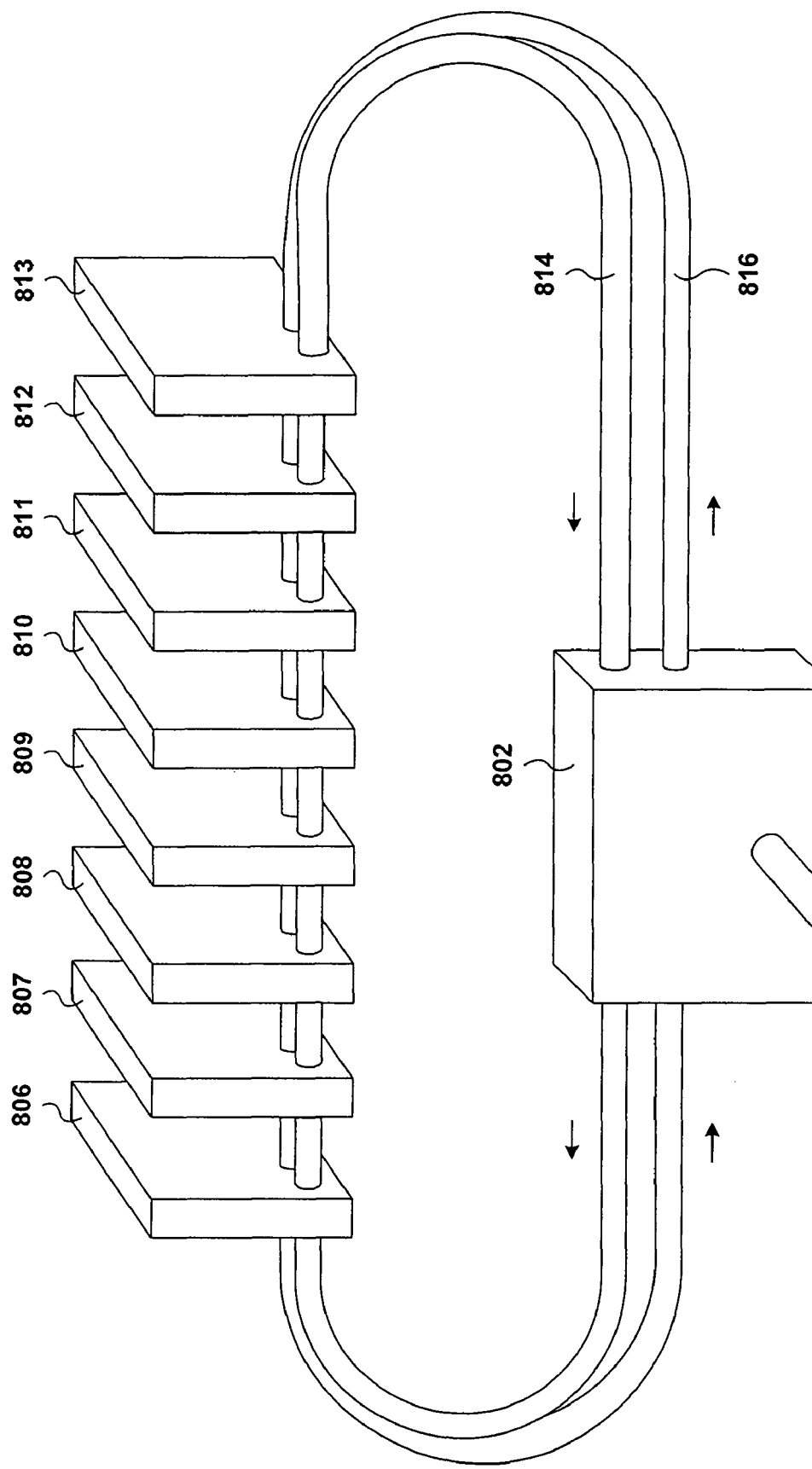
Figure 8D:
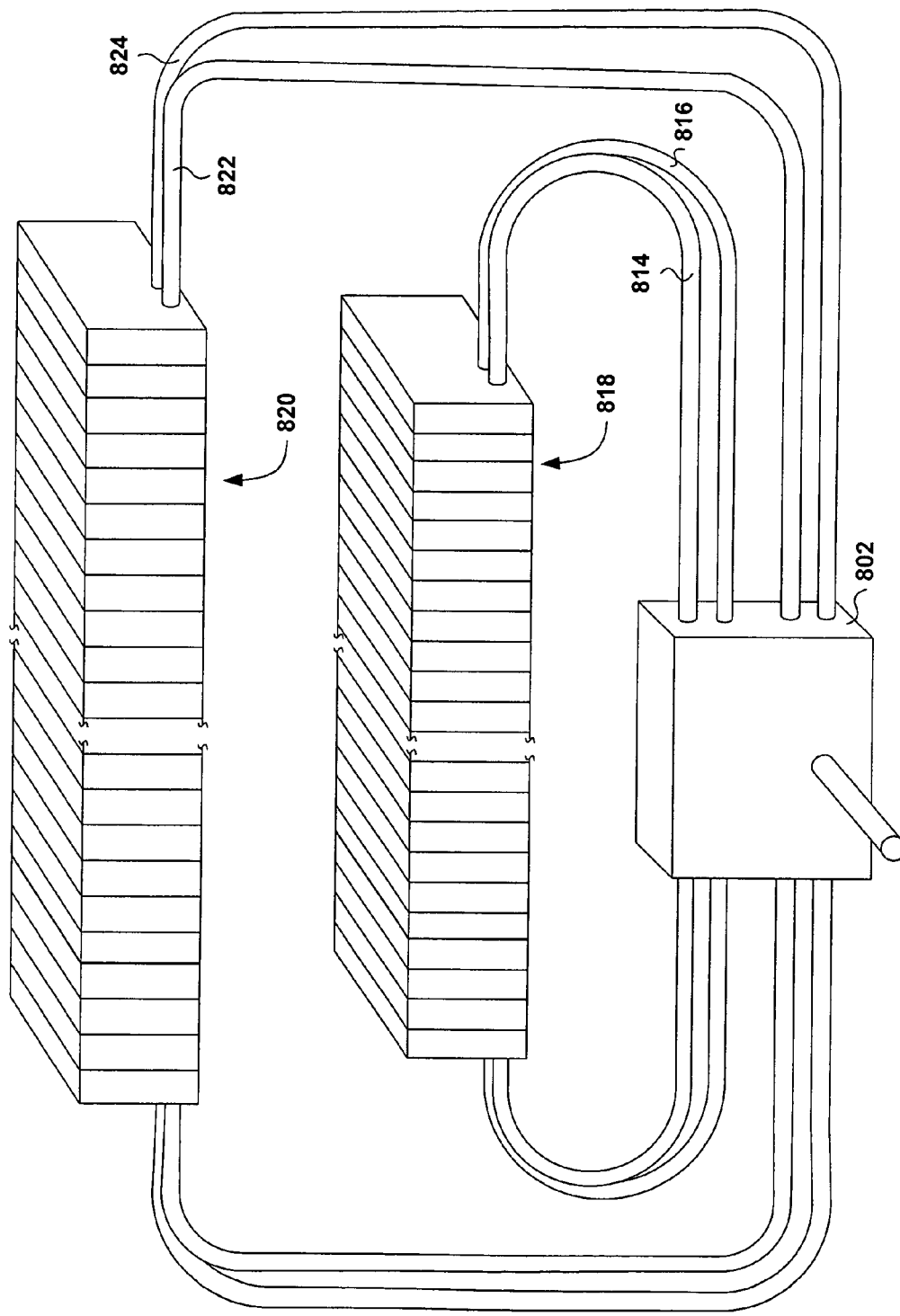
Figure 9:
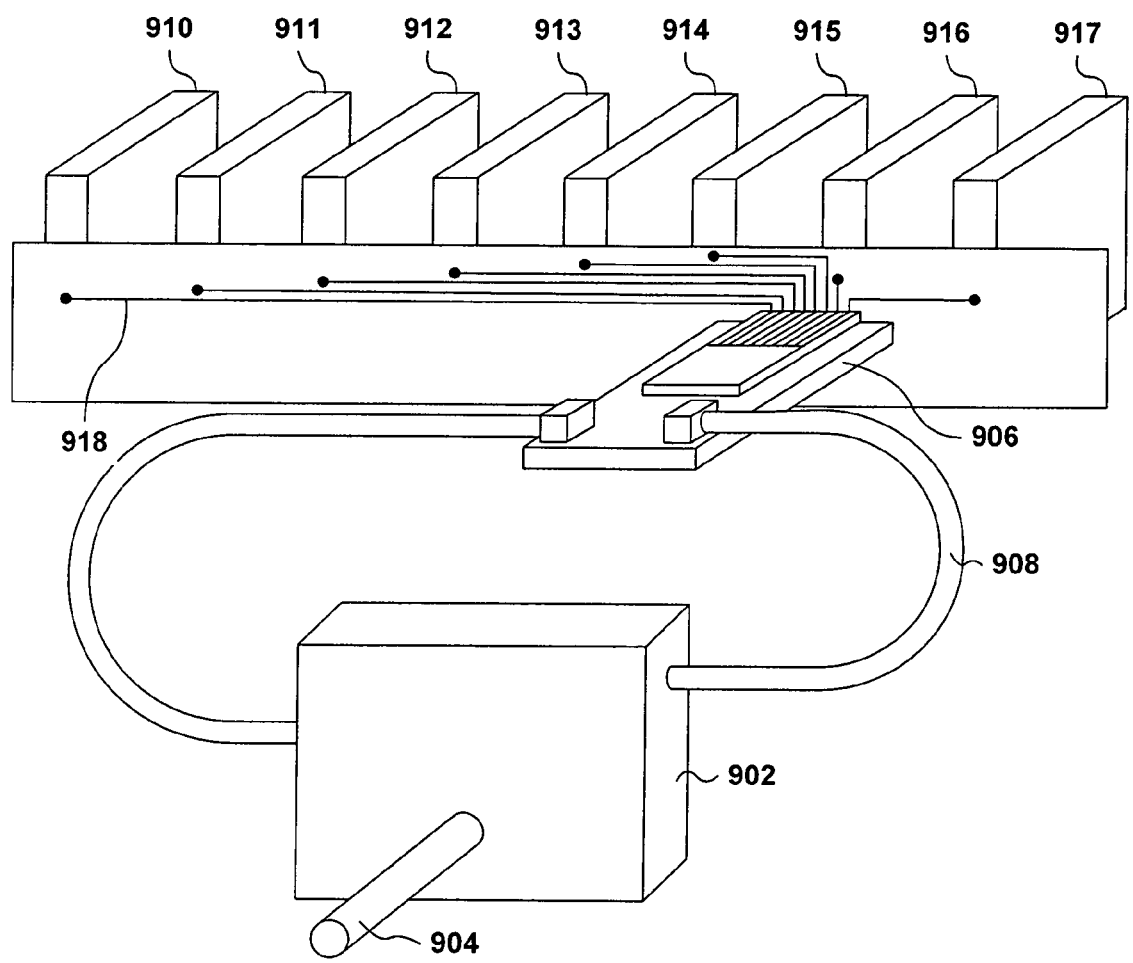
FIG. 9 abstractly illustrates the storage-shelf router, representing one embodiment of the present invention, using the illustration convention employed for FIGS. 8A-D.

FIG. 9 abstractly illustrates the storage-shelf router, representing one embodiment of the present invention, using the illustration convention employed for FIGS. 8A-D. In FIG. 9, disk-array controller 902 is linked via a LAN or fiber-optic communications medium 904 to one or more remote computer systems. The disk-array controller 902 is interconnected with a storage-shelf router 906 via an FC arbitrated loop 908. The storage-shelf router 906 is directly interconnected with each of the disk drives within a storage shelf 910-917 via separate point-to-point interconnects, such as interconnect 918. Comparing the implementation abstractly illustrated in FIG. 9 with the implementations illustrated in FIGS. 8A-D, it is readily apparent that problems identified with the implementation shown in FIG. 8A-D are addressed by the storage-shelf-router-based implementation. First, the only node delay within the FC arbitrated loop of the implementation shown in FIG. 9 is that introduced by the storage-shelf router, acting as a single FC arbitrated loop node. By contrast, as shown in FIG. 8A, each FC-compatible disk drive introduces a separate node delay, and the cumulative node delay on the FC arbitrated loop 814 is proportional to the number of FC-compatible disk drives interconnected by the FC arbitrated loop. The storage-shelf router is designed to facilitate highly parallel and efficient data transfer between FC ports and the internal serial interconnects linking the storage-shelf router to individual disk drives. Therefore, there is no substantial delay, and no cumulative delay, introduced by the storage-shelf router other than the inevitable node delay introduced by on board FC controllers that interconnect the storage-shelf router to the FC arbitrated loop 908.

The FC arbitrated loop 908 employed in the implementation shown in FIG. 9 contains only two nodes, the disk-array controller and the storage-shelf router. Assuming that each storage-shelf router can interconnect eight disk drives with the FC arbitrated loop, a single FC arbitrated loop can be used to interconnect 125 storage-shelf routers to a disk-array controller, or 126 storage-shelf routers if an address normally reserved for the FC fabric is used by a storage-shelf router, thereby interconnecting 8,000 or more individual disk drives with the disk-array controller via a single FC arbitrated loop. As noted above, when high availability is not needed, 16,000 or more individual disk drives may be interconnected with the disk-array controller via a single FC arbitrated loop. By contrast, as illustrated in FIG. 8C, when individual FC-compatible disk drives each function as a separate FC node, only 125 disk drives may be interconnected with the disk-array controller via a single FC arbitrated loop, or 126 disk drives if an address normally reserved for the FC fabric is used for a disk drive.

The disk drives are connected to the storage-shelf router 906 via any of a number of currently available internal interconnection technologies. In one embodiment, SATA-compatible interconnects are used to interconnect SATA disk drives with the storage-shelf router. A storage-shelf router includes logic that translates each FCP command received from the disk-array controller into one or more equivalent ATA-interface commands that the storage-shelf router then transmits to an appropriate SATA disk drive. The storage-shelf router shown in FIG. 9 is interconnected with the disk-array controller via a single FC arbitrated loop 908, but, as discussed below, a storage-shelf router is more commonly interconnected with the disk-array controller through two FC arbitrated loops or other FC fabric topologies.

Figure 10:
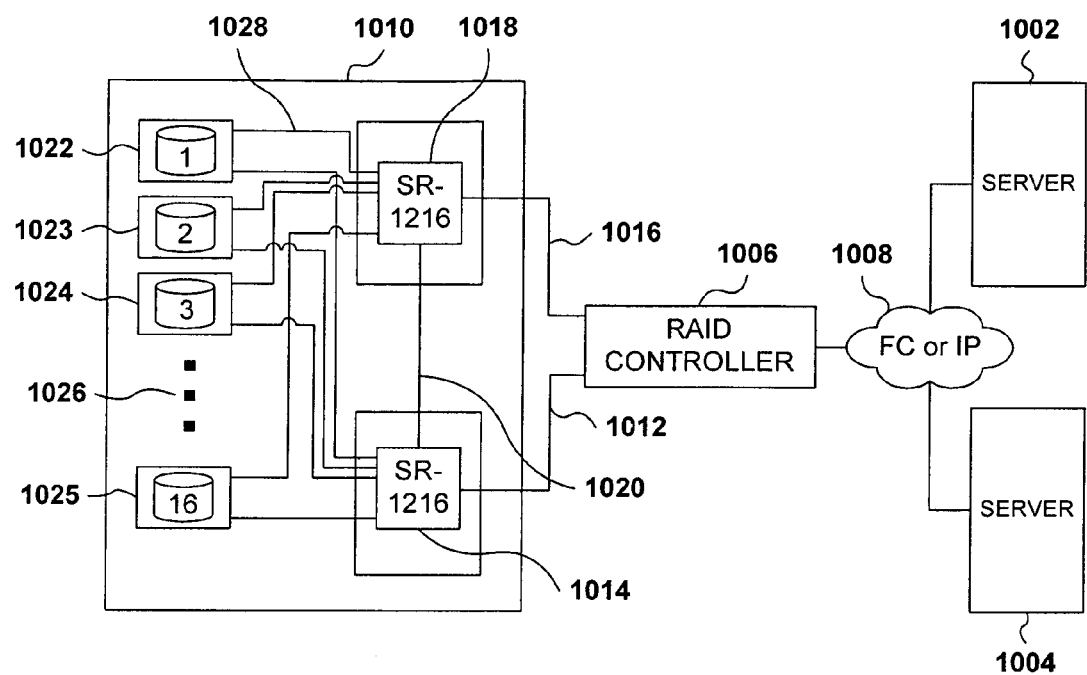
FIG. 10 illustrates the position, within a hierarchically interconnected system of computers and a disk array, occupied by the storage-shelf router that represents one embodiment of the present invention.

FIG. 10 illustrates the position, within a hierarchically interconnected system of computers and a disk array, occupied by the storage-shelf router that represents, in part, one embodiment of the present invention. In FIG. 10, two server computers 1001 and 1004 are interconnected with each other, and with a disk-array controller 1006 via a high-bandwidth communications medium 1008, such as any of various FC fabric topologies. The disk-array controller 1006 is interconnected with a storage shelf 1010 via two separate FC arbitrated loops. The first FC arbitrated loop 1012 directly interconnects the disk-array controller 1006 with a first storage-shelf router 1014. The second FC arbitrated loop 1016 directly interconnects the disk-array controller 1006 with a second storage-shelf router 1018. The two storage-shelf routers 1014 and 1018 are interconnected with an internal point-to-point FC interconnection 1020 that carries FC frames from the first storage-shelf router 1014 to the second storage-shelf router 1018 as part of the first FC arbitrated loop 1012, and carries FC frames between the second storage-shelf router 1018 and first storage-shelf router 1014 as part of the second FC arbitrated loop 1016. In addition, the internal FC link 1020 may carry FC frames used for internal management and communications internally generated and internally consumed within the storage shelf 1010. As discussed below, it is common to refer to the two FC arbitrated loops interconnecting the disk-array with the storage shelf as the "X loop" or "X fabric" and the "Y loop" or "Y fabric," and to refer to the exchange of internally generated and internally consumed management FC frames on the internal FC 1020 as the S fabric. The storage shelf 1010 includes 16 SATA disk drives represented in FIG. 10 by the four disk drives 1022-1025 and the ellipsis 1026 indicating 12 disk drives not explicitly shown. Each storage-shelf router 1014 and 1018 is interconnected with each SATA disk drive via point-to-point serial links, such as serial link 1028.

As shown in FIG. 10, there is at least two-fold redundancy in each of the intercommunications pathways within the disk array containing the disk-array controller 1006 and the storage shelf 1010. Moreover, there is a two-fold redundancy in storage-shelf routers. If any single link, or one storage-shelf router, fails, the remaining links and remaining storage-shelf router can assume the workload previously assumed by the failed link or failed storage-shelf router to maintain full connectivity between the disk-array controller 1006 and each of the sixteen SATA disk drives within the storage shelf 1010. The disk-array controller may additionally implement any of a number of different high-availability data-storage schemes, such as the various levels of RAID storage technologies, to enable recovery and full operation despite the failure of one or more of the SATA disk drives. The RAID technologies may, for example, separately and fully redundantly restore two or more complete copies of stored data on two or more disk drives. The servers intercommunicate with the disk-array comprising the disk-array controller 1006 and one or more storage shelves, such as storage shelf 1010, through a communications medium, such as an FC fabric, with built-in redundancy and failover. The disk-array controller presents a logical unit ("LUN") and logical block address ("LBA") interface that allows the server computers 1002 and 1004 to store and retrieve files and other data objects from the disk array without regard for the actual location of the data within and among the disk drives in the storage shelf, and without regard to redundant copying of data and other functionalities and features provided by the disk-array controller 1006. The disk-array controller 1006, in turn, interfaces to the storage shelf 1010 through an interface provided by the storage-shelf routers 1014 and 1018. The disk-array controller 1006 transmits FC exchanges to, and receives FC exchanges from, what appear to be discrete FC-compatible disk drives via the FCP protocol. However, transparently to the disk-array controller, the disk-shelf routers 1014 and 1018 translate FC commands into ATA commands in order to exchange commands and data with the SATA disk drives.

Figure 11:
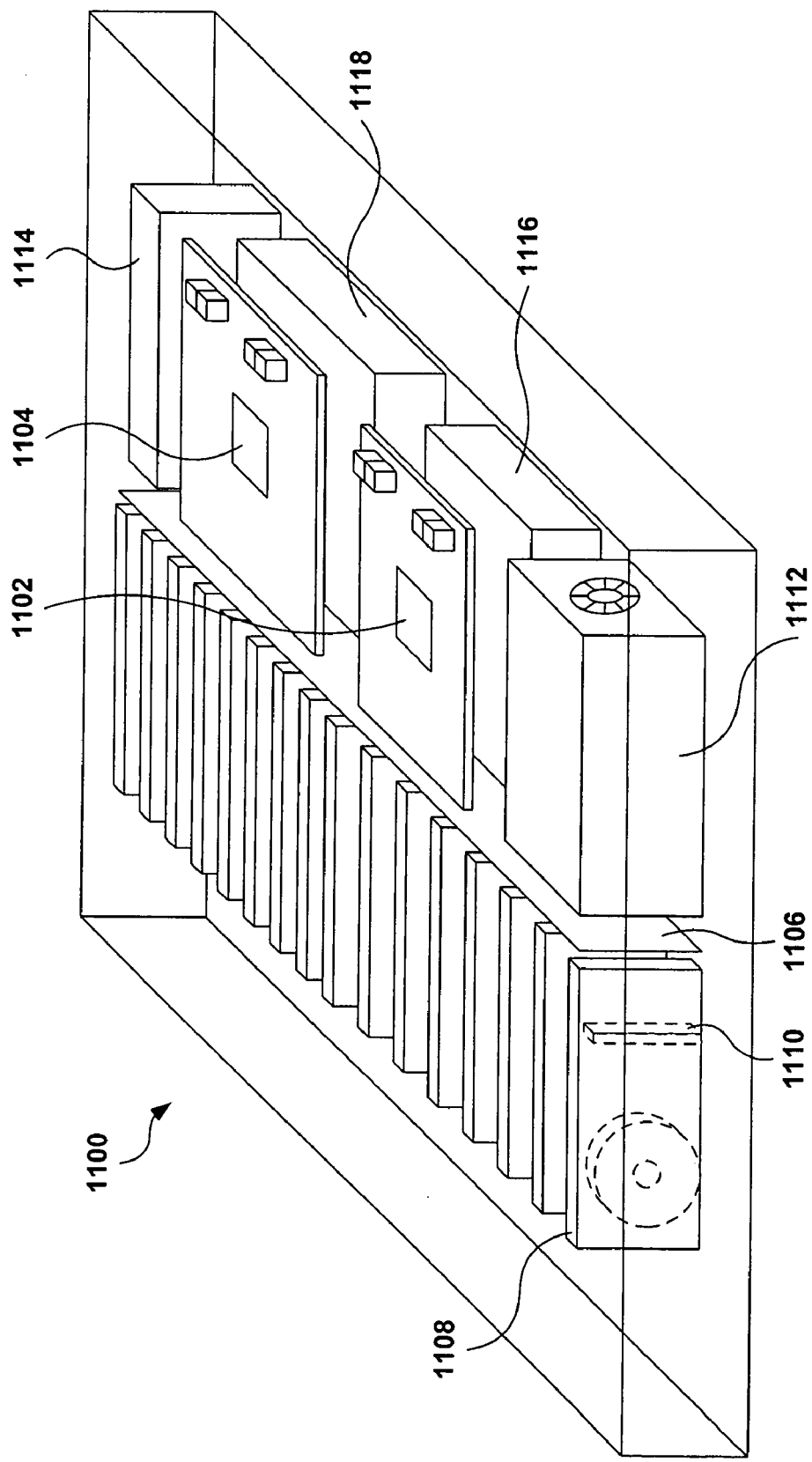
FIGS. 11 and 12 show a perspective view of the components of a storage shelf implemented using the storage-shelf routers that represent one embodiment of the present invention.
Figure 12:
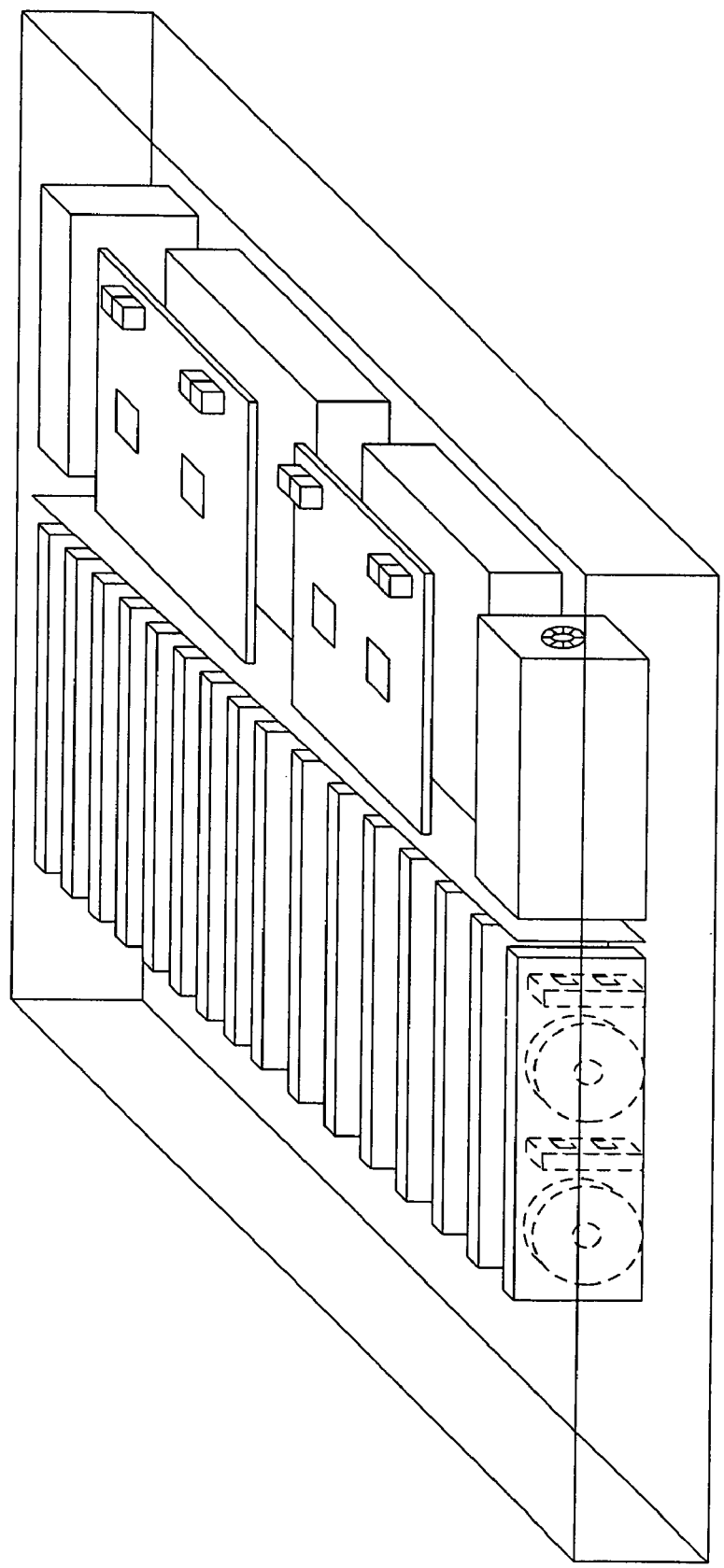

FIGS. 11 and 12 show a perspective view of the components of a storage shelf implemented using the storage-shelf routers that represent one embodiment of the present invention. In FIG. 11, two storage-shelf routers 1102 and 1104 mounted on router cards interconnect, via a passive midplane 1106, with 16 SATA disk drives, such as SATA disk drive 1108. Each SATA disk drive carrier contains an SATA disk drive and a path controller card 1110 that interconnects the SATA disk drive with two separate serial links that run through the passive midplane to each of the two storage-shelf routers 1102 and 1104. Normally, a SATA disk drive supports only a single serial connection to an external system. In order to provide fully redundant interconnections within the storage shelf, the path controller card 1110 is needed. The storage shelf 1100 additionally includes redundant fans 1112 and 1114 and redundant power supplies 1116 and 1118. FIG. 12 shows a storage-shelf implementation, similar to that shown in FIG. 11, with dual SATA disk drive carriers that each includes two path controller cards and two SATA disk drives. The increased number of disk drives necessitates a corresponding doubling of storage-shelf routers, in order to provide the two-fold redundancy needed for a high-availability application.

Storage Shelf Internal Topologies

Figure 13A:
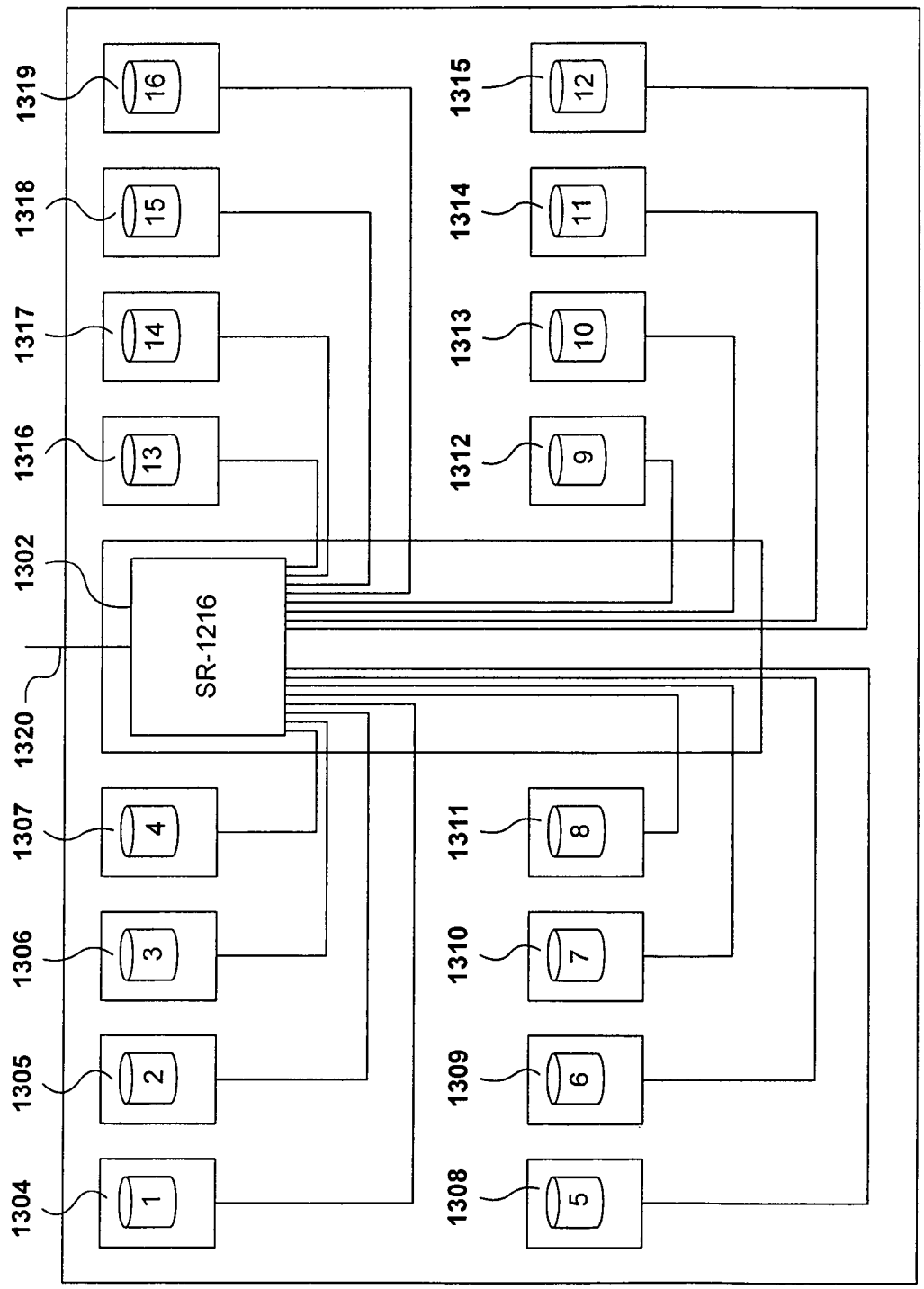
FIGS. 13A-C illustrate three different implementations of storage shelves using the storage-shelf router that represents one embodiment of the present invention.
Figure 13B:
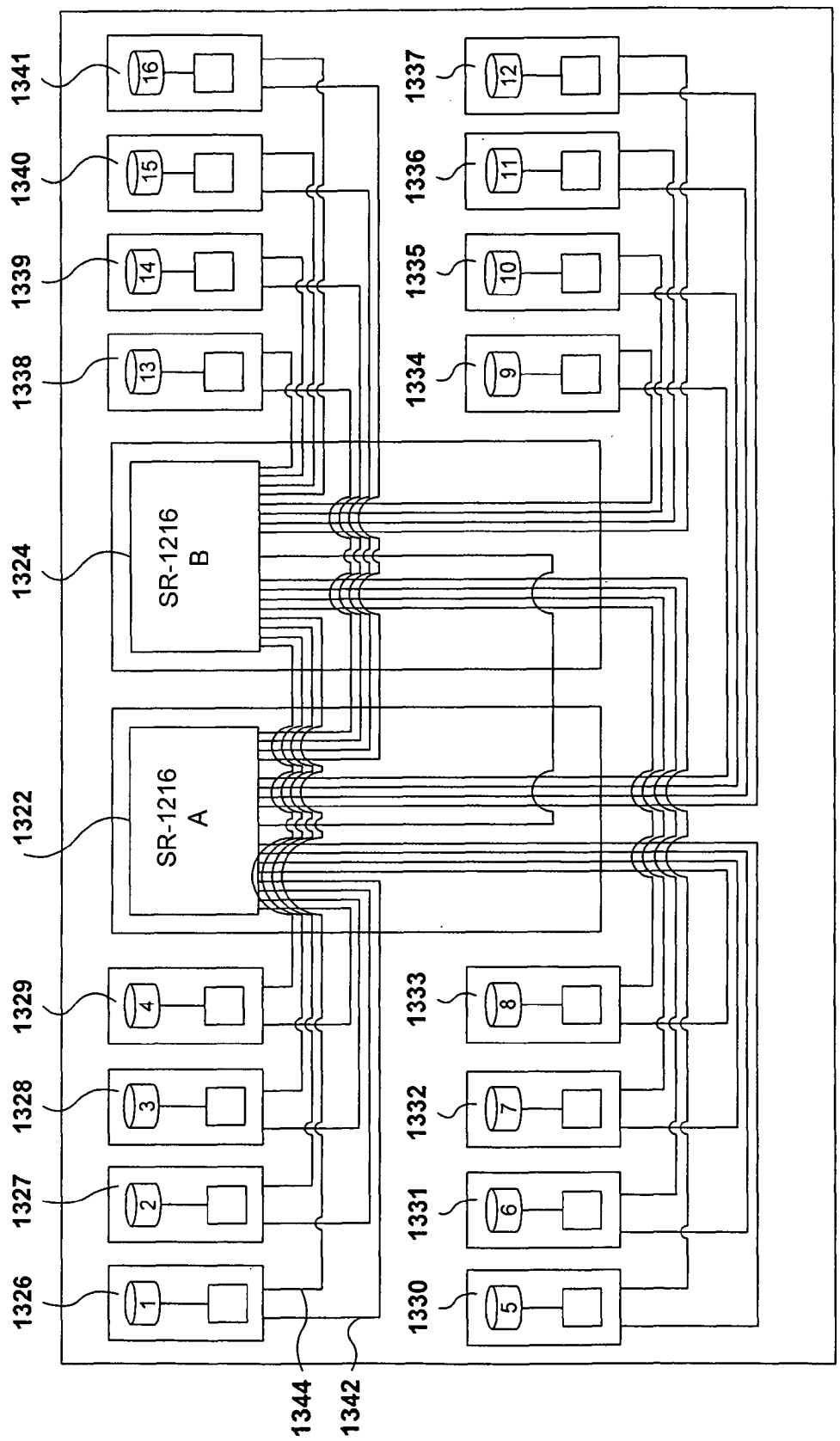
Figure 13C:
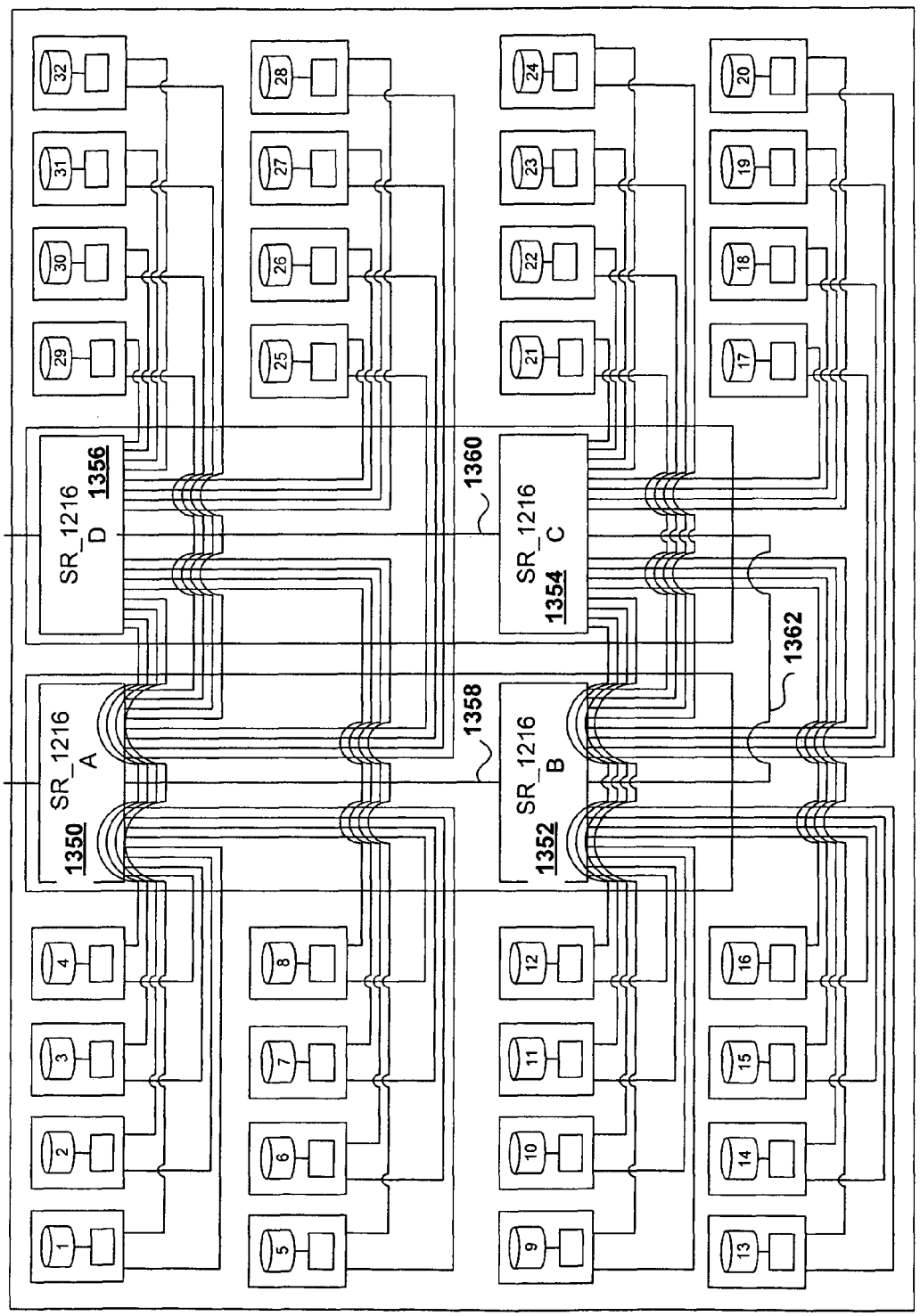

FIGS. 13A-C illustrate three different implementations of storage shelves using the storage-shelf router that represents, in part, one embodiment of the present invention. In FIG. 13A, a single storage-shelf router 1302 interconnects 16 SATA disk drives 1304-1319 with a disk-array controller via an FC arbitrated loop 1320. In one embodiment, the storage-shelf router provides a maximum of 16 serial links, and can support interconnection of up to 16 SATA disk drives. The storage shelf shown in FIG. 13A is not highly available, because it contains neither a redundant storage-shelf router nor redundant serial links between one or more routers and each SATA disk drive.

By contrast, the storage-shelf implementation shown in FIG. 13B is highly available. In this storage shelf, two storage-shelf routers 1322 and 1324 are linked via point-to-point serial links to each of the 16 SATA disk drives 1326-1341. During normal operation, storage-shelf router 1322 interconnects half of the SATA disk drives 1326-1333 to the disk-array controller, while storage-shelf router 1324 interconnects the other half of the SATA disk drives 1334-1341 to the disk-array controller. The internal point-to-point serial links employed during normal operation are shown in bold in FIG. 13B, such as serial link 1342, and are referred to as "primary links." Those internal serial links not used during normal operation, such as interior serial link 1344, are referred to as "secondary links." If a primary link fails during operation, then the failed primary link, and all other primary links connected to a storage-shelf router, may be failed over from the storage-shelf router to which the failed primary link is connected to the other storage-shelf router, to enable the failed primary link to be repaired or replaced, including replacing the storage-shelf router to which the failed primary link is connected. As discussed above, each of the two storage-shelf routers serves as the FC node for one of two FC arbitrated loops that interconnect the storage shelf with a disk-array controller. Should one FC arbitrated loop fail, data transfer that would normally pass through the failed FC arbitrated loop is failed over to the remaining, operable FC arbitrated loop. Similarly, should a storage-shelf router fail, the other storage-shelf router can assume the full operational control of the storage shelf. In alternative embodiments, a primary path failure may be individually failed over, without failing over the entire storage-shelf router. In certain embodiments and situations, a primary-path failover may be carried within the storage-shelf router, while in other embodiments and situations, the primary-path failover may involve failing the primary path over to a second storage-shelf router.

FIG. 13C illustrates implementation of a 32-ATA-disk high availability storage shelf. As shown in FIG. 13C, the 32-ATA-disk storage shelf includes four storage-shelf routers 1350, 1352, 1354, and 1356. Each storage-shelf router, during normal operation, interconnects eight SATA disks with the two FC arbitrated loops that interconnect the storage shelf with a disk-array controller. Each storage-shelf router is interconnected via secondary links to eight additional SATA disk drives so that, should failover be necessary, a storage-shelf router can interconnect a total of 16 SATA disk drives with the two FC arbitrated loops. Note that, in the four-storage-shelf-router configuration, storage-shelf router 1350 serves as the FC node for all four storage-shelf routers with respect to one FC arbitrated loop, and storage-shelf router 1356 serves as the FC node for all four storage-shelf routers with respect to the second FC arbitrated loop. As shown in FIG. 13C, the first FC arbitrated loop for which storage-shelf router 1350 serves as FC node is considered the X loop or X fabric, and the other FC arbitrated loop, for which storage-shelf router 1356 serves as the FC node is considered the Y fabric or Y loop. FC frames transmitted from the disk-array controller via the X loop to an SATA disk within the storage shelf are first received by storage-shelf router 1350. The FC frames are either directed to an SATA disk interconnected with storage-shelf router 1350 via primary links, in the case of normal operation, or are directed via the internal FC link 1358 to storage-shelf router 1352 which, in turn, either transforms the FC frames into one or more ATA commands that are transmitted through a primary link to an SATA disk, or forwards the FC frame downstream to storage-shelf router 1354. If a response FC frame is transmitted by storage-shelf router 1356 via the X fabric, then it must be forwarded through internal FC links 1360, 1362, and 1358 via storage-shelf routers 1354 and 1352 to storage-shelf router 1350, from which the response frame can be transmitted to the external X fabric. In the described embodiment, a high availability storage shelf needs to contain at least two storage-shelf routers, and needs to contain a storage-shelf router for each set of eight SATA disks within the storage shelf.

Path Controller Card Overview

Figure 14A:
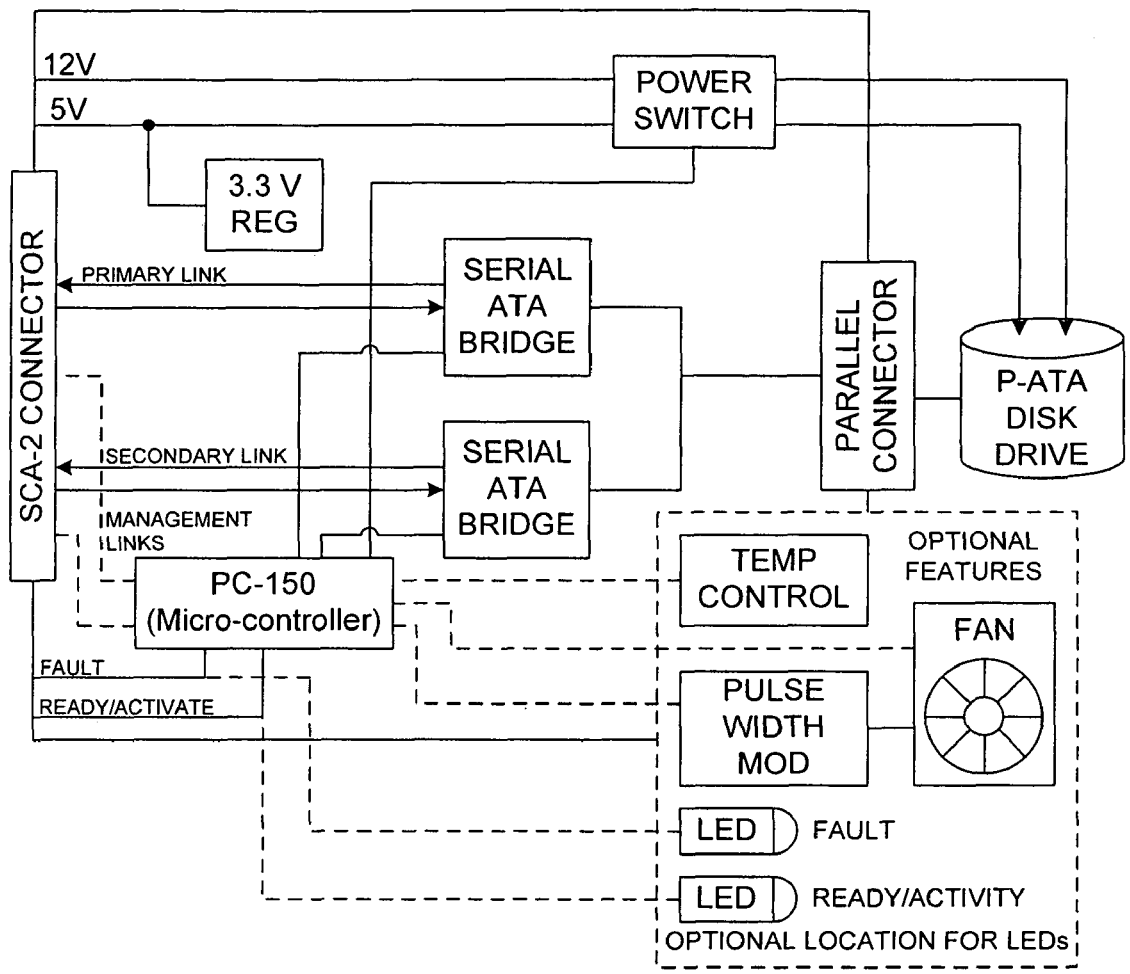
FIGS. 14A-B illustrate two implementations of a path controller card suitable for interconnecting an ATA disk drive with two storage-shelf routers.
Figure 14B:
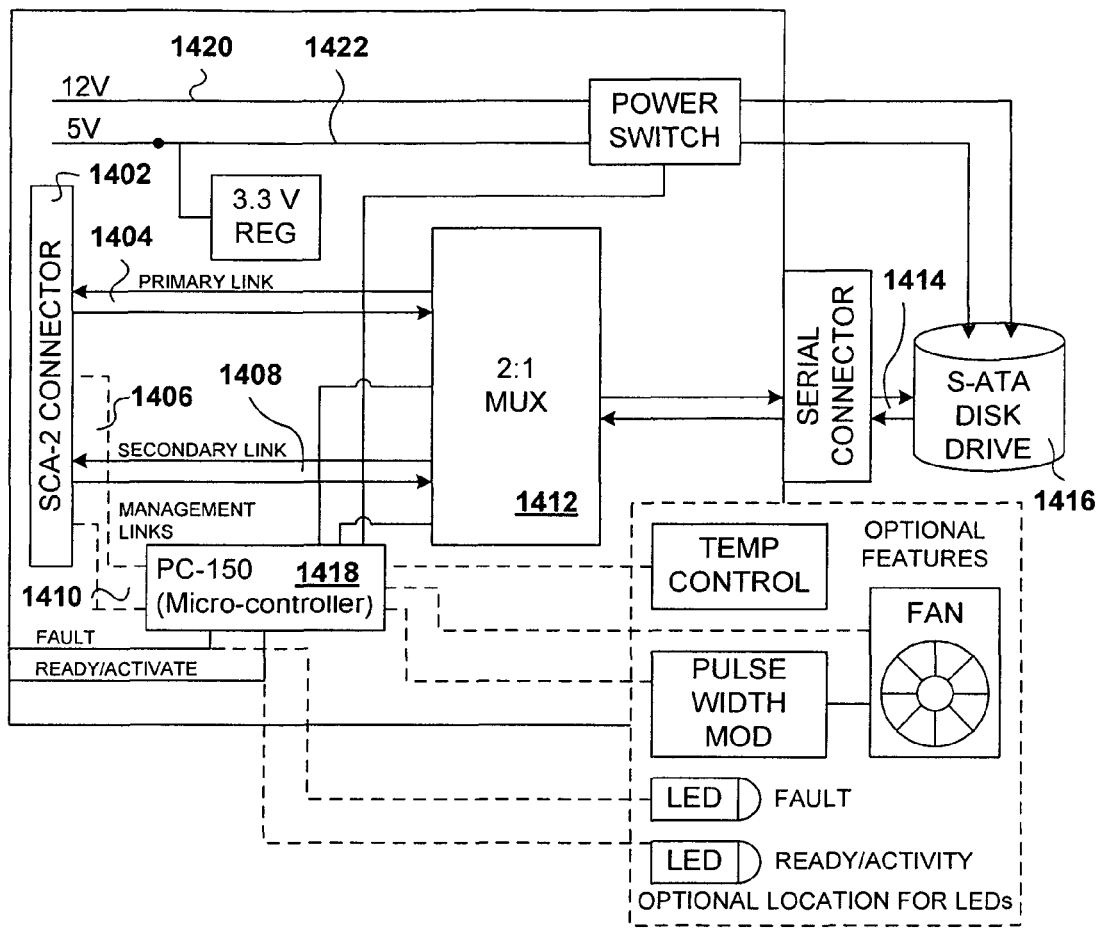

As discussed above, two components facilitate construction of a high availability storage shelf employing SATA disks, or other inexpensive disk drives, and that can be interconnected with an FC arbitrated loop or other high-bandwidth communications medium using only a single slot or node on the FC arbitrated loop. One component is the storage-shelf router and the other component is the path controller card that provides redundant interconnection of an ATA drive to two storage-shelf routers. FIGS. 14A-B illustrate two implementations of a path control card suitable for interconnecting an ATA disk drive with two storage-shelf routers. The implementation shown in FIG. 14A provides a parallel connector to a parallel ATA disk drive, and the implementation shown in FIG. 14B provides a serial connection to a SATA disk drive. Because, as discussed above, SATA disk drives provide higher data transfer rates, the implementation shown in FIG. 14B is preferred, and the implementation that is discussed below.

The path controller card provides an SCA-2 connector 1402 for external connection of a primary serial link 1404 and a management link 1406 to a first storage-shelf router and secondary serial link 1408 and second management link 1410 to a second storage-shelf router. The primary link and secondary link are multiplexed by a 2:1 multiplexer that is interconnected via a serial link 1414 to a SATA disk drive 1416.

The management links 1406 and 1410 are input to a microcontroller 1418 that runs management services routines, such as routines that monitor the temperature of the disk drive environment, control operation of a fan within the disk drive carrier, and activate various light emitting diode ("LED") signal lights visible from the exterior of the disk drive enclosure. In essence, under normal operation, ATA commands and data are received by the path controller card via the primary link, and are transferred via the 2:1 multiplexer to the serial link 1414 input to the SATA disk drive 1416. If a failover occurs within the storage shelf that deactivates the default storage-shelf router connected via the primary link to the path controller card, a second storage-shelf router assumes transfer of ATA commands and data via the secondary link which are, in turn, passed through the 2:1 multiplexer to the serial link 1414 directly input to the SATA disk drive 1416.

The path controller card provides redundant interconnection to two separate storage-shelf routers, and is thus needed in order to provide the two-fold redundancy needed in a high availability storage shelf. The storage-shelf router provides interconnection between different types of communications medium and translation of commands and data packets between the different types of communications media. In addition, the storage-shelf router includes fail-over logic for automatic detection of internal component failures and execution of appropriate fail-over plans to restore full interconnection of disk drives with the disk-array controller using redundant links and non-failed components.

Storage-Shelf Router Overview

Figure 15:
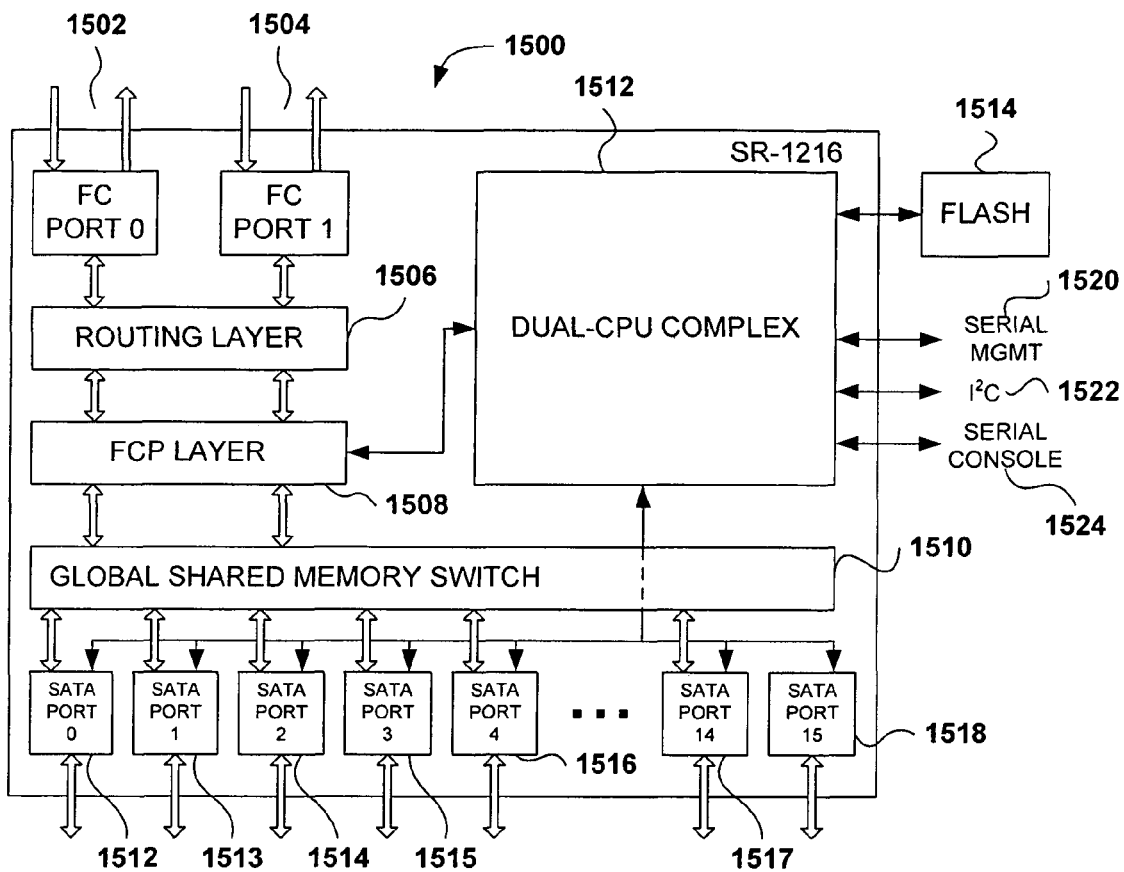
FIG. 15 is a high-level block diagram illustrating the major functional components of a storage-shelf router.

FIG. 15 is a high-level block diagram illustrating the major functional components of a storage-shelf router. The storage-shelf router 1500 includes two FC ports 1502 and 1504, a routing layer 1506, an FCP layer 1508, a global shared memory switch 1510, 16 SATA ports 1512-1518, a CPU complex 1520, and an external flash memory 1514. Depending on the logical position of the storage-shelf router within the set of storage-shelf routers interconnecting within a storage shelf, one or both of the FC ports may be connected to an external FC arbitrated loop or other FC fabric, and one or both of the FC ports may be connected to internal point-to-point FC links. In general, one of the FC ports, regardless of the logical and physical positions of the storage-shelf router within a set of storage-shelf routers, may be considered to link the storage-shelf router either directly or indirectly with a first FC arbitrated loop, and the other FC port can be considered to directly or indirectly interconnect the storage-shelf router with a second FC arbitrated loop.

The routing layer 1506 comprises a number of routing tables stored in a memory, discussed below, and routing logic that determines where to forward incoming FC frames from both FC ports. The FCP layer 1508 comprises: various queues for temporary storage of FC frames and intermediate-level protocol messages; control logic for processing various types of incoming and outgoing FC frames; and an interface to the CPU complex 1512 to allow firmware routines executing on the CPU complex to process FCP_CMND frames in order to set up FC exchange contexts in memory to facilitate the exchange of FC frames that together compose an FCP exchange.

The global shared memory switch 1510 is a extremely high-speed, time-multiplexed data-exchange facility for passing data between FCP-layer queues and the SATA ports 1512-1518. The global shared memory switch ("GSMS") 1510 employs a virtual queue mechanism to allow allocation of a virtual queue to facilitate the transfer of data between the FCP layer and a particular SATA port. The GSMS is essentially a very high-bandwidth, high-speed bidirectional multiplexer that facilitates highly parallel data flow between the FCP layer and the 16 SATA ports, and is, at the same time, a bridge-like device that includes synchronization mechanisms to facilitate traversal of the synchronization boundary between the FCP layer and the SATA ports.

The CPU complex 1512 runs various firmware routines that process FCP commands in order to initialize and maintain context information for FC exchanges and translate FCP commands into ATA-equivalent commands, and that also monitor operation of the SATA disk drives and internal components of the storage-shelf router and carry out sophisticated fail-over strategies when problems are detected. In order to carry out the fail-over strategies, the CPU complex is interconnected with the other logical components of the storage-shelf router. The external flash memory 1514 stores configuration parameters and firmware routines. Note that the storage-shelf router is interconnected to external components via the two FC ports 1502 and 1504, the 16 SATA ports 1512-1518, 16 serial management links 1520, an I²C BUS 1522, and a link to a console 1524.

Storage-Shelf Interfaces

Figure 16A:
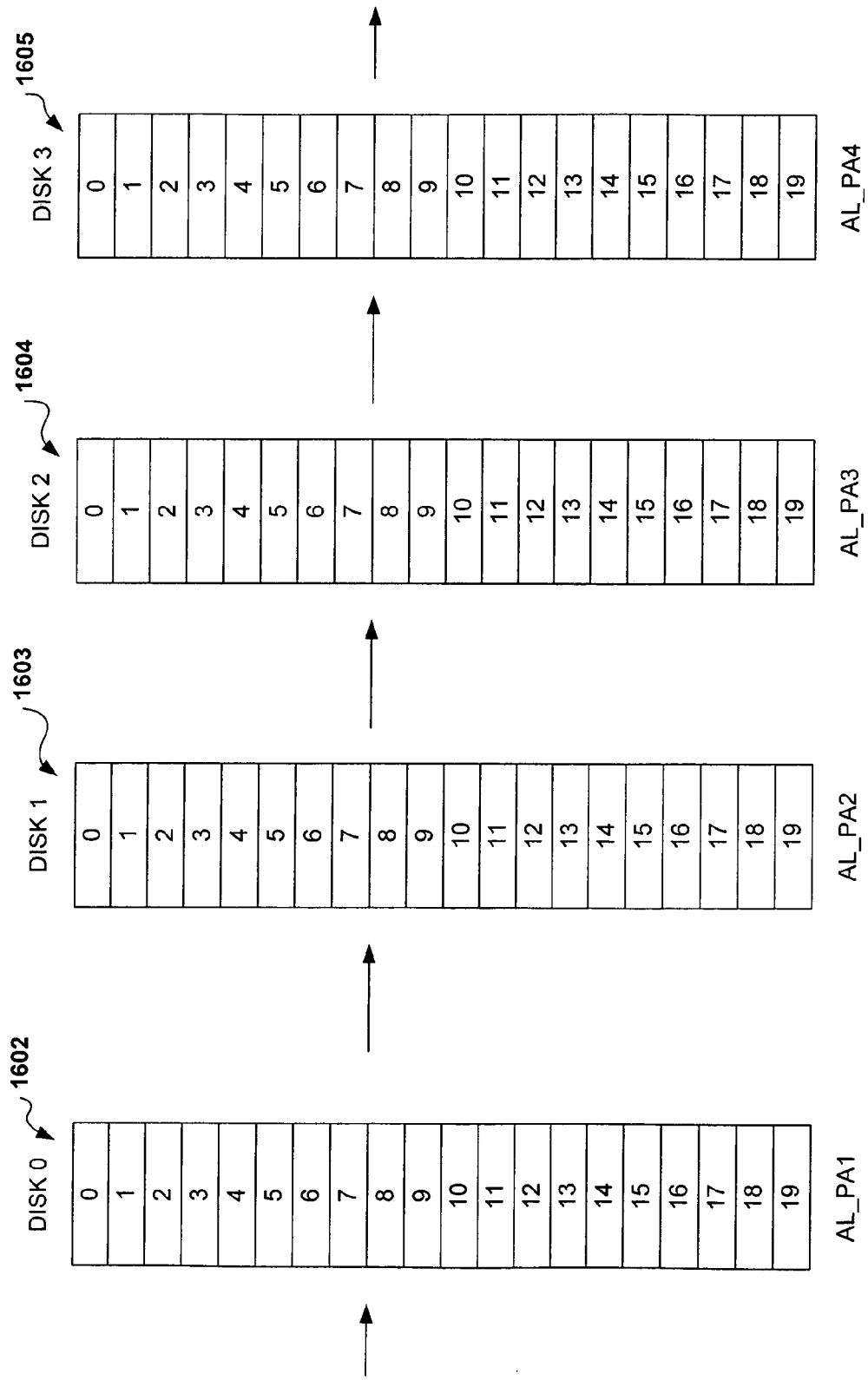

As discussed above, storage-shelf-router-based storage-shelf implementations provide greater flexibility, in many ways, than do current, FC-node-per-disk-drive implementations. The storage-shelf router can provide any of many different logical interfaces to the disk-array controller to which it is connected. FIGS. 16A-G illustrate a number of different logical interfaces provided by a high-availability storage shelf incorporating one or more storage-shelf routers that, in part, represent one embodiment of the present invention. FIG. 16A shows the interface provided by current FC-compatible disk drive implementations of storage shelves, as described above with reference to FIGS. 8A-D. FIG. 16A uses an abstract illustration convention used throughout FIGS. 16A-H. In FIG. 16A, each disk drive 1602-1605 is logically represented as a series of data blocks numbered 0 through 19. Of course, an actual disk drive contains hundreds of thousands to millions of logical blocks, but the 20 logical blocks shown for each disk in FIG. 16A are sufficient to illustrate various different types of interfaces. In FIG. 16A, each separate disk drive 1602-1605 is a discrete node on an FC arbitrated loop, and therefore each disk drive is associated with a separate FC node address, represented in FIG. 16A as "AL_PA1," "AL_PA2," "AL_PA3," and "AL_PA4," respectively. Note, however, that unlike in current, FC-arbitrated-loop disk-array implementations, such as those discussed with reference to FIGS. 8A-D, there is no cumulative node delay associated with the nodes, because each node is interconnected with the complementary SATA port of the storage-shelf router via a point-to-point connection, as shown in FIG. 9. Thus, a disk-array controller may access a particular logical block within a particular disk drive via an FC address associated with the disk drives. A given disk drive may, in certain cases, provide a logical unit ("LUN") interface in which the logical-block-address space is partitioned into separate logical-block-address spaces, each associated with a different LUN. However, for the purposes of the current discussion, that level of complexity need not be addressed.

Figure 16B:
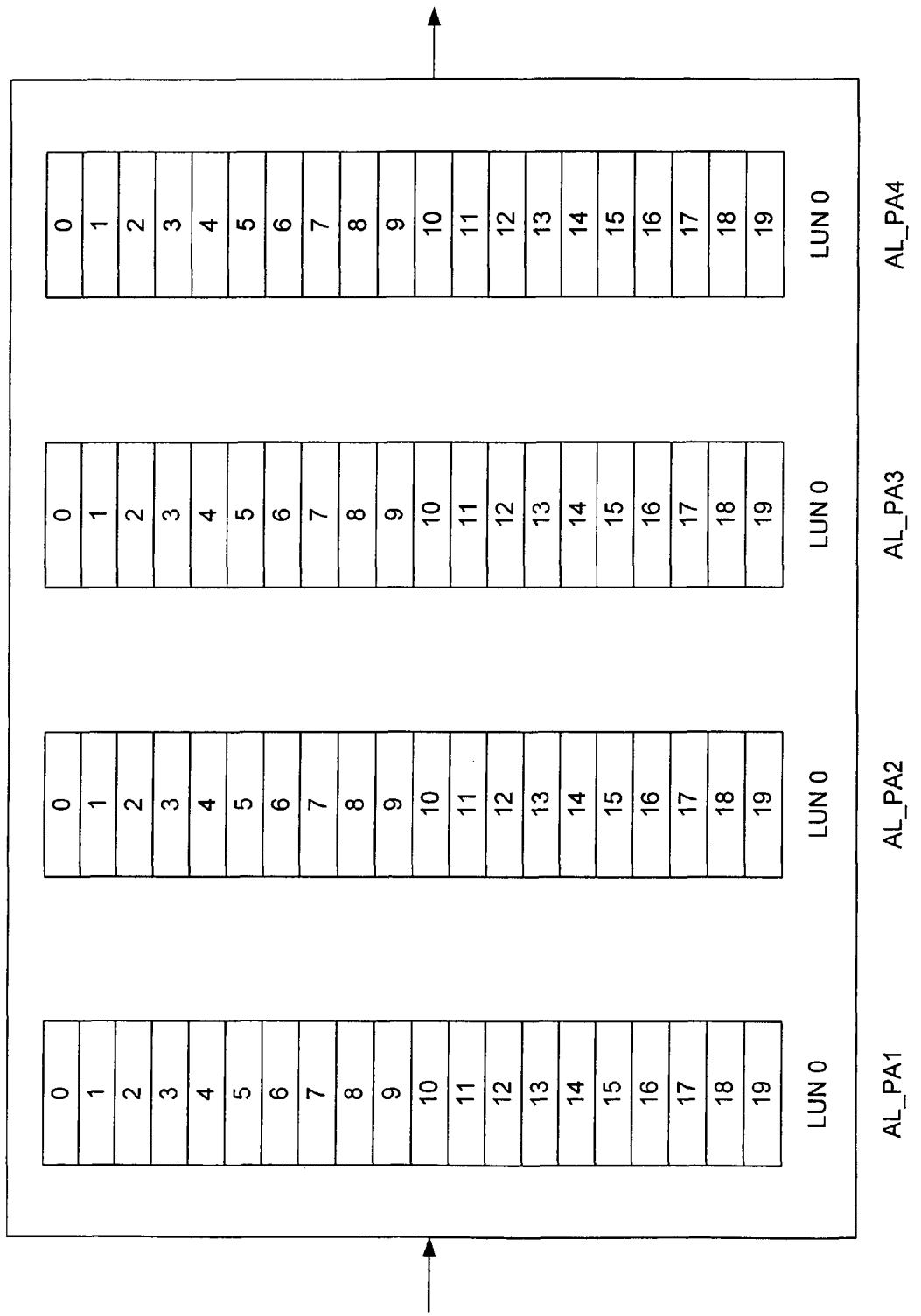

FIG. 16B shows a first possible interface for a storage shelf including the four disk drives shown in FIG. 16A interconnected to the FC arbitrated loop via a storage-shelf router. In this first interface, each disk drive remains associated with a separate FC node address. Each disk drive is considered to be a single logical unit containing a single logical-block-address space. This interface is referred to, below, as "transparent mode" operation of a storage shelf containing one or more storage-shelf routers that represent, in part, one embodiment of the present invention.

Figure 16C:
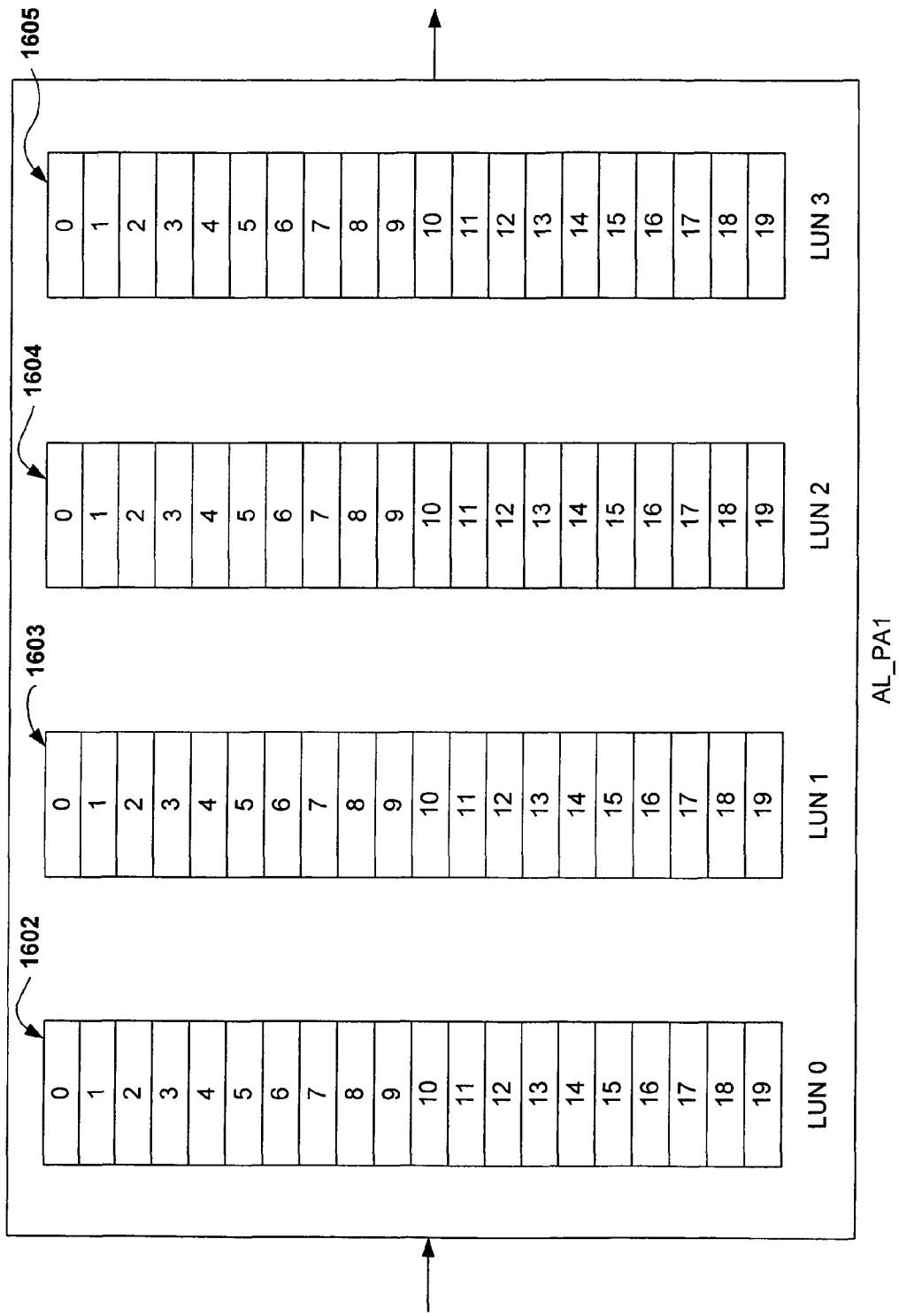

A second possible interface provided by a storage shelf is shown in FIG. 16C. In this case, all four disk drives are associated with a single FC-arbitrated-loop-node address "AL_PA1." Each disk drive is considered to be a different logical unit, with disk drive 1602 considered logical unit zero, disk drive 1603 considered logical unit one, disk drive 1604 considered logical unit two, and disk drive 1605 considered logical unit three. Thus, a disk-array controller can access a logical block within any of the four disk drives in the storage shelf via a single FC-node address, a logical unit number, and a logical block address within the logical unit.

Figure 16D:
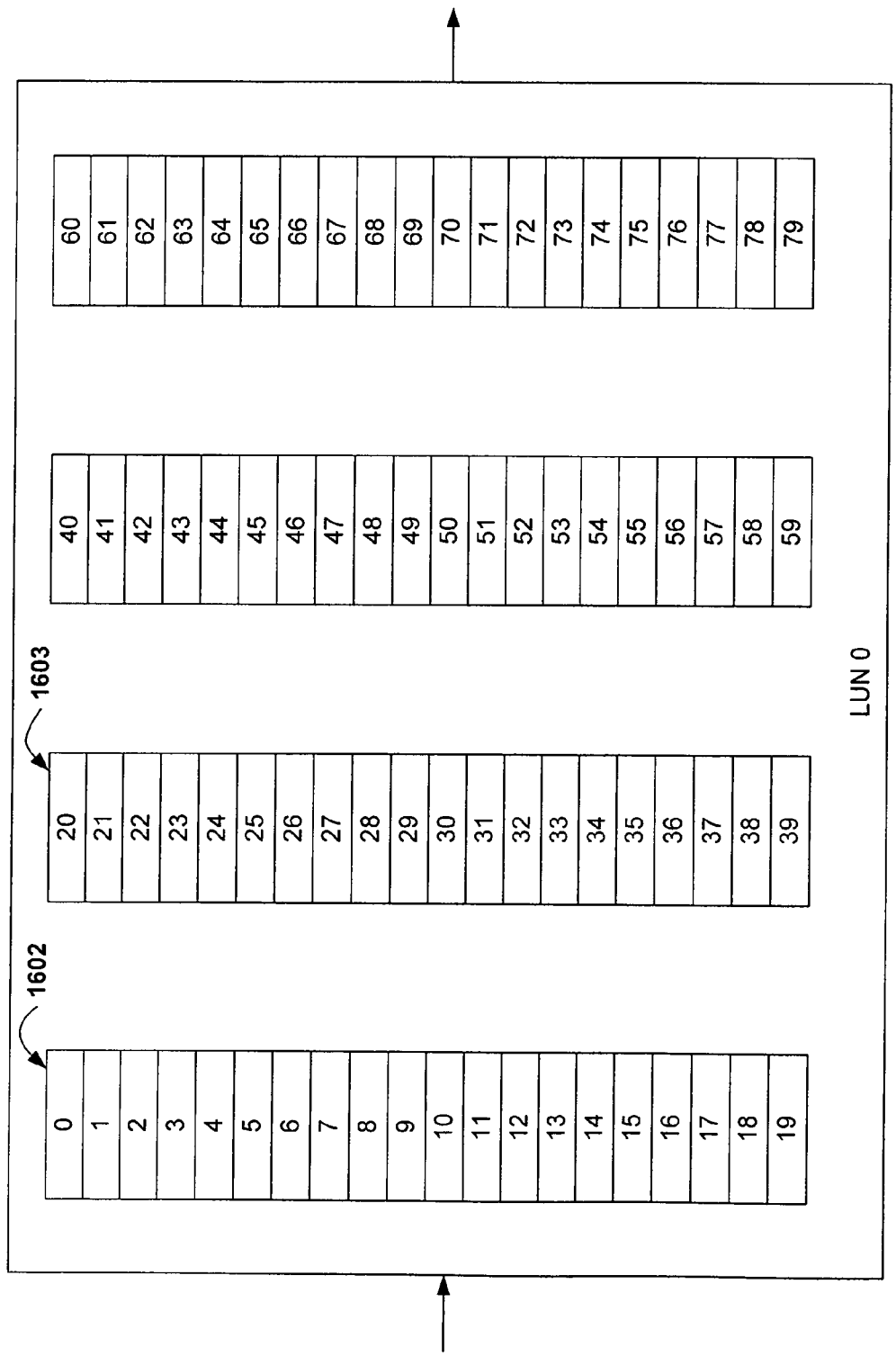

An alternative interface to the four disk drives within the hypothetical storage shelf is shown in FIG. 16D. In this case, all four disk drives are considered to be included within a single logical unit. Each logical block within the four disk drives is assigned a unique logical block address. Thus, logical blocks 0-19 in disk drive 1602 continue to be associated with logical block addresses 0-19, while logical blocks 0-19 in disk drive 1603 are now associated with logical block address 20-39. This interface is referred to, below, as a pure logical-block-address interface, as opposed to the pure LUN-based interface shown in FIG. 16C.

FIG. 16E shows yet another possible logical interface provided by a hypothetical storage shelf containing four disk drives. In this case, the first set of two disk drives 1602 and 1603 is associated with a first FC node address "AL_PA1," and the two disk drives 1602 and 1603 are associated with two different LUN numbers, LUN 0 and LUN 1, respectively. Similarly, the second pair of disk drives 1604 and 1605 are together associated with a second FC node address "AL_PA2," and each of the second pair of disk drives is associated with a different LUN number.

Figure 16F:
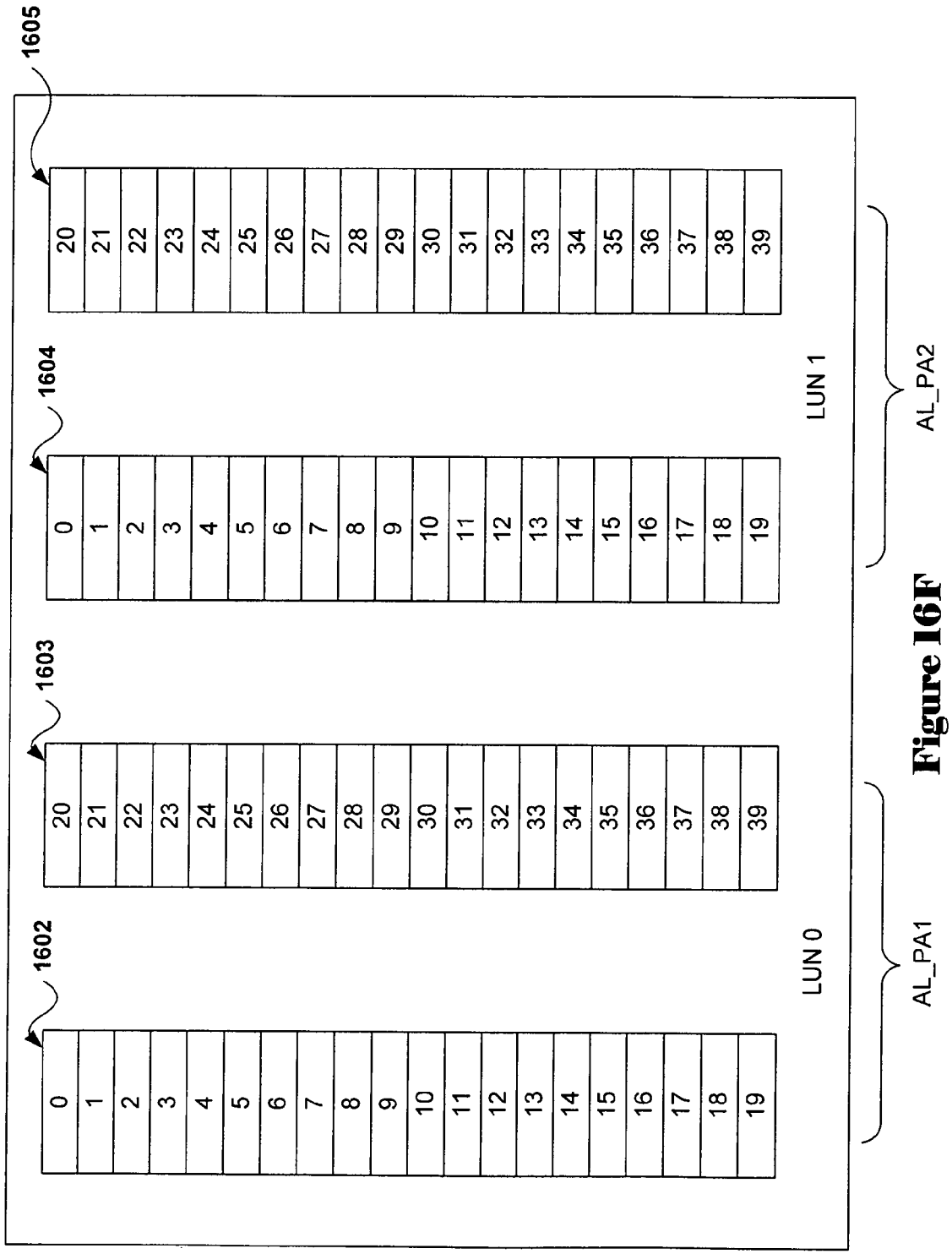

FIG. 16F shows yet another possible interface. In this case, the first two disk drives 1602 and 1603 are associated with a first FC node address, and the second two disk drives 1604 and 1605 are associated with a second FC node address. However, in this case, the two disk drives in each group are considered to both belong to a single logical unit, and the logical blocks within the two disk drives are associated with logical block addresses that constitute a single logical-block-address space.

Figure 16G:
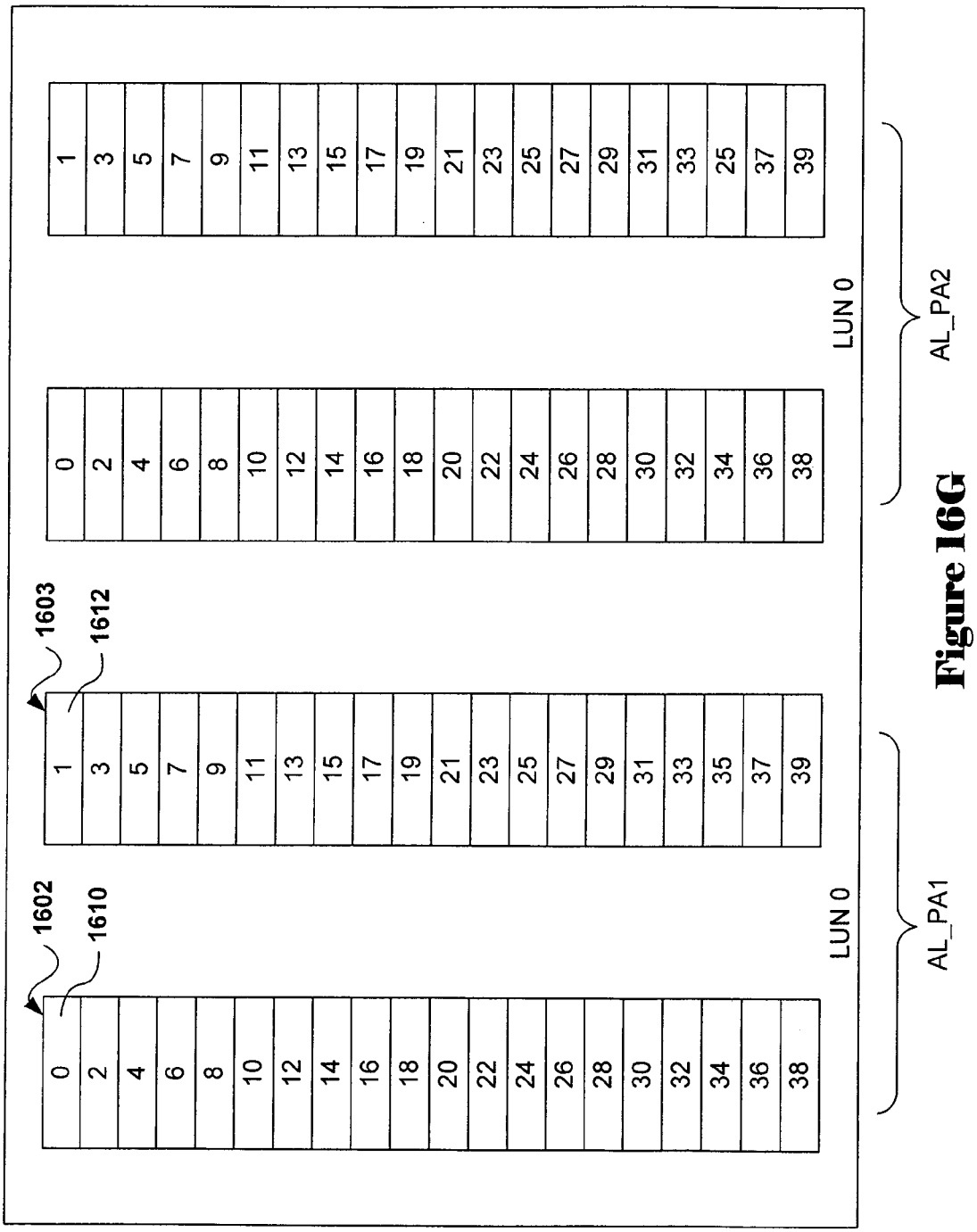

A final interface is shown in FIG. 16G. In this case, as in the previous two interfaces, and each pair of disk drives associated with a single FC node address are considered to constitute a single LUN with a single logical-block-address space. However, at this interface, the logical block addresses alternate between the two disk drives. For example, in the case of the pair of disk drives 1602 and 1603, logical block address 0 is associated with the first logical block 1610 and the first disk drive 1602, and logical block address 1 is associated with the first block 1612 in the second disk drive 1603.

FIGS. 16A-G are meant simply to illustrate certain of the many possible interfaces provided to a disk-array controller by storage-shelf routers that represent, in part, one embodiment of the present invention. Almost any mapping of LUNs and logical block addresses to disk drives and physical blocks within disk drives that can be algorithmically described can be implemented by the storage-shelf routers within a storage shelf. In general, these many different types of logical interfaces may be partitioned into the following four general types of interfaces: (1) transparent mode, in which each disk drive is associated with a separate and locally unique FC node address; (2) pure LUN mode, in which each disk drive is associated with a different LUN number, and all disk drives are accessed through a single FC node address; (3) pure logical-block-addressing mode, in which all disk drives are associated with a single FC node address and with a single logical unit number; and (4) mixed LUN and logical-block-addressing modes that employ various different combinations of LUN and logical-block-address-space partitionings.

Storage-Shelf Router Implementation

Figure 17A:
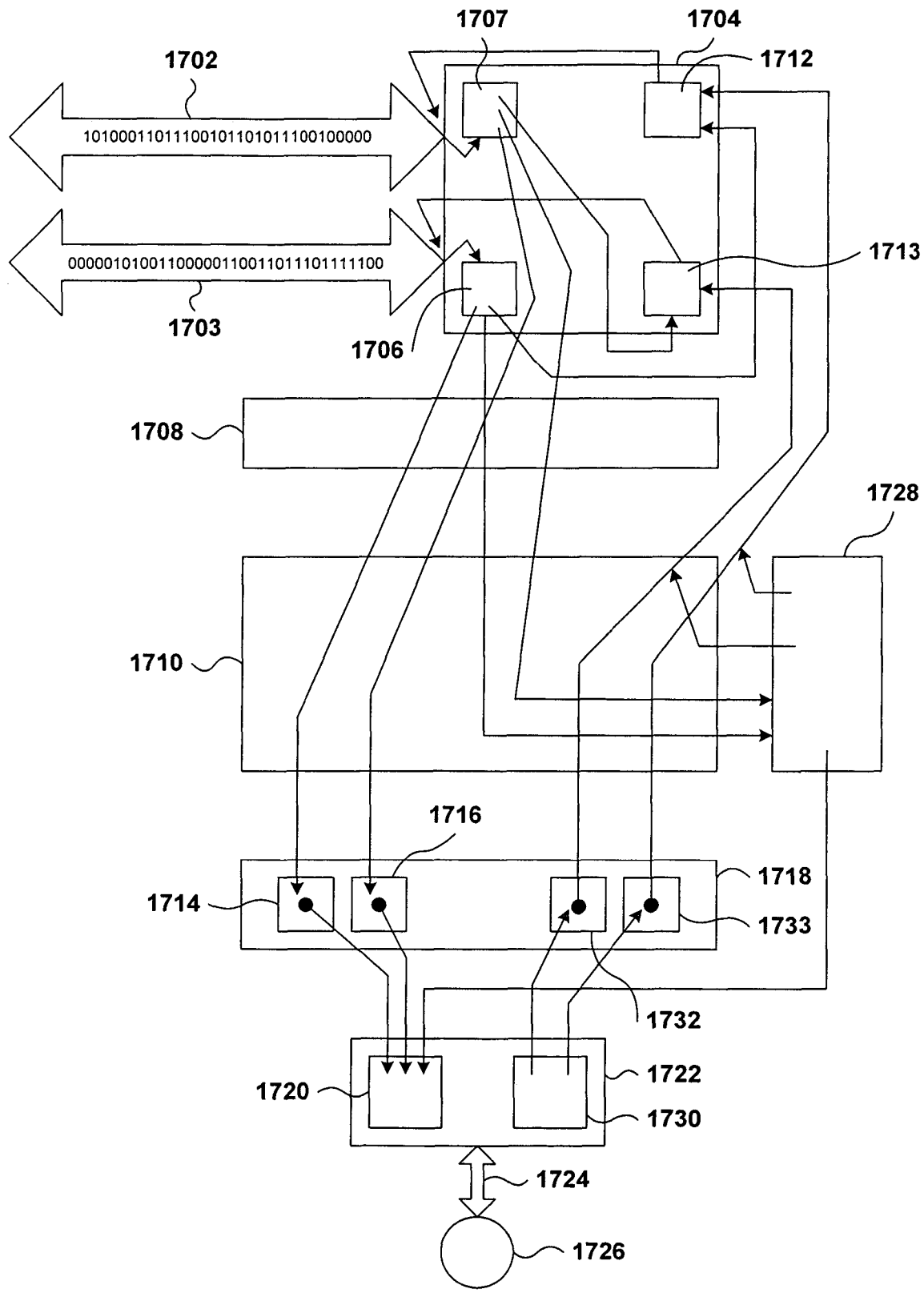
FIGS. 17A-F illustrate the flow of data and control information through the storage-shelf router that represents one embodiment of the present invention.

FIG. 17A is a high-level overview of the command-and-data flow within the storage-shelf router that represents one embodiment of the present invention. The storage-shelf router exchanges serial streams of data and commands with other storage-shelf routers and with a disk-array controller via one or more FC arbitrated loops or other FC fabrics 1702-1703. The serial streams of data enter FC port layer 1704, where they are processed at lower-level FC protocol levels. FC frames extracted from the data streams are input into first-in-first-out buffers ("FIFOs") 1706-1707. As the initial portions of FC frames become available, they are processed by the routing layer 1708 and FCP-layer 1710, even as latter portions of the FC frames are input into the FIFOs. Thus, the FC frames are processed with great time and computing efficiency, without needing to be fully assembled in buffers and copied from internal memory buffer to internal memory buffer.

The routing layer 1708 is responsible for determining, from FC frame headers, whether the FC frames are directed to the storage router, or to remote storage routers or other entities interconnected with the storage router by the FC arbitrated loops or other FC fabrics. Those frames directed to remote entities are directed by the routing layer to output FIFOs 1712-1713 within the FC-port layer for transmission via the FC arbitrated loops or other FC fabrics to the remote entities. Frames directed to the storage router are directed by the routing layer to the FCP-layer, where state machines control their disposition within the storage-shelf router.

FCP-DATA frames associated with currently active FC exchanges, for which contexts have been established by the storage-shelf router, are processed in a highly stream-lined and efficient manner. The data from these frames is directed by the FCP-layer to virtual queues 1714-1716 within the GSMS 1718, from which the data is transferred to an input buffer 1720 within the SATA-port layer 1722. From the SATA-port layer, the data is transmitted in ATA packets via one of many SATA links 1724 to one of the number of SATA disk drives 1726 interconnected with the storage-shelf router.

FCP-CMND frames are processed by the FCP-layer in a different fashion. These frames are transferred by the FCP-layer to a memory 1728 shared between the FCP-layer and the CPUs within the storage-shelf router. The CPUs access the frames in order to process the commands contained within them. For example, when an incoming WRITE command is received, a storage-shelf-router CPU, under control of firmware routines, needs to determine to which SATA drive the command is directed and establish a context, stored in shared memory, for the WRITE operation. The CPU needs to prepare the SATA drive to receive the data, and direct transmission of an FCP-XFER-RDY frame back to the initiator, generally the disk-array controller. The context prepared by the CPU and stored in shared memory allows the FCP-layer to process subsequent incoming FCP-DATA messages without CPU intervention, streamlining execution of the WRITE operation.

The various logical layers within the storage-shelf router function generally symmetrically in the reverse direction. Responses to ATA commands are received by the SATA-port layer 1722 from SATA disk drives via the SATA links. The SATA-port layer then generates the appropriate signals and messages, to enable a CPU, under firmware control, or the FCP-layer to carry out the appropriate actions and responses. When data is transferred from an SATA disk to a remote entity, in response to a READ command, a CPU generates an appropriate queue entry that is stored in shared memory for processing by the FCP-layer. State machines within the FCP layer obtain, from shared memory, an FC frame header template, arrange for data transfer from an output buffer 1730 in the SATA port layer, via a virtual queue 1732-1733, prepare an FC frame header, and coordinate transfer of the FC frame header and data received from the SATA port layer to output FIFOs 1712 and 1713 of the FC-port layer for transmission to the requesting remote entity, generally a disk-array controller.

FIG. 17A is intended to provide a simplified overview of data and control flow within the storage-shelf router. It is not intended to accurately portray the internal components of the storage-shelf router, but rather to show the interrelationships between logical layers with respect to receiving and processing FCP-CMND and FCP-DATA frames. For example, a number of virtual queues are shown in FIG. 17A within the GSMS layer. However, virtual queues are generally not static entities, but are dynamically allocated as needed, depending on the current state of the storage-shelf router. FIG. 17A shows only a single SATA serial connection 1724 and SATA disk drive 1726, but, as discussed above, each storage router may be connected to 16 different SATA disk drives, in one embodiment.

Figure 17B:
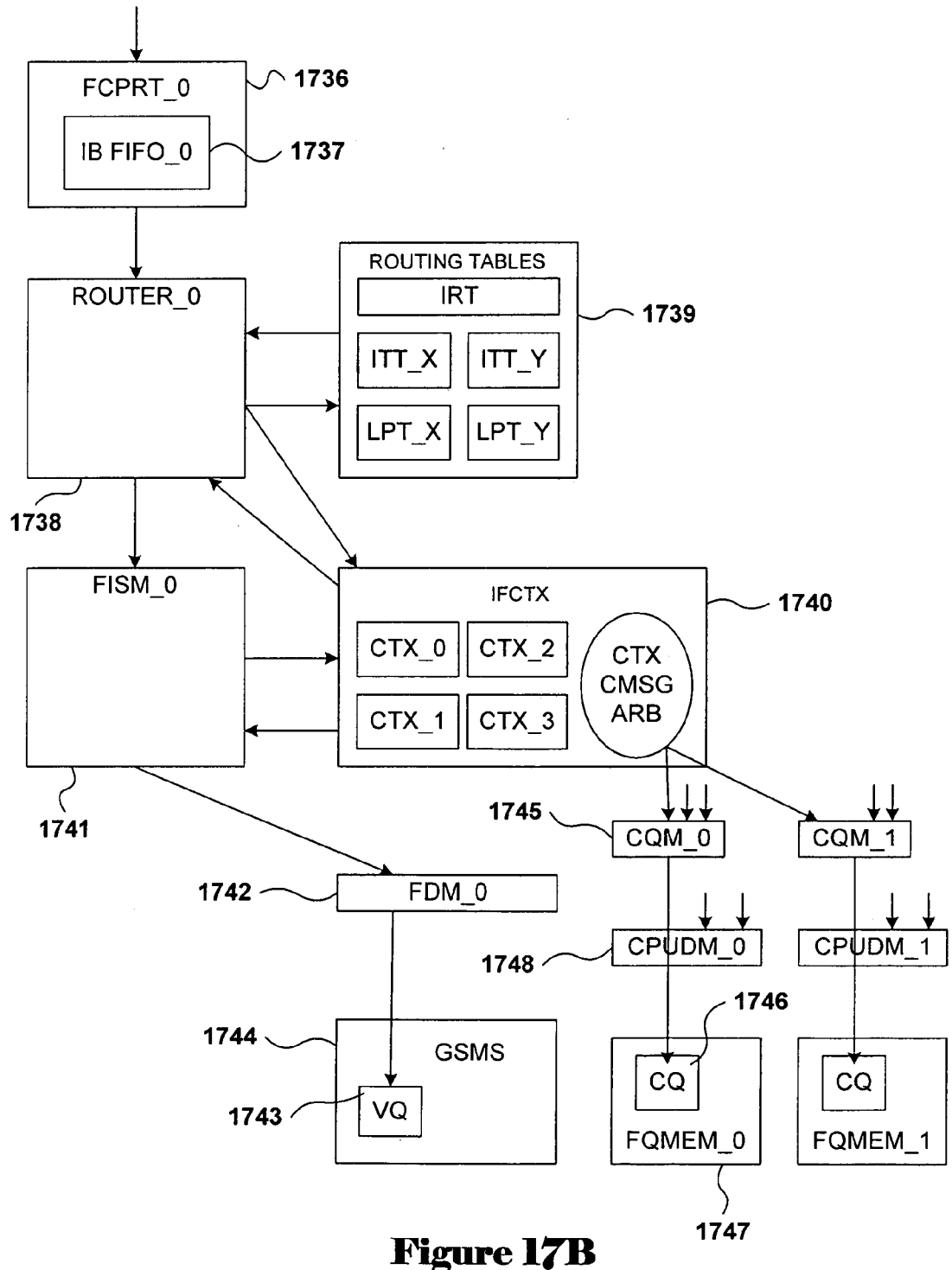

FIGS. 17B-F provide greater detail about the flow of data and control information through the storage-shelf router that represents one embodiment of the present invention. In describing FIGS. 17B-F, specific reference to both components of various pairs of identical components is not made, in the interest of brevity. The figures are intended to show how data and control information moves through various components of the storage-shelf router, rather than as a complete illustrated list of components. Moreover, the numbers of various components may vary, depending on various different implementations of the storage-shelf router. FIG. 17B shows the initial flow of FCP-DATA frames within the storage-shelf router. The FCP-DATA frame is first received by an FC port 1736 and written to an input FIFO 1737, from which it may be begun to be processed by the router logic 1738 as soon as sufficient header information is available in the input FIFO, even while the remainder of the FCP-DATA frame is still being written to the input FIFO. The FC port signals arrival of a new frame to the router logic to enable the router logic to begin processing the frame. The router logic 1738 employs routing tables 1739 to determine whether or not the frame is directed to the storage-shelf router, or whether the frame is directed to remote entity. If the FCP-DATA frame is directed to a remote entity, the frame is directed by the router logic to an FC port for transmission to the remote entity. The router also interfaces with context logic 1740 to determine whether or not a context has been created and stored in shared memory by a CPU for the FC exchange to which the FCP-DATA frame belongs. If a context for the frame can be found, then the router logic directs the frame to the FCP Inbound Sequence Manager ("FISM") state machine 1741. If a context is not found, the frame is directed to shared memory, from which it is subsequently extracted and processed as an erroneously received frame by a CPU under firmware control.

The DISM 1741 requests a GSMS channel from an FCP data mover logic module ("FDM") 1742, which, in turn, accesses a virtual queue ("VQ") 1743 within the GSMS 1744, receiving parameters characterizing the VQ from the context logic via the FISM. The FDM then writes the data contained within the frame to the VQ, from which it is pulled by the SATA port that shares access to the VQ with the FDM for transmission to an SATA disk drive. Once the data is written to the VQ, the FDM signals the context manager that the data has been transferred, and the context manager, in turn, requests that a completion queue manager ("CQM") 1745 queues a completion message ("CMSG") to a completion queue 1746 within a shared memory 1747. The CQM, in turn, requests that a CPU data mover ("CPUDM") 1748 write the CMSG into shared memory.

Figure 17C:
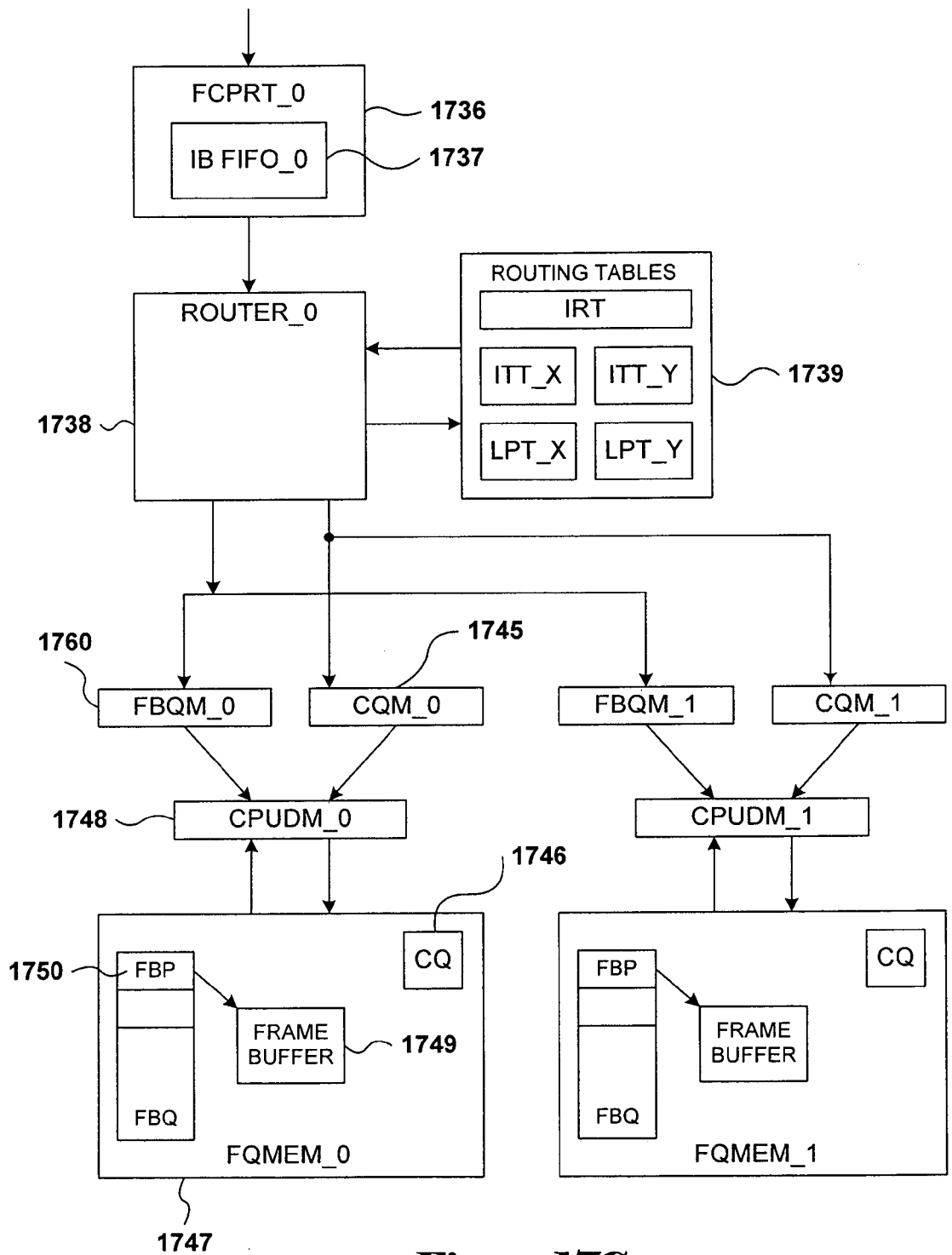

FIG. 17C shows flow of FC-CMND frames, and frames associated with errors, within the storage shelf router. As discussed above, frames are received by an FC port 1736 and directed by router logic 1738, with reference to routing tables 1739, to various target components within the storage-shelf router. FCP-CMND frames and FC frames received in error are routed to shared memory 1747 for extraction and processing by a CPU. The routing logic 1738 issues a request for a frame buffer queue manager ("FBQM") 1746 to write the frame to shared memory 1747. The FBQM receives a buffer pointer, stored in shared memory 1750, from the CPUDM 1748, and writes the frame to a frame buffer 1749 within shared memory 1747. Finally, the router requests the CQM 1745 to write a CMSG to the CQ 1746. A CPU eventually processes the CMSG, using information contained within the CMSG to access the frame stored in a frame buffer 1749.

Figure 17D:
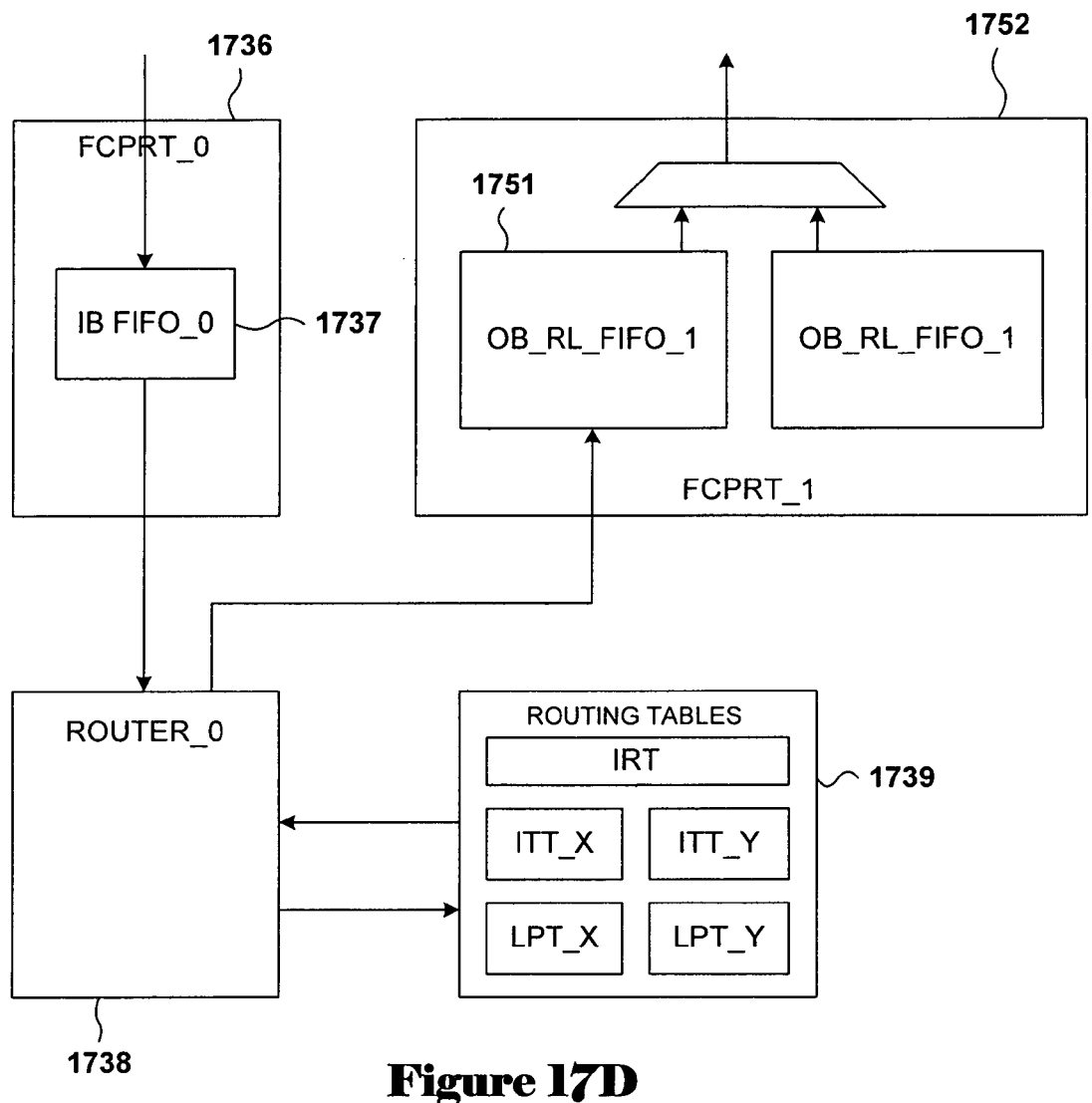

FIG. 17D shows the flow of FC frames from one FC port to another. In the case that the router logic 1736 determines that a frame received via an input FIFO 1737 within a first FC port 1736 is not directed to the storage router, but is instead directed to a remote entity, the router logic writes the frame to an output FIFO 1751 within a second FC port 1752 to transmit the frame to the remote entity.

Figure 17E:
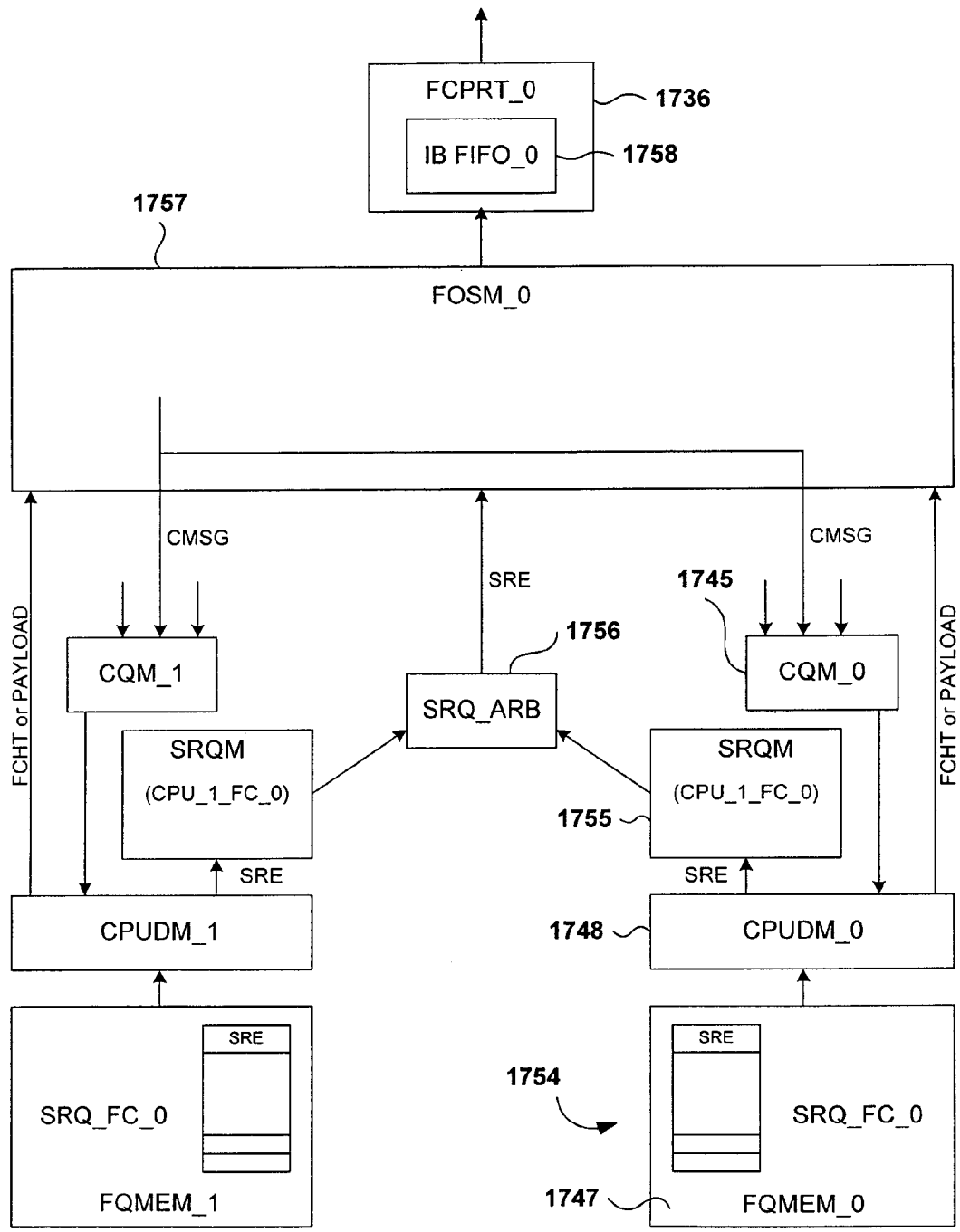

FIG. 17E shows flow of data and control information from a CPU within the storage-shelf router to an FC arbitrated loop or other FC fabric. A CPU, under firmware control, stores an entry within a shared-memory queue SRQ within shared memory 1747 and updates an SRQ producer index associated with the SRQ to indicate the presence of an SRQ entry ("SRE") describing a frame that the CPU has created for transmission to an FC arbitrated loop or other FC fabric. An SRQ manager module ("SRQM") 1755 detects the update of the SRQ producer index, and fetches a next SRE from shared memory 1747 via the CPUDM 1748. The SRQM passes the fetched SRE to an SRQ arbitration module ("SRQ_ARB") 1756, which implements an arbitration scheme, such as a round-robin scheme, to ensure processing of SREs generated by multiple CPUs and stored in multiple SRQs. The SRQ_ARB selects an SRQM from which to receive a next SRE, and passes the SRE to a FCP outbound sequence manager ("FOSM") state machine 1757. The FOSM processes the SRE to fetch an FC header template and frame payload from shared memory 1747 via the CPUDM 1748. The FOSM constructs an FC frame using the FC header template and a frame payload via the CPUDM from shared memory and writes it to an output FIFO 1758 in an FC port 1736, from which it is transmitted to an FC arbitrated loop or other FC fabric. When the frame has been transferred to the FC port, the FOSM directs the CQM 1745 to write a CMSG to shared memory.

Figure 17F:
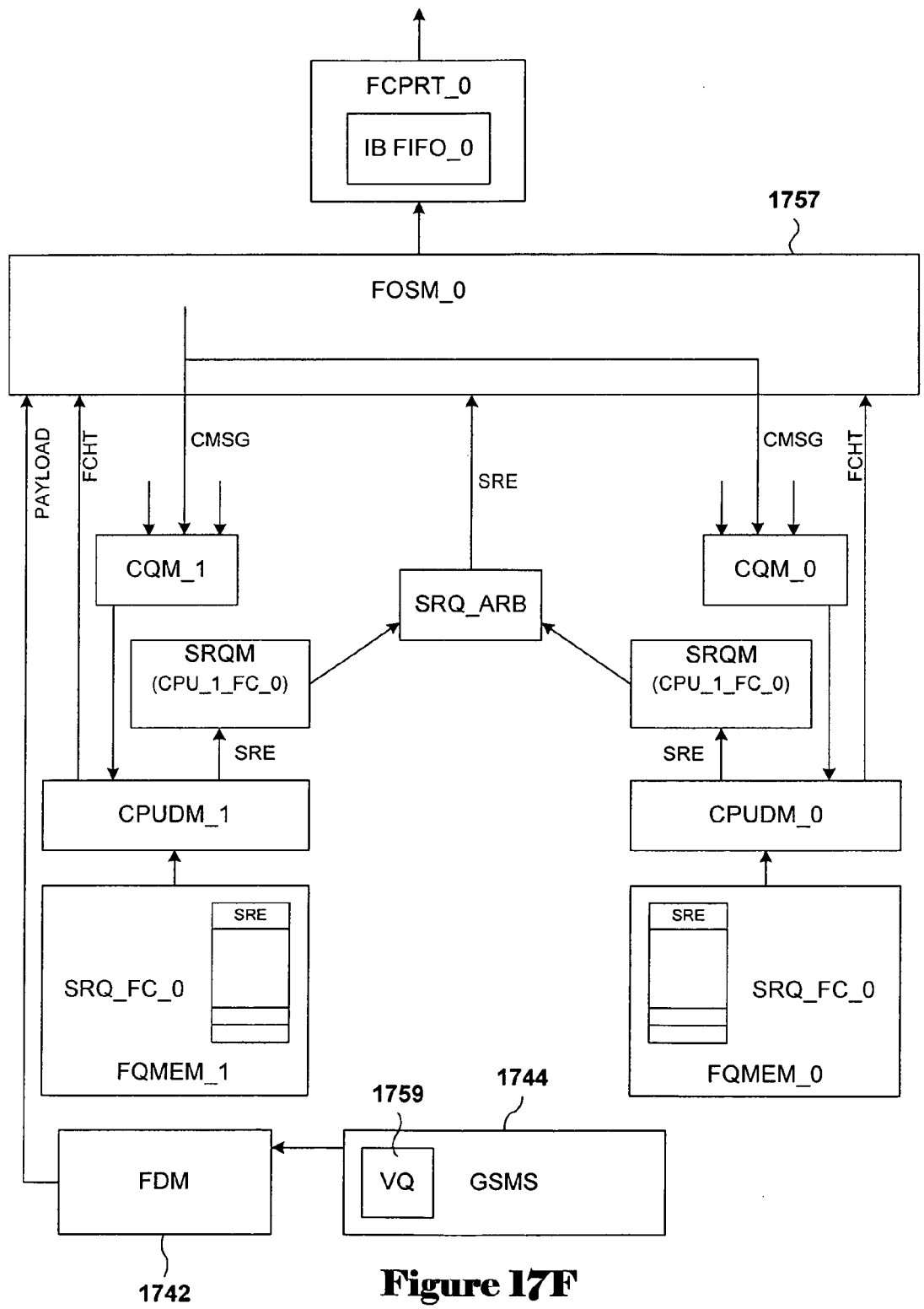

FIG. 17F shows the flow of data and control information from the GSMS and shared memory to an FC arbitrated loop or other FC fabric. Many of the steps in this process are similar to those described with reference to FIG. 17E, and will not be again described, in the interest of brevity. In general, the control portion of an FCP-DATA frame, stored within the FC-frame header, is generated in similar fashion to generation of any other type of frame, described with reference to FIG. 17E. However, in the case of an FCP-DATA frame, the process needs to be staged in order to combine the control information with data obtained through the GSMS from an SATA port. When the FOSM 1757 receives the SRE describing the FCP-DATA frame, the FOSM must construct the FCP-DATA-frame header, and request the data that is incorporated into the frame via a GSMS channel through the FDM 1742, which, in turn, obtains the data via a VQ 1759 within the GSMS 1744. Once the data and control information are combined by the FOSM into an FCP-DATA frame, the frame is then passed to an FC port, and a CMSG message queued to the CQ, as described previously.

Figure 18:
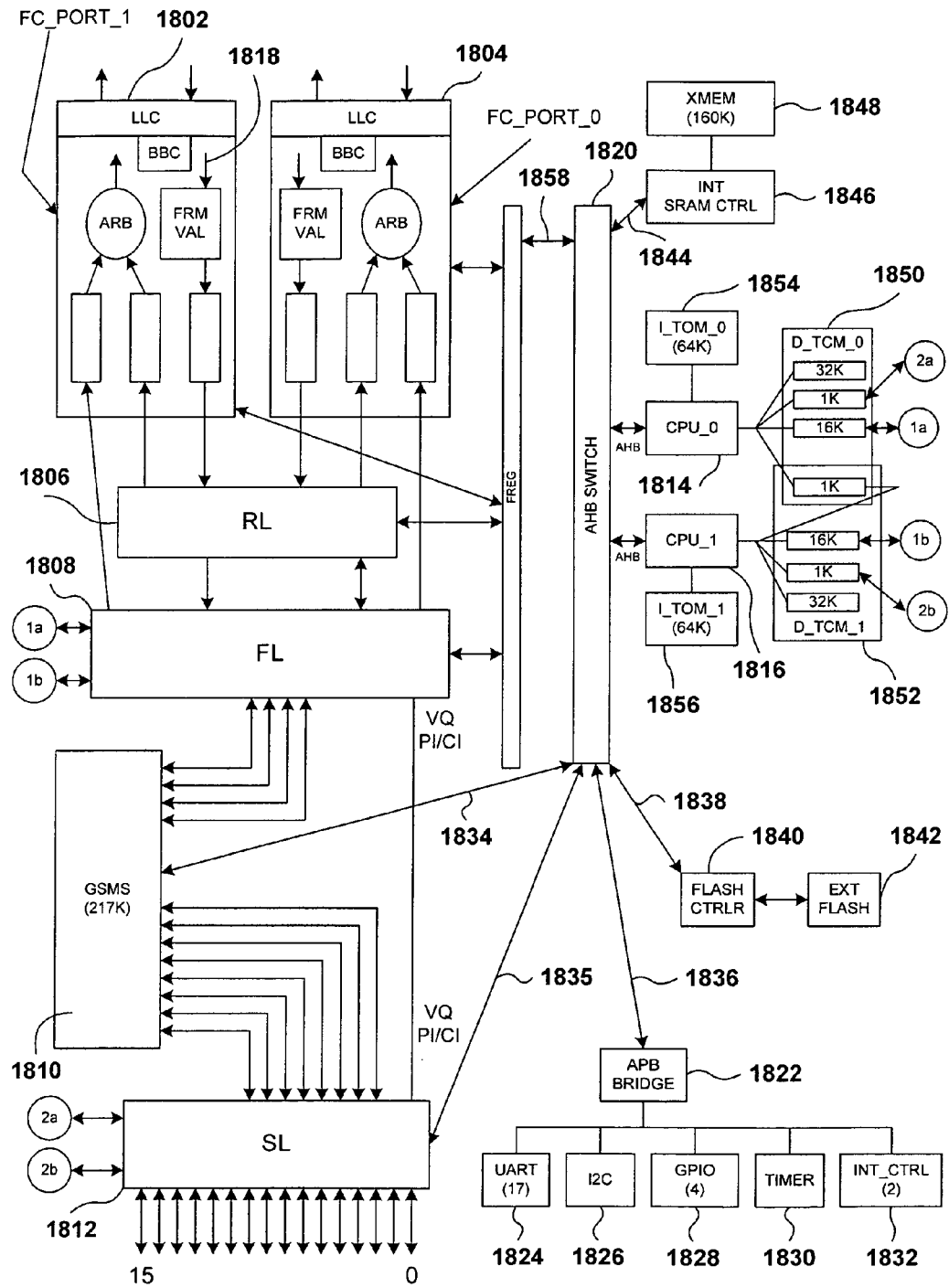
FIG. 18 shows a more detailed block-diagram representation of the logical components of a storage-shelf router that represents one embodiment of the present invention.

FIG. 18 shows a more detailed block-diagrammed view of the logical components of a storage-shelf router that represents one embodiment of the present invention. The logical components include two FC ports 1802 and 1804, the routing layer 1806, the FCP layer 1808, the GSMS 1810, the SATA-port layer 1812, and the CPU complex, including two CPUs 1814 and 1816, described above, with respect to FIGS. 16 and 17. The communications paths and links shown in FIG. 18 with bold arrows, such as bold arrow 1818, represent the performance-critical communications pathways within the storage-shelf router. The performance-critical pathways are those pathways concerned with receiving and outputting FC frames, processing received frames in order to generate appropriate ATA commands for transmission by SATA ports to SATA disk drives, funneling data from received FCP-DATA frames through the GSMS to SATA ports, generation of FC frames for transmission through FC ports to an FC arbitrated loop or other FC fabric, and incorporating data obtained from SATA ports through the GSMS into outgoing FCP-DATA frames. Non-performance-critical pathways include various programmed I/O interfaces that interconnect the CPUs 1814 and 1816 directly with the various logical components of the storage-shelf router. For example, there are PIO interfaces between a central arbitration switch 1820 and the GSMS, SL-port layer, and an internal BUS bridge 1822 in turn interconnected with 17 UART ports 1824, an I²C BUS interface 1826, a general PIO interface ("GPIO") 1828, a timer component 1830, and several interrupt controllers 1832. These PIO interfaces are shown in FIG. 18 as non-bolded, double-headed arrows 1834-1836. In addition, there is a PIO interface 1838 between the CPUs 1814 and 1816 and a flash-memory controller 1840 that, in turn, interfaces to an external flash memory 1842. The external flash memory is used to store specialized configuration management information and firmware images. The CPUs are connected through another PIO interface 1844 to an internal SRAM controller 1846 that, in turn interfaces an SRAM memory 1848 that stores non-performance path code and data, including firmware routines for directing fail-over within and between storage-shelf routers. The CPUs 1814 and 1816 are interconnected with the FCP layer 1808 and the SATA-port layer 1812 via shared memory queues contained in two data-tightly-coupled memories 1850 and 1852, also used for processor data space. Each CPU is also interconnected with a separate memory that stores firmware instructions 1854 and 1856. Finally, both CPUs are connected via a single PIO channel 1858 to both FC ports 1802 and 1804, the routing layer 1806, and the FCP layer 1808.

Figure 19:
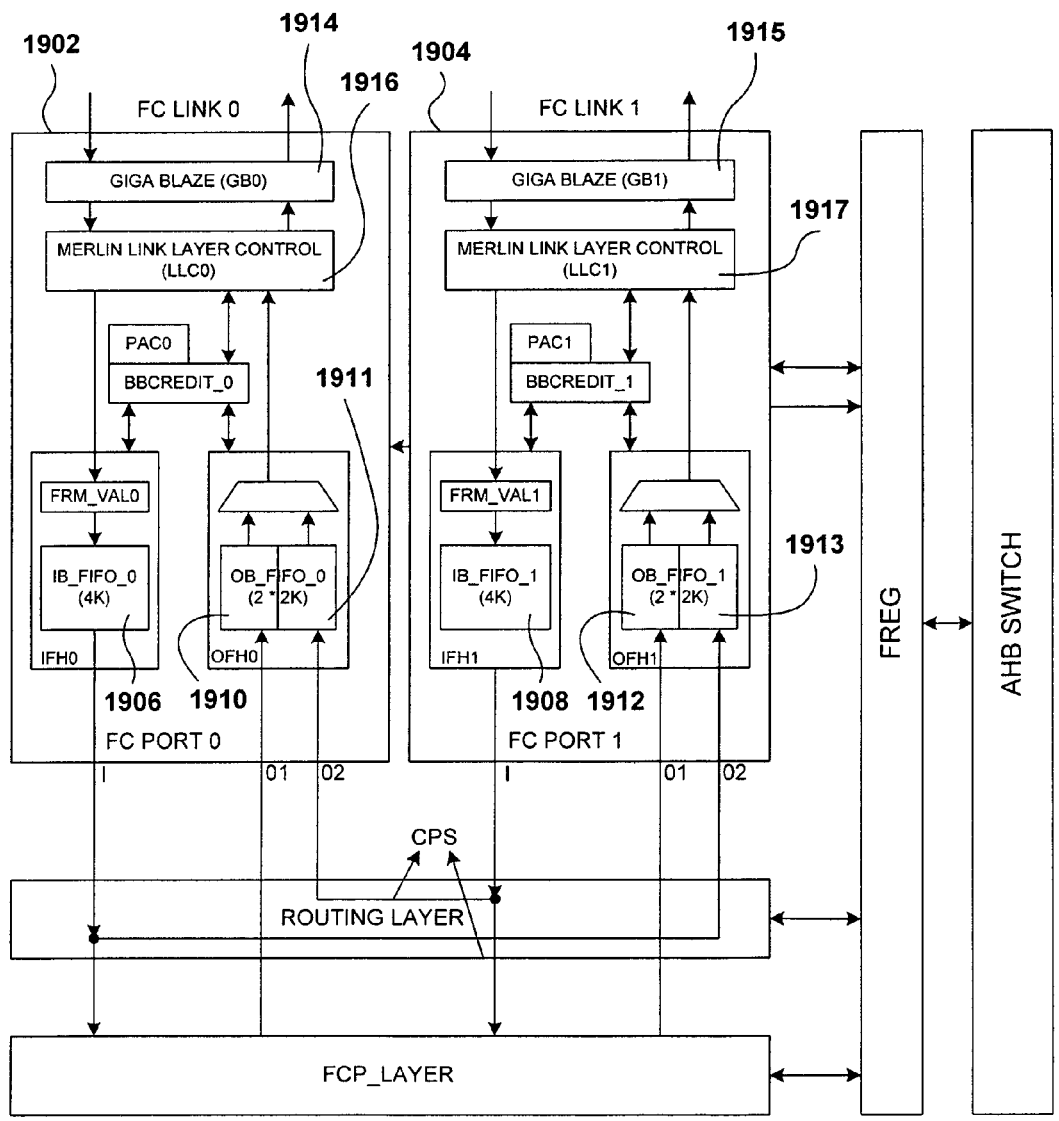
FIG. 19 shows a more detailed diagram of the FC-port layer.

FIG. 19 shows a more detailed diagram of the FC-port layer. The FC-port layer comprises two FC ports 1902 and 1904, each of which includes an input FIFO 1906 and 1908 and two output FIFOs 1910-1911 and 1912-1913. The FC ports include physical and link layer logic 1914-1917 that together transform incoming serial data from an FC arbitrated loop or other FC fabric into FC frames passed to the input FIFOs and that transform outgoing FC frames written to output FIFOs into serial data transmitted to the FC arbitrated loop.

Figure 20:
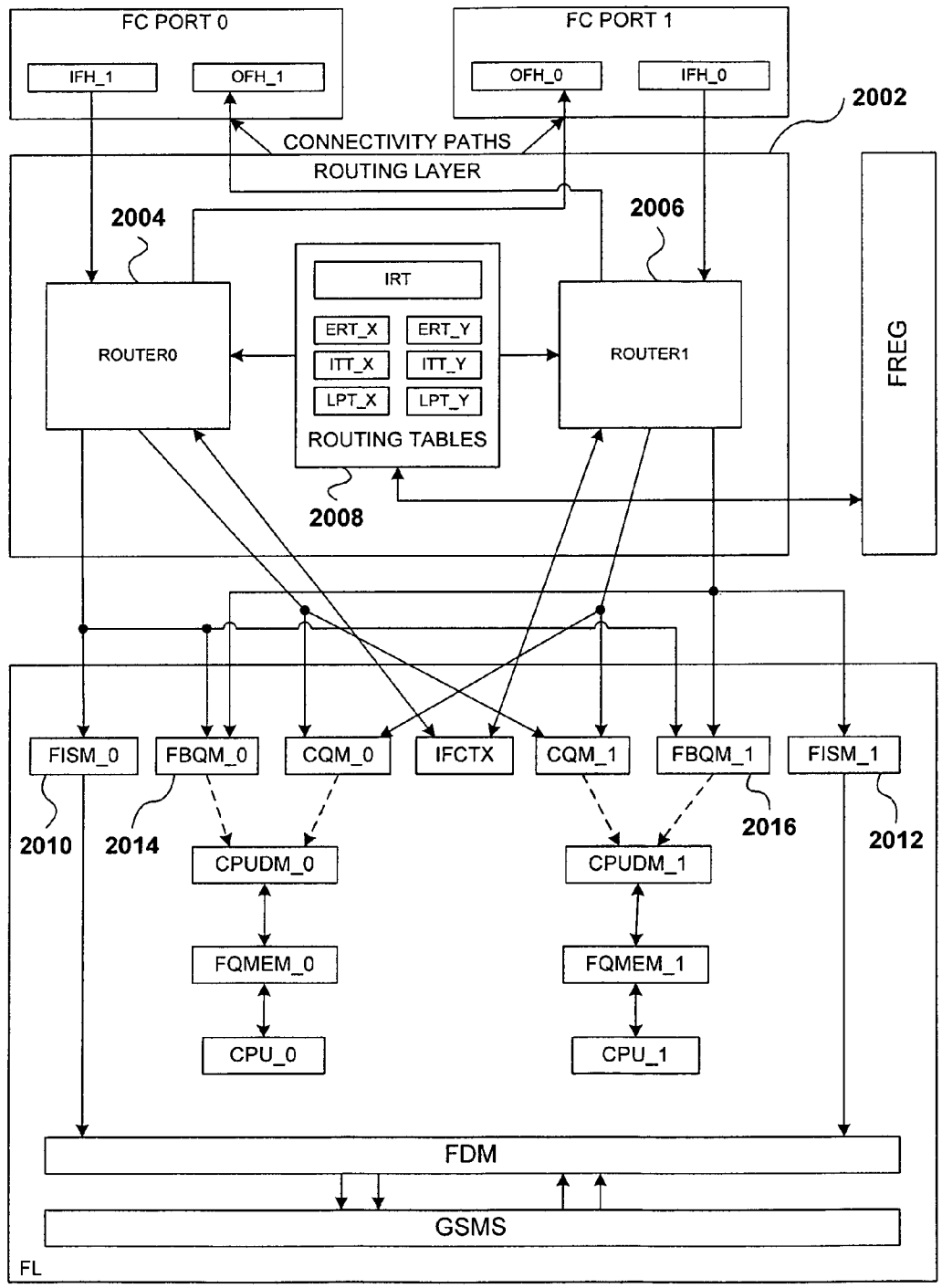
FIG. 20 is a more detailed block-diagram representation of the routing layer.

FIG. 20 is a more detailed block-diagram representation of the routing layer. As shown in FIG. 20, the routing layer 2002 includes separate routing logic 2004 and 2006 for handling each of the FC ports. The routing layer also includes routing tables 2008 stored in memory to facilitate the routing decisions needed to route incoming FC frames to appropriate queues. Note that FC data frames can be relatively directly routed by the routers to the GSMS layer 2015 under control of the FISMs 2010 and 2012 via the FDM 2011, as described above. Frames requiring firmware processing are routed by the routing layer to input queues under control of the FBQMs 2014 and 2016 via the CPUDMs 2017 and 2018.

Figure 21:
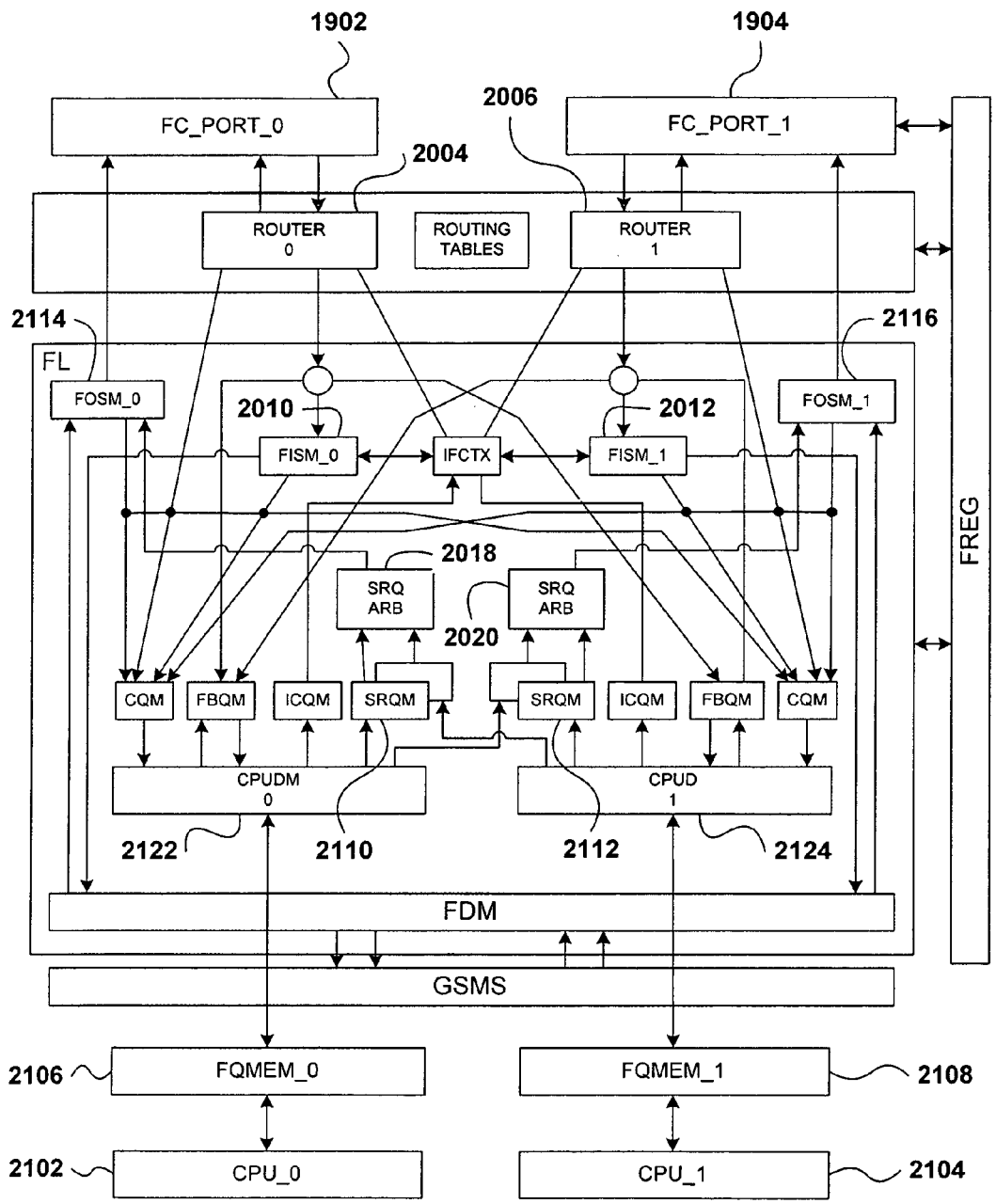
FIG. 21 is a more detailed block-diagram representation of the FCP layer.

FIG. 21 is a more detailed block-diagram representation of the FCP layer. Many of these internal components shown in FIG. 21 have been described previously, or are described in more detail in subsequent sections. Note that there are; in general, duplicate sets of components arranged to handle, on one hand, the two FC ports 1902 and 1904, and, on the other hand, the two CPUs 2102 and 2104. Information needed to generate outgoing frames is generated by the CPUs, under firmware control, and stored in shared memories 2106 and 2108, each associated primarily with a single CPU. The stored information within each memory is then processed by separate sets of SRQMs 2110 and 2112, FOSMs 2114 and 2116, SRQ_ARBS 2118 and 2120, CPUDMs 2122 and 2124, and other components in order to generate FC frames that are passed to the two FC ports 1902 and 1904 for transmission. Incoming frames at each FC port are processed by separate router modules 2004 and 2006, FISMs 2010 and 2012, and other components.

Figure 22:
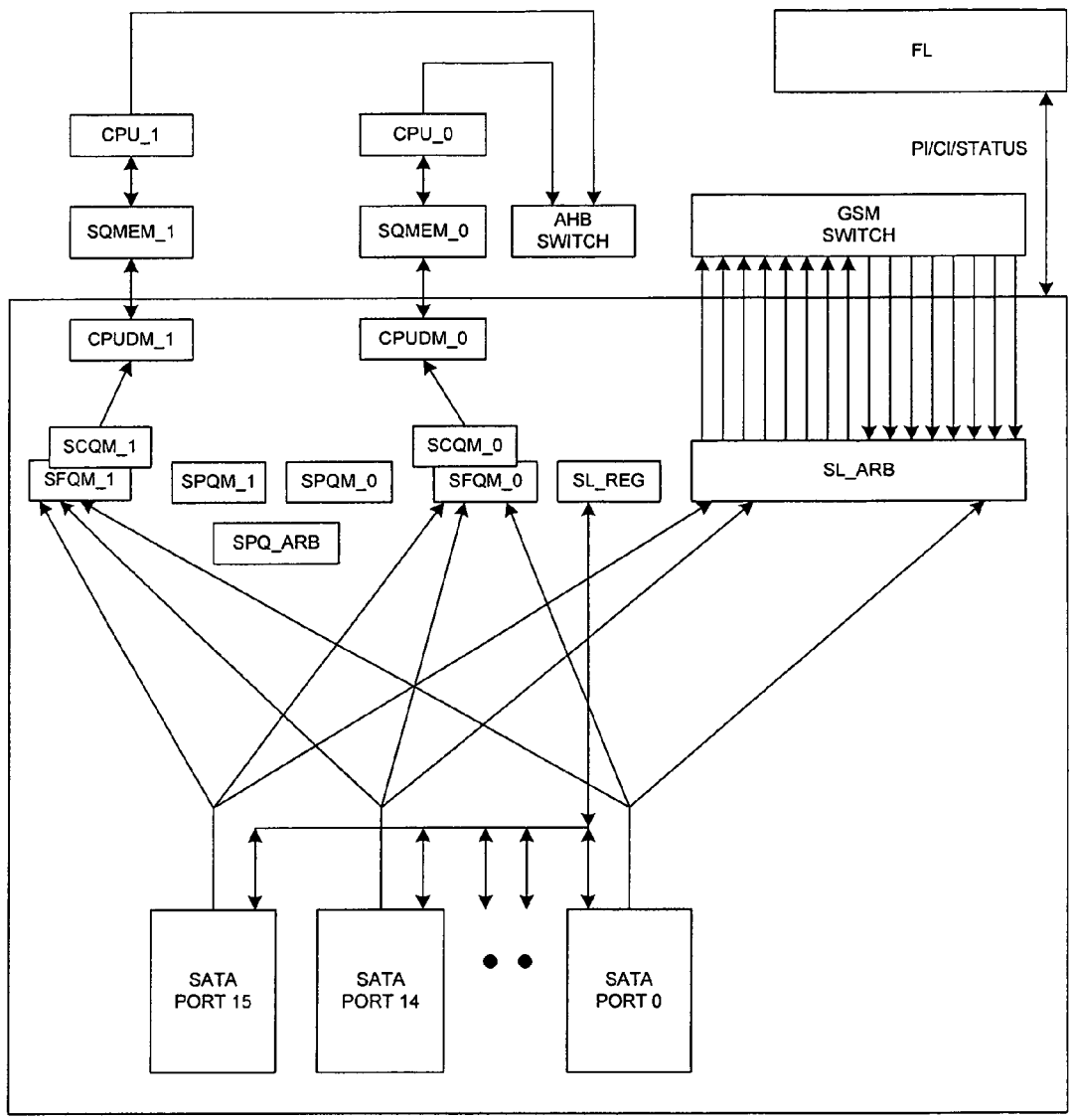
FIG. 22 shows a more detailed block-diagram representation of the SATA-port layer.

FIG. 22 shows a more detailed block-diagram representation of the SATA-port layer. The primary purpose of the SATA-port layer is for virtual queue management, a task shared between the SATA-port layer, the GSMS, and the FCP layer, and for exchange of data with the FCP layer through the GSMS and individual SATA ports.

Figure 23:
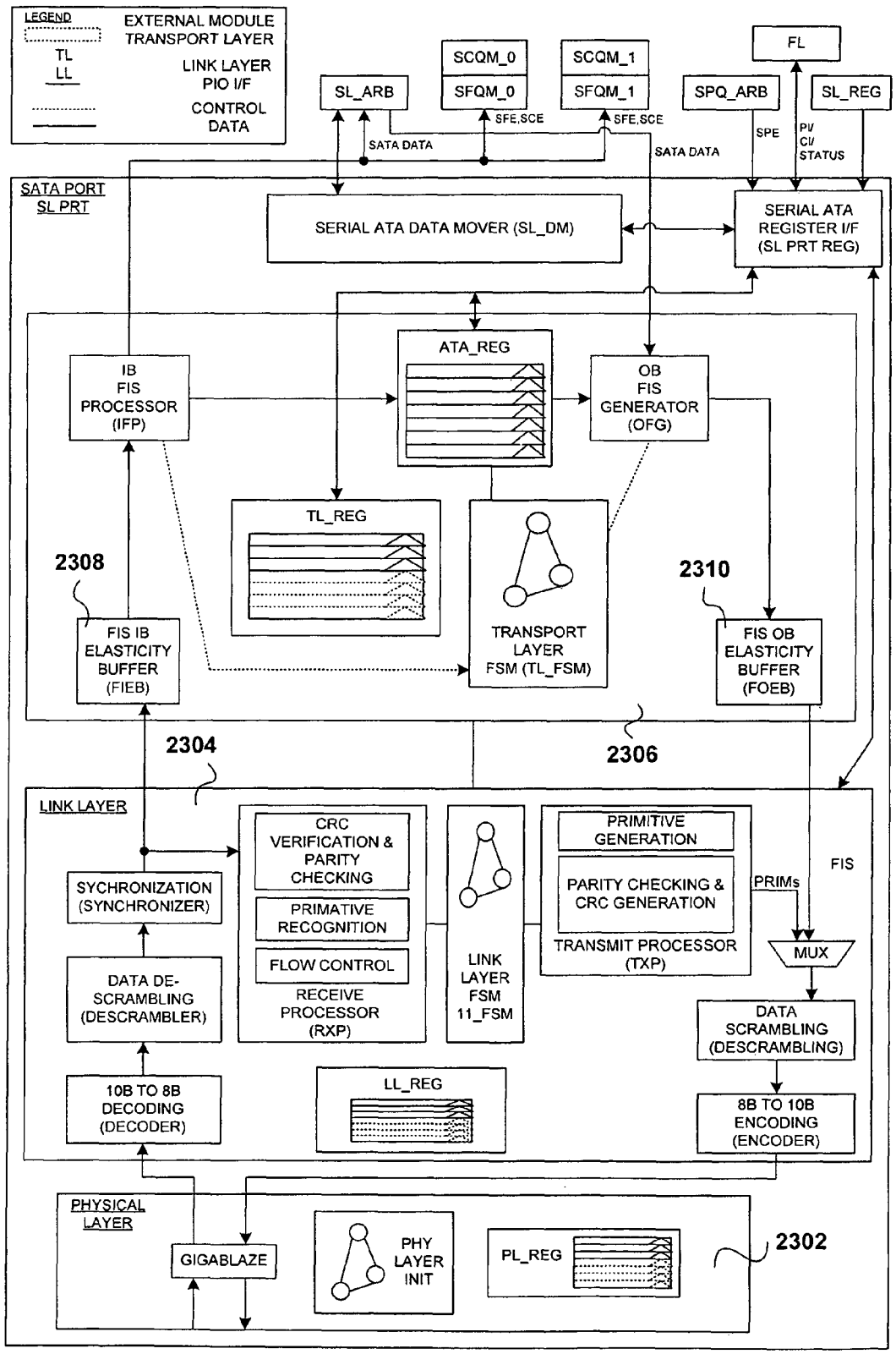
FIG. 23 is a more detailed, block-diagram representation of an SATA port.

FIG. 23 is a more detailed, block-diagram representation of an

SATA port. The SATA port includes a physical layer 2302, a link layer 2304, and a transport layer 2306 that together implement an SATA interface. The transport layer includes an input buffer 2308 and an output buffer 2310 that store portions of data transfers and ATA message information arriving from an interconnected SATA disk, and that store portions of data transfers from the GSMS layer and ATA commands passed from interfaces to CPUs and shared memory, respectively. Additional details regarding the SATA port are discussed in other sections.

Storage-Shelf-Router Routing Layer

Figure 24:
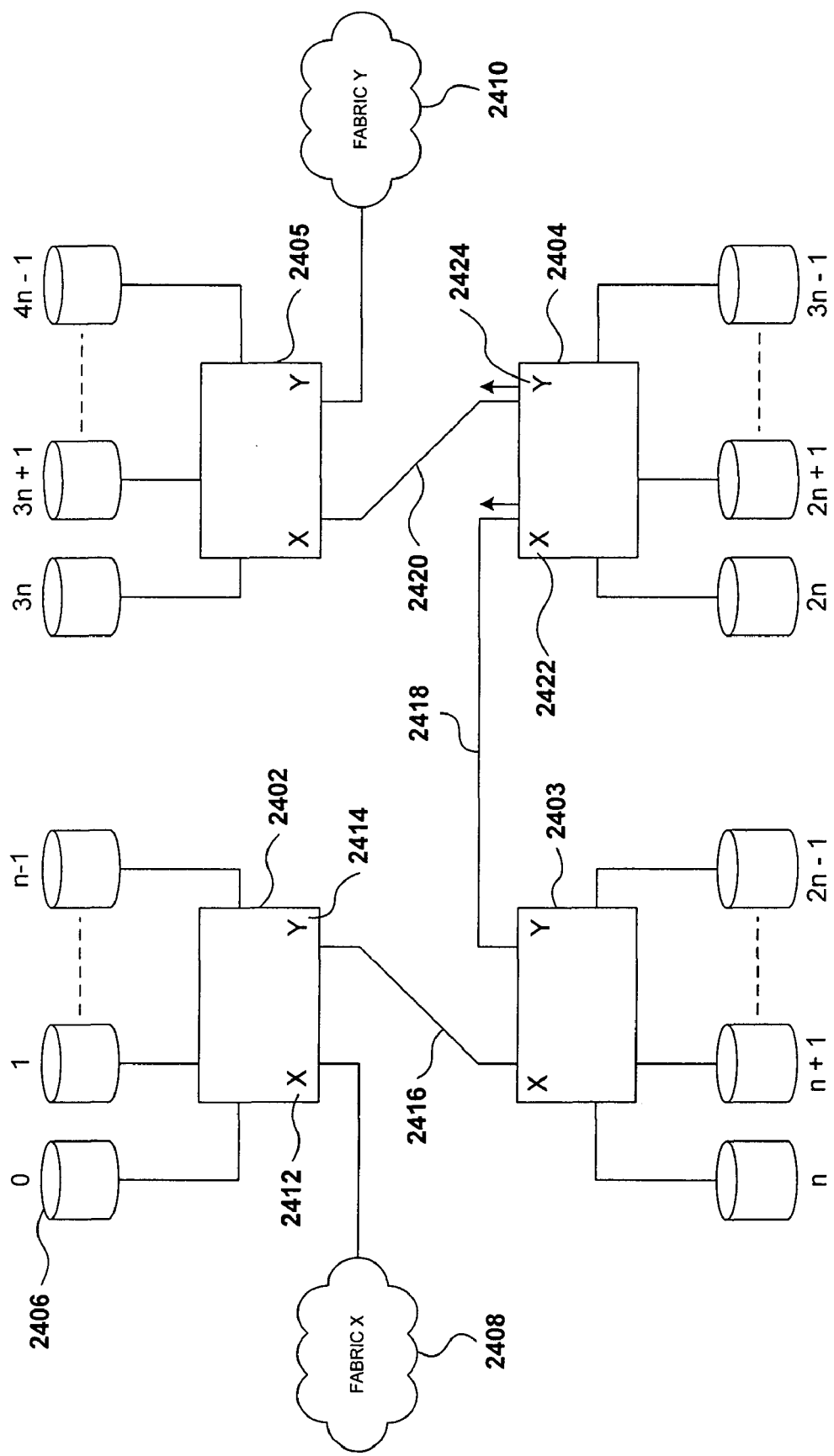
FIG. 24 shows an abstract representation of the routing topology within a four-storage-shelf-router-availability storage shelf.

FIG. 24 shows an abstract representation of the routing topology within a four-storage-shelf-router-high-availability storage shelf. This abstract representation is a useful model and template for discussions that follow. As shown on FIG. 24, each storage-shelf router 2402-2405 is connected via primary links to n disk drives, such as disk drive 2406. As discussed above, each storage-shelf router is connected via secondary links to a neighboring set of n disk drives, although the secondary links are not shown in FIG. 24 for the sake of simplicity. One storage-shelf router 2402 serves as the end point or FC-node connection point for the entire set of storage-shelf routers with respect to a first FC arbitrated loop or other FC fabric, referred to as Fabric X 2408. A different storage-shelf router 2405 serves as the end point, or FC node connection to a second FC arbitrated loop or other FC referred to as Fabric Y. Each storage-shelf router includes two FC ports, an X port and a Y port, as, for example, X port 2412 and Y port 2414 in storage-shelf router 2402. The four storage-shelf routers are interconnected with internal point-to-point FC links 2416, 2418, and 2420. For any particular storage-shelf router, as for example, storage-shelf router 2404, FC frames incoming from Fabric X are received on the X port 2422 and FC frames output by storage-shelf router 2404 to Fabric X are output via the X port 2422. Similarly, incoming FC frames and outgoing FC frames are received from, and directed to, the Y Fabric, respectively, are input and output over the FC port 2424. It should be noted that the assignments of particular FC ports to the X and Y fabrics are configurable, and, although in following illustrative examples and discussions referencing the example FC port 0 is assumed to be the X fabric port and FC port 1 is assumed to be the Y port, an opposite assignment may be configured.

S-fabric management frames, identified as such by a two-bit reserved subfield within the DF_CTL field of an FC-frame header that is used within the S fabric and that is referred to as the "S-bits," are directed between storage-shelf routers via either X ports or Y ports and the point-to-point, internal FC links. Each storage-shelf router is assigned a router number that is unique within the storage shelf, and that, in management frames, forms part of the FC-frame-header D_ID field. The storage-shelf routers are numbered in strictly increasing order, with respect to one of the X and Y fabrics, and strictly decreasing order with respect to the other of the X and Y fabrics. For example, in FIG. 24, storage-shelf routers 2402, 2403, 2404, and 2405 may be assigned router numbers 1, 2, 3, and 4, respectively, and thus may be strictly increasing, or ascending, with respect to the X fabric and strictly decreasing, or descending, with respect to the Y fabric. This ordering is assumed in the detailed flow-control diagrams, discussed below.

Figure 25:
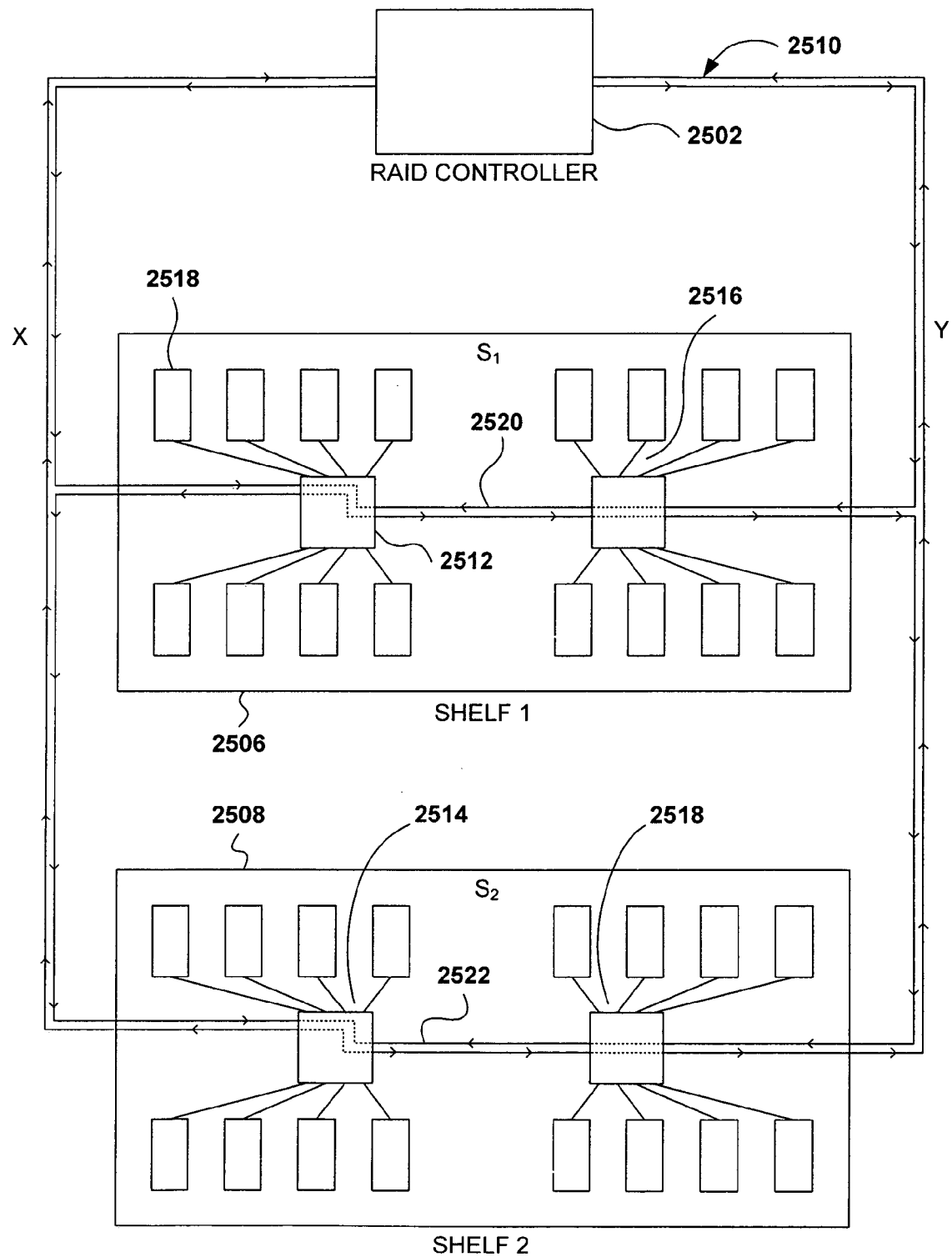
FIG. 25 shows an abstract representation of the X and Y FC arbitrated loop interconnections within a two-storage-shelf-router, two-storage-shelf implementation of a disk array.

FIG. 25 shows an abstract representation of the X and Y FC arbitrated loop interconnections within a two-storage-shelf-router, two-storage-shelf implementation of a disk array. In FIG. 25, the disk-array controller 2502 is linked by FC arbitrated loop X 2504 to each storage shelf 2506 and 2508, and is linked by FC arbitrated loop Y 2510 to both storage shelves 2506 and 2508. In FIG. 25, storage-shelf router 2512 serves as the X-fabric endpoint for storage shelf 2506, and storage-shelf router 2514 serves as the X-fabric endpoint for storage shelf 2508. Similarly, storage-shelf router 2516 serves as the Y-fabric endpoint for storage shelf 2506 and storage-shelf router 2518 serves as the Y-fabric endpoint for storage shelf 2508. Each individual disk drive, such as disk drive 2518, is accessible to the disk-array controller 2502 via both the X and the Y arbitrated loops. In both storage shelves, the storage-shelf routers are internally interconnected via a single point-to-point FC link 2520 and 2522, and the interconnection may carry, in addition to X and Y fabric frames, internally generated and internally consumed management frames, or S-fabric frames. The internal point-to-point FC link within storage shelf 2506 is referred to as the $S_1$ fabric, and the internal point-to-point FC link within storage-shelf router 2508 is referred as the $S_2$ fabric. In essence, the internal point-to-point FC links carry FC frames for the X fabric, Y fabric, and internal management frames, but once X-fabric and Y-fabric frames enter the storage-shelf router through an endpoint storage-shelf router, they are considered S-fabric frames until they are consumed or exported back to the X fabric or Y fabric via an FC port of an endpoint storage-shelf router.

Figure 1A:
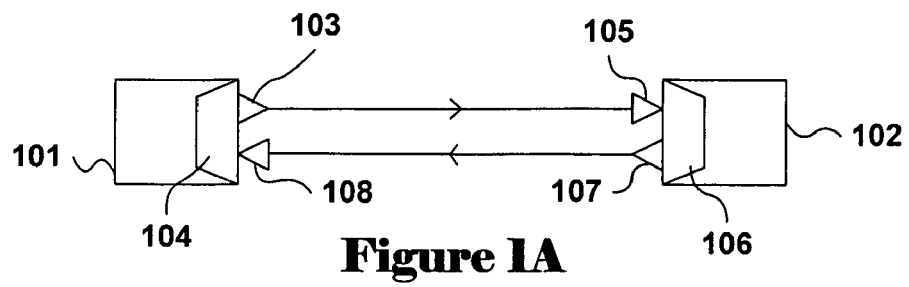
FIGS. 1A-1C shows the three different types of FC interconnection topologies.
Figure 1B:
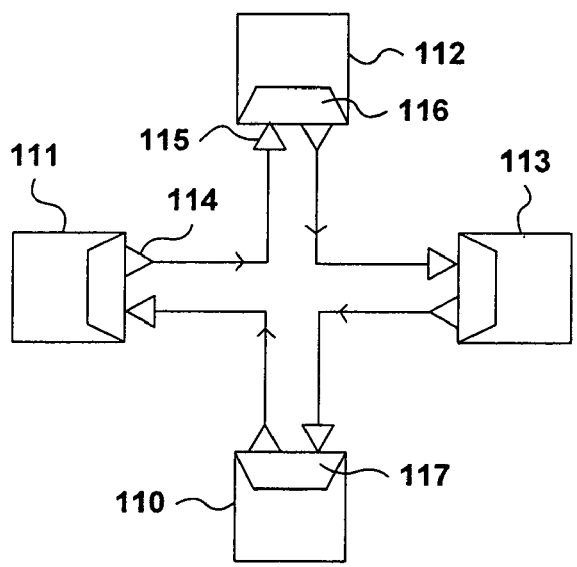
Figure 1C:
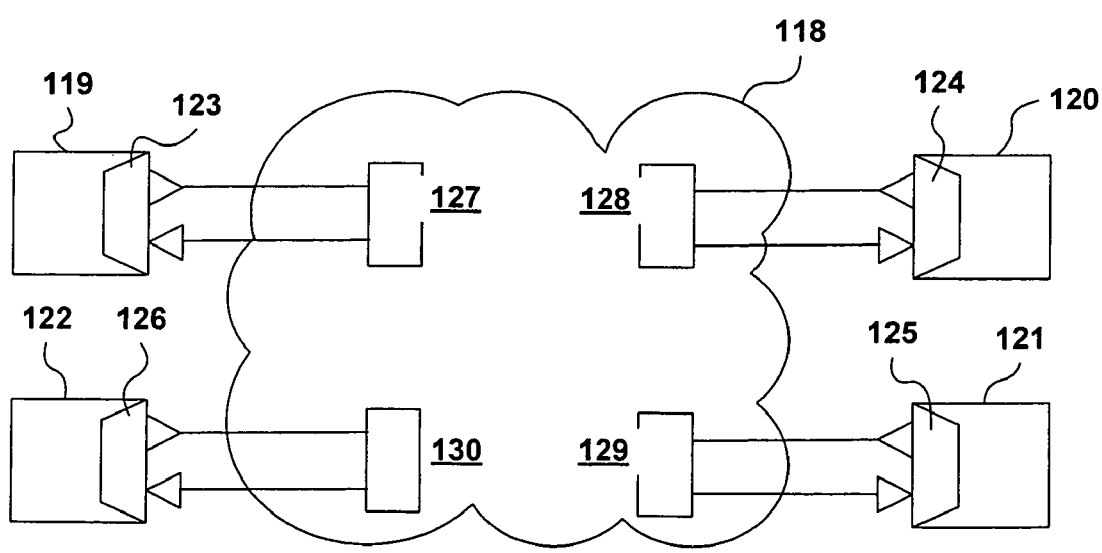
Figure 2:
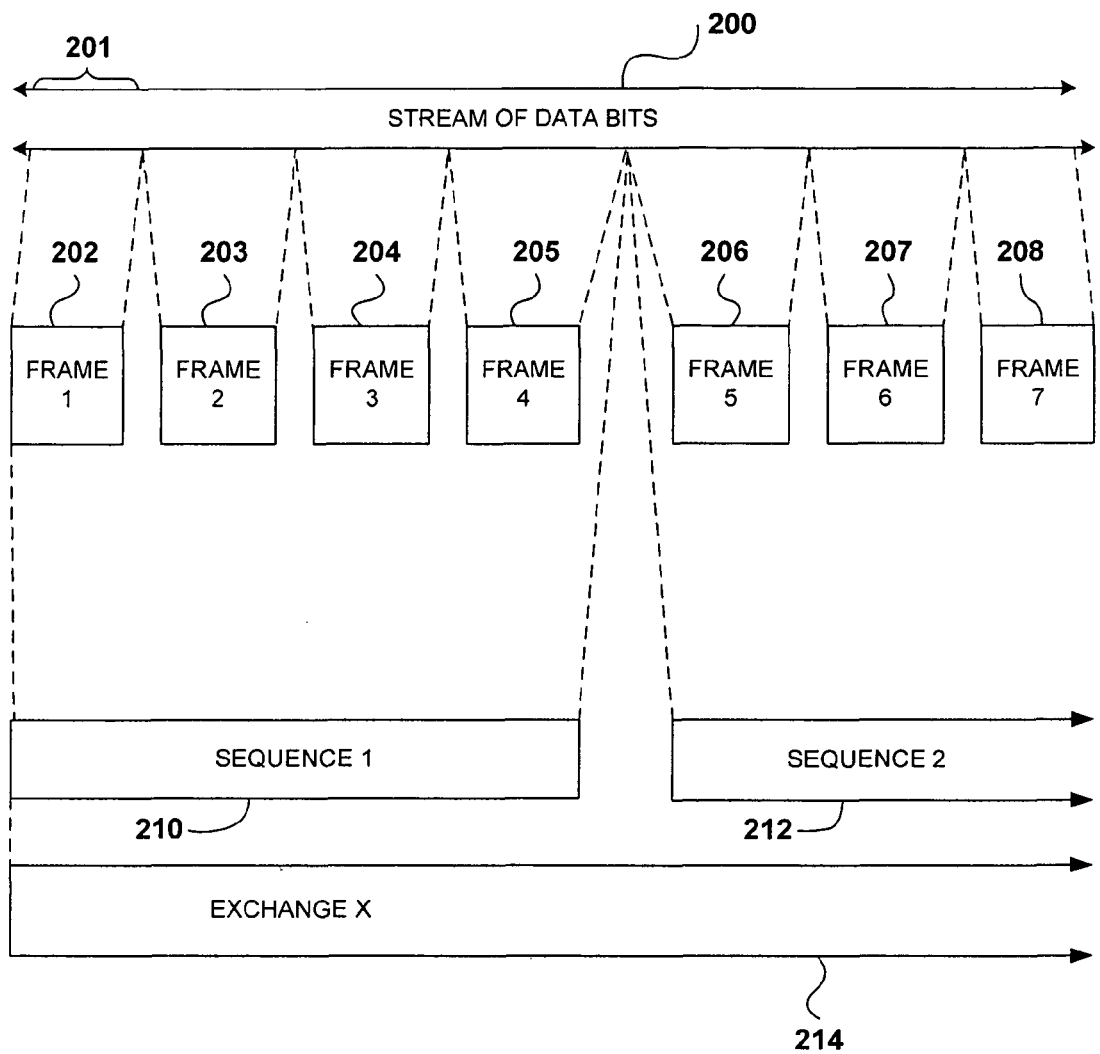
FIG. 2 illustrates a very simple hierarchy by which data is organized, in time, for transfer through an FC network.
Figure 3:
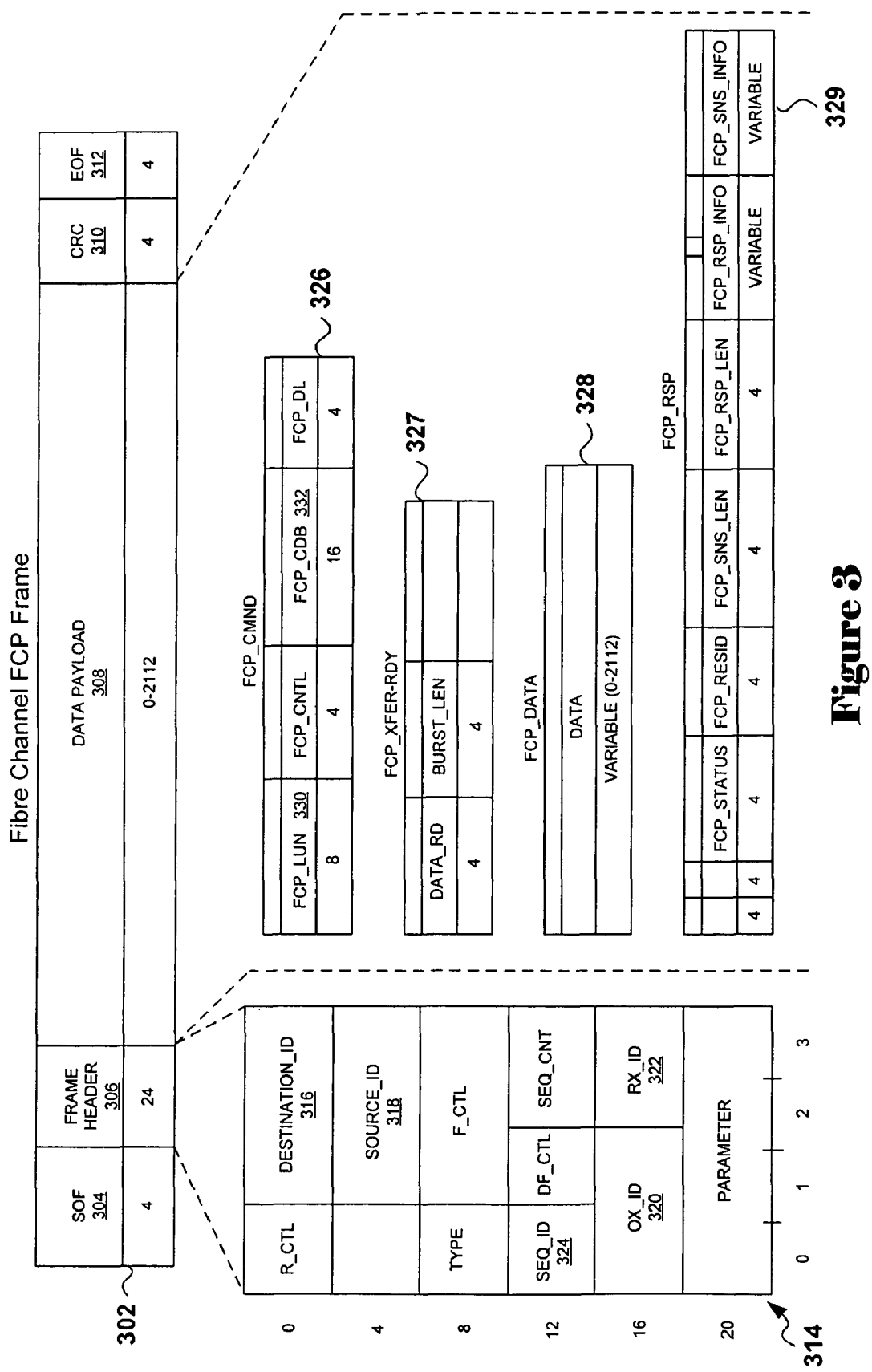
FIG. 3 shows the contents of a standard FC frame.
Figure 4:
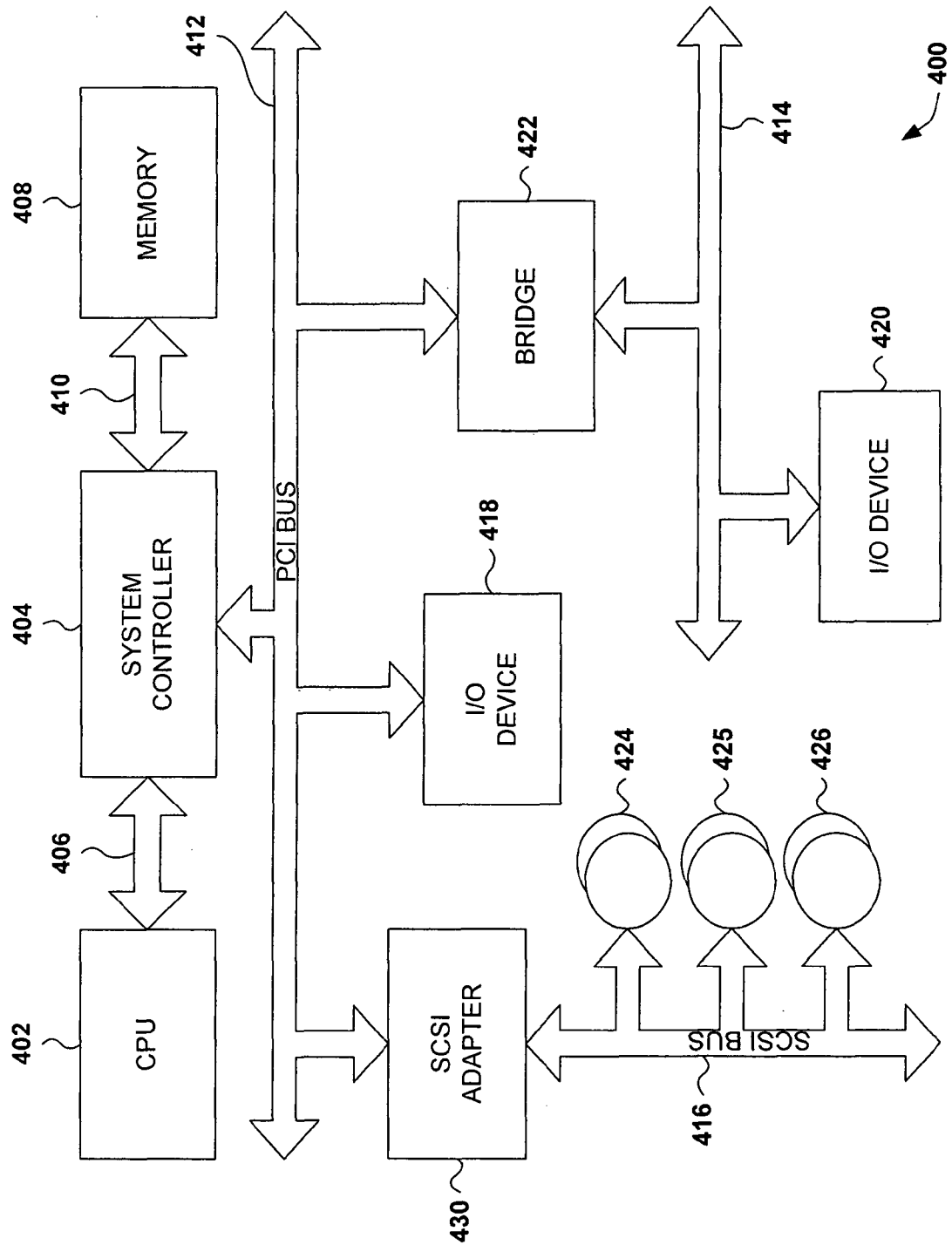
FIG. 4 is a block diagram of a common personal computer architecture including a SCSI bus.
Figure 5:
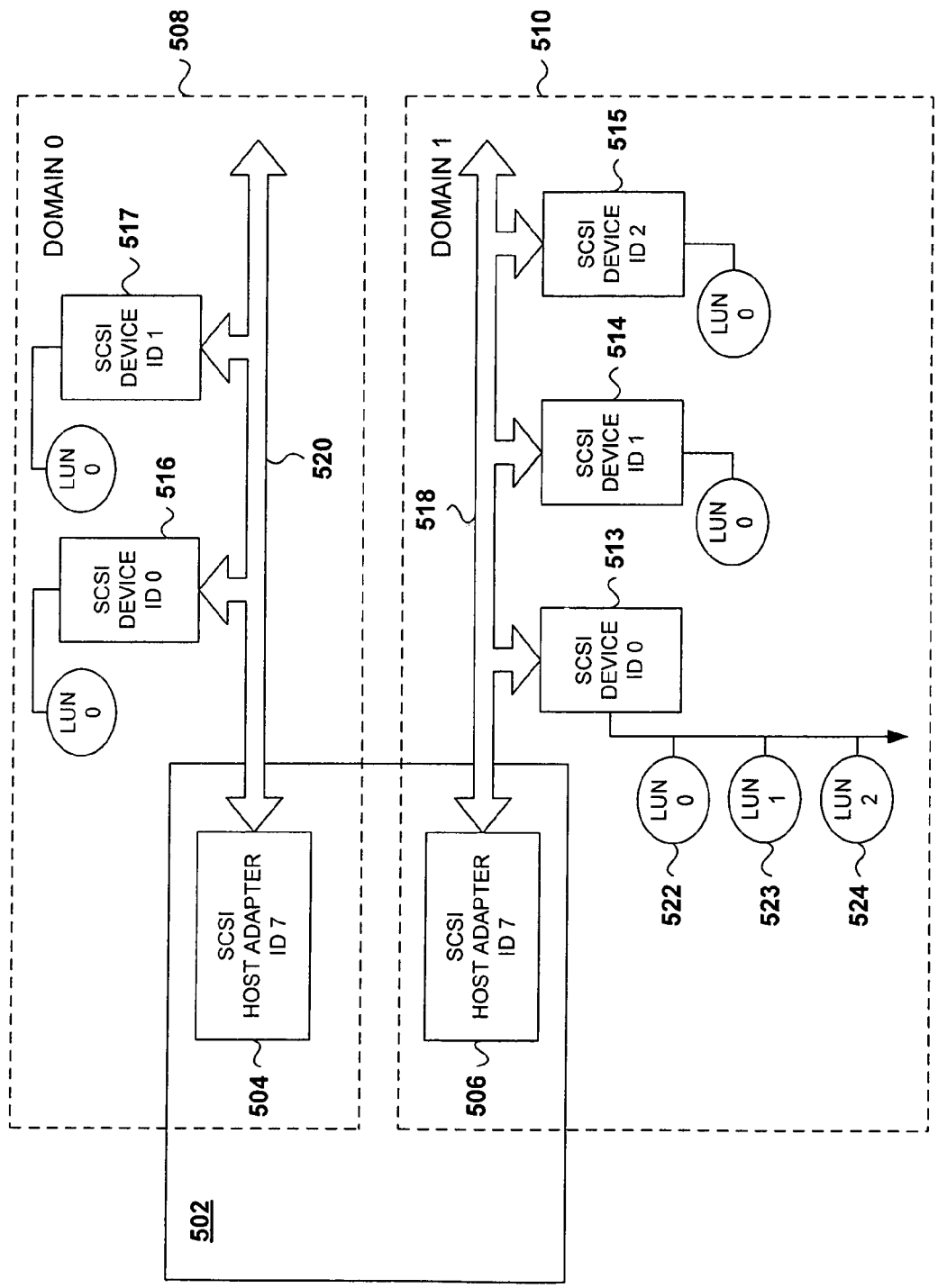
FIG. 5 illustrates the SCSI bus topology.
Figure 6A:
Figure 7A:
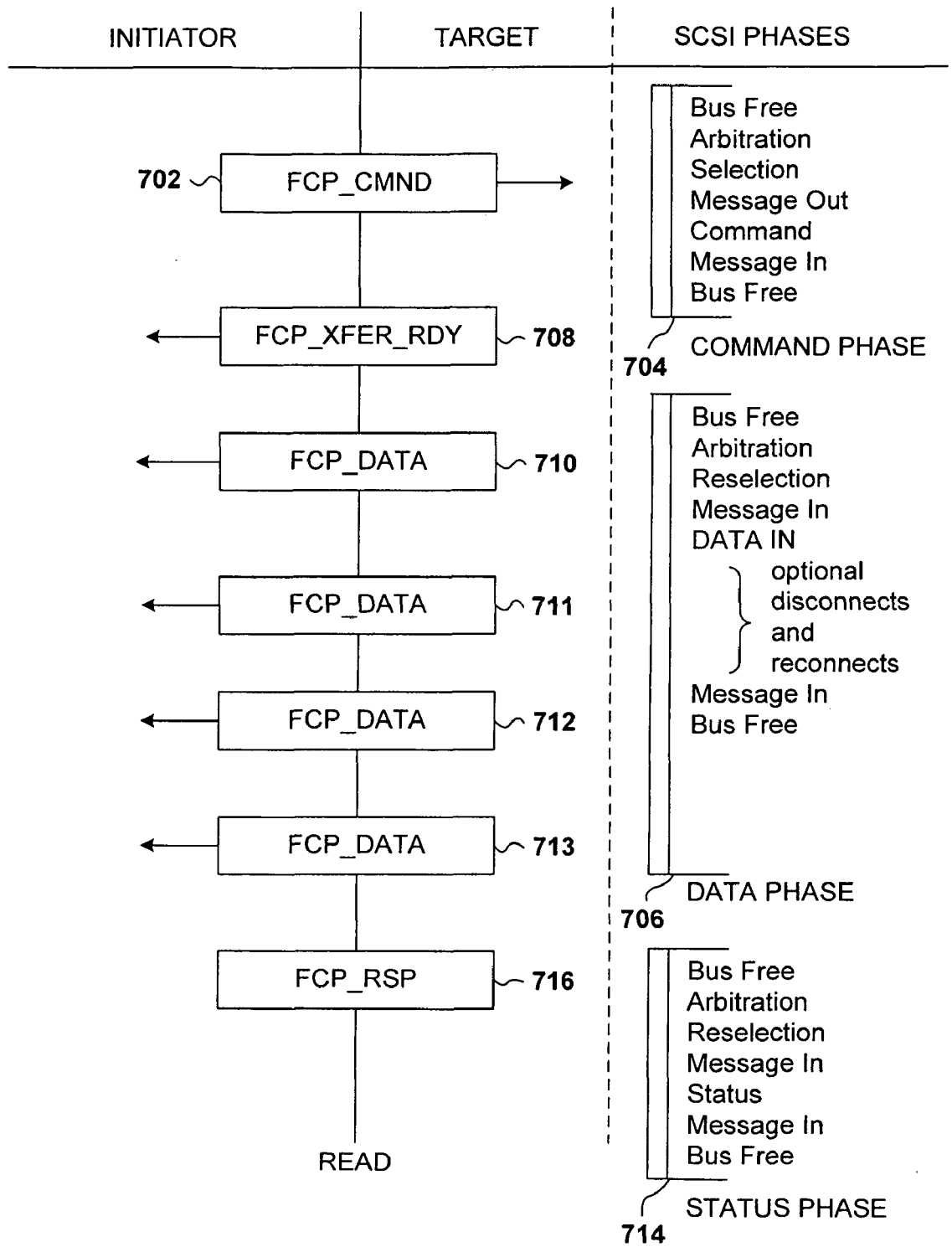
FIGS. 7A-7B illustrate a mapping of the FC Protocol to SCSI sequences exchanged between an initiator and target and the SCSI bus phases and states described in FIGS. 6A-6C.
Figure 7B:
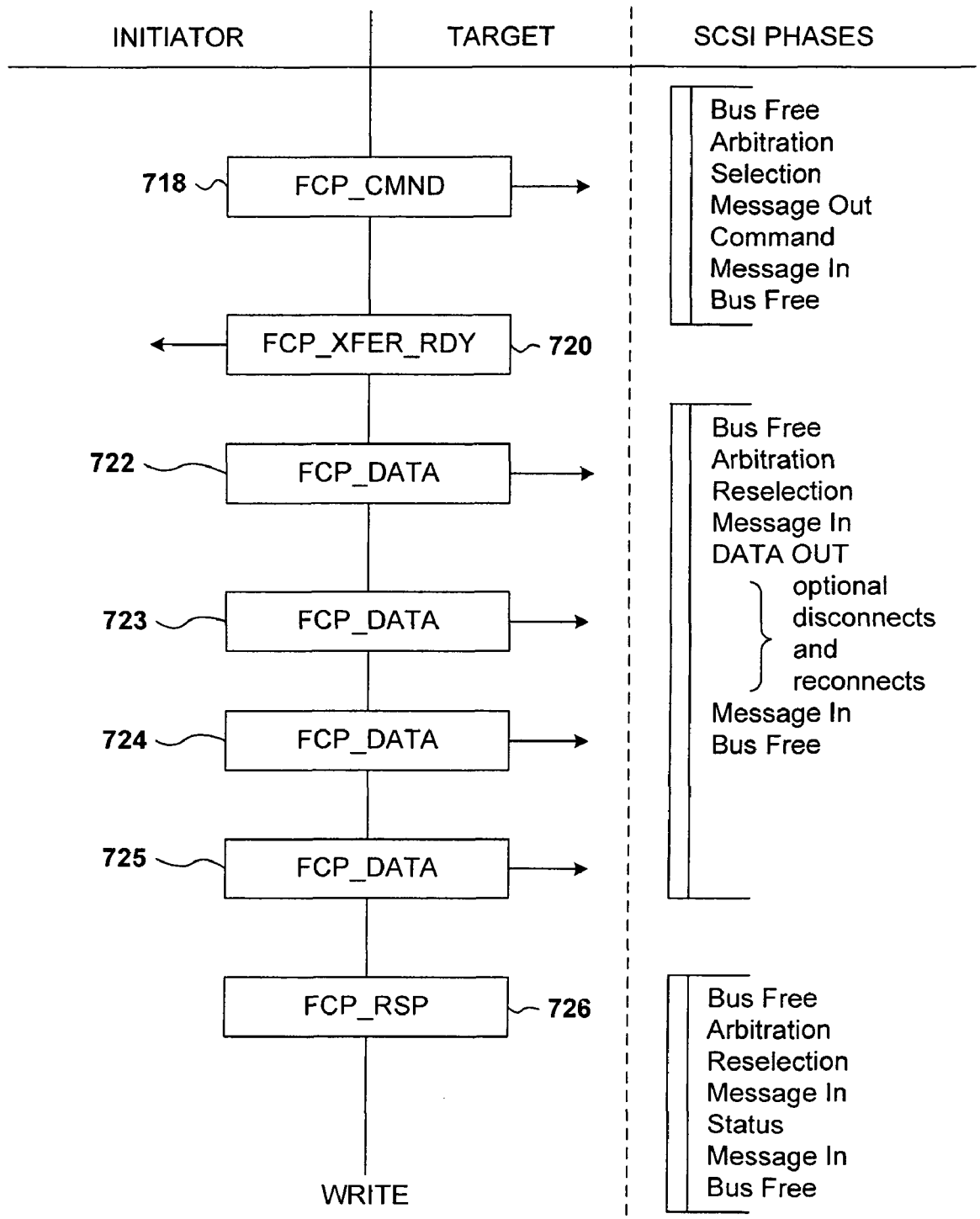

FIGS. 26A-E illustrate the data fields within an FC-frame header that are used for routing FC frames to particular storage-shelf routers or to remote entities via particular FC ports within the storage shelf that represents one embodiment of the present invention. The FC-frame header is discussed, above, with reference to FIG. 3. Of course, the FC header is designed for directing frames to FC nodes, rather than to disk drives interconnected with storage-shelf routers which together interface to an FC arbitrated loop or other FC fabric through a single FC node. Therefore, a mapping of FC-frame-header fields onto the storage-shelf router and SATA disk drive configuration within a storage shelf is needed for proper direction of FC frames. The three-byte D_ID field 2602 in an FC-frame header 2604 represents the node address of an FC node. In the case of FC arbitrated loops, the highest-order two bytes of the D_ID generally have the value "0," for non-public loops, and the lowest-order byte contains an arbitrated-loop physical address ("AL_PA") specifying one of 127 nodes. Generally, one node address is used for the disk-array controller, and another node address is reserved for a fabric arbitrated-loop address. The three-byte S_ID field contains the node address of the node at which a frame was originated. In general, the S_ID field is the node address for the disk-array controller, although a storage-shelf may be interconnected directly to an FC fabric, in which case the S_ID may be a full 24-bit FC fabric address of any of a large number of remote entities that may access the storage-shelf.

Figure 26A:
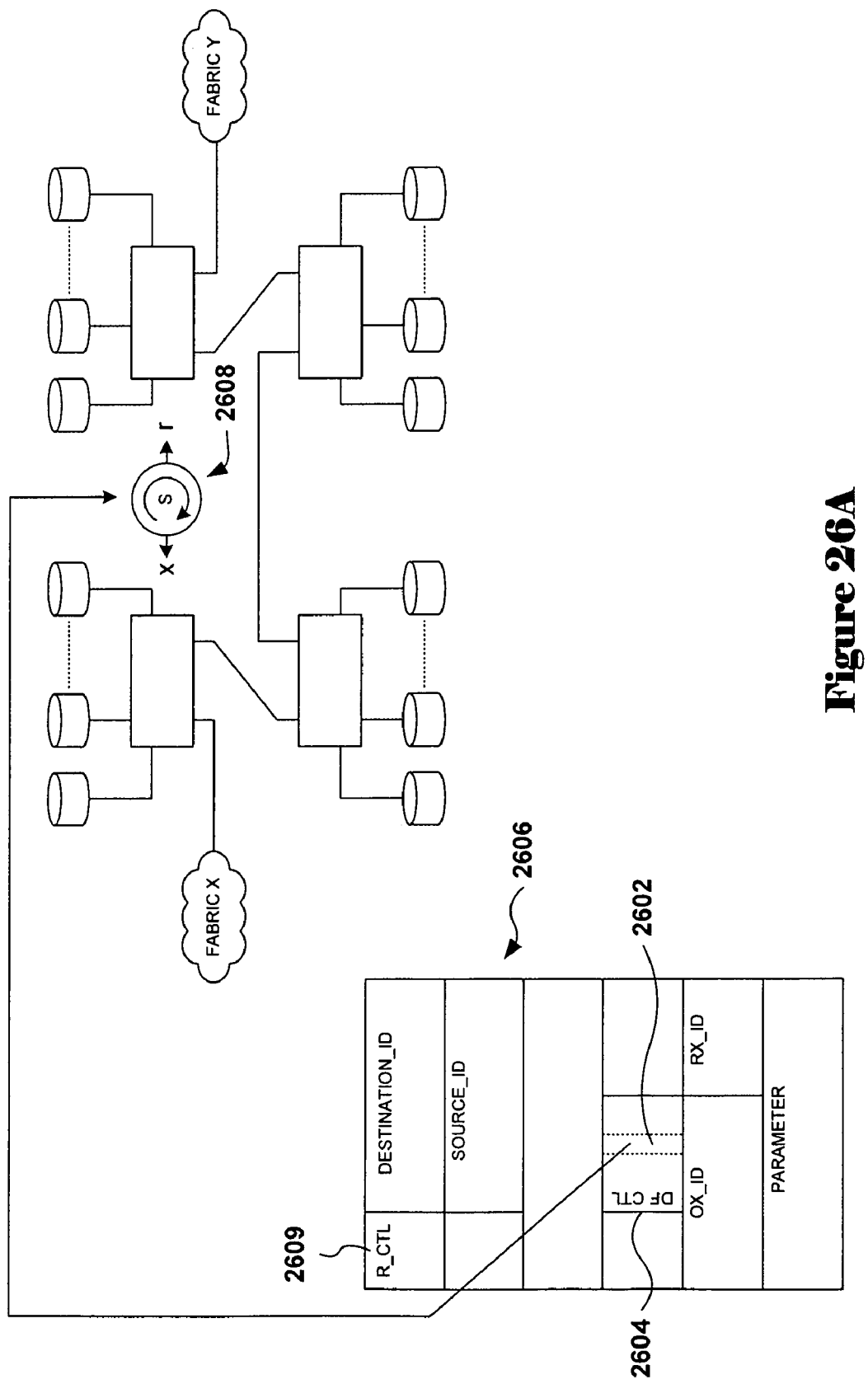
FIGS. 26A-E illustrate the data fields within an FC-frame header that are used for routing FC frames to particular storage-shelf routers or to remote entities via particular FC ports within the storage shelf that represents one embodiment of the present invention.

As shown in FIG. 26A, two reserved bits 2602 within the DF_CTL field 2604 of the FC frame header 2606 are employed as a sort of direction indication, or compass 2608, for frames stored and transmitted within a storage shelf or, in other words, within the S fabric. Table 4, below, shows the encoding of this directional indicator:

TABLE 4

| DF_CTL 19:18 | Address Space |
| --- | --- |
| 00 | Reserved |
| 01 | X |
| 10 | Y |
| 11 | S |

Bit pattern "01" indicates that the frame entered the S-fabric as an X-fabric frame, bit pattern "10" indicates that the frame entered the S-fabric as a Y-fabric frame, and bit pattern "11" indicates that the frame is an S-fabric management frame. This directional indicator, or internal compass, represented by bits 18:19 of the DF_CTL field is needed because both S-fabric and external-fabric frames may be received by the storage-shelf router through a single FC port. As noted above, bits 18:19 of the DF_CTL field are collectively referred to as the "S-bits." The S-bits are set upon receipt of an X-fabric or a Y-fabric frame by an endpoint storage-shelf router, and are cleared prior to export of an FC frame from an endpoint storage-shelf router back to the X fabric or the Y fabric.

Figure 26B:
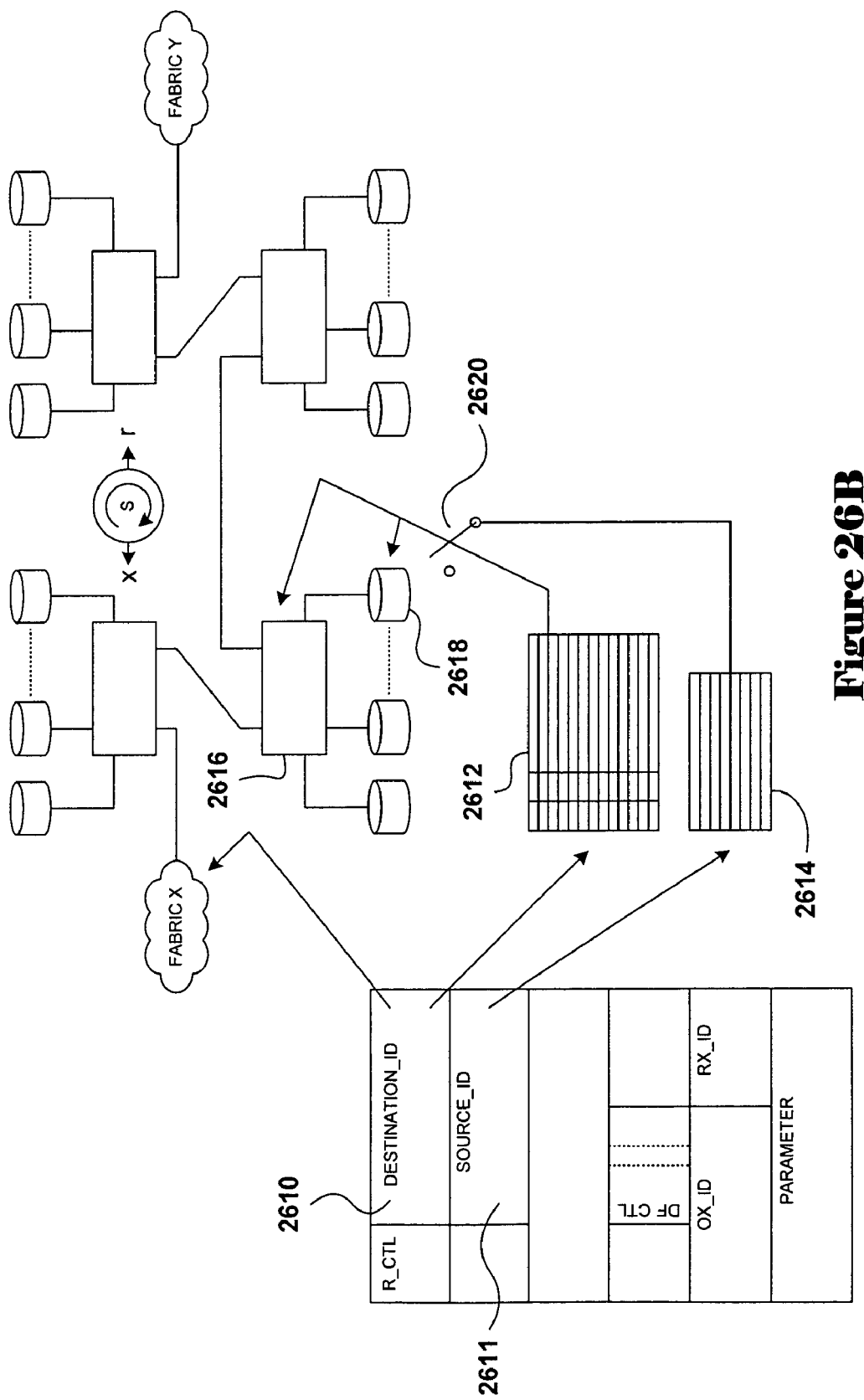

FIG. 26B illustrates FC-frame-header fields involved with the routing of an FCP-CMND frame. The D_ID field 2610 directs the FC frame to a particular FC node, but, as discussed above, a storage shelf, when operating in transparent mode, may contain a number of FC nodes, and when not operating in transparent mode, may contain a large number of data-storage devices to which FC frames all containing a single D_ID need to be dispersed. The routing logic of the storage-shelf router is essentially devoted to handling the various mappings between D_IDs, storage-shelves, storage-shelf routers, and, ultimately, disk drives. The routing logic cannot determine from the value of D_ID field, alone, whether or not the FC frame is directed to the storage-shelf router. In order to determine whether the D_ID directs an incoming FC-CMND frame to the storage-shelf router, the routing logic needs to consult an internal routing table 2612 and several registers, discussed below, to determine whether the D_ID represents the address of a disk drive managed by the storage-shelf router. Thus, as shown in FIG. 26B, the D_ID field, as interpreted with respect to the internal routing table 2612, specifies a particular storage-shelf router within a storage shelf 2616 and a particular disk interconnected to the storage-shelf router. In addition, the routing logic consults addition internal tables 2614, discussed below, to determine whether the source of the FC frame, specified by the S_ID field 2611, is a remote entity currently logged in with the storage-shelf router, and whether the remote entity is identified as interconnected with the addressed disk drive. Thus, the S_ID field, as interpreted with respect to various internal tables 2614, act as an authorization switch 2620 that determines whether or not the command represented by the FC-CMND frame should be carried out.

Figure 26C:
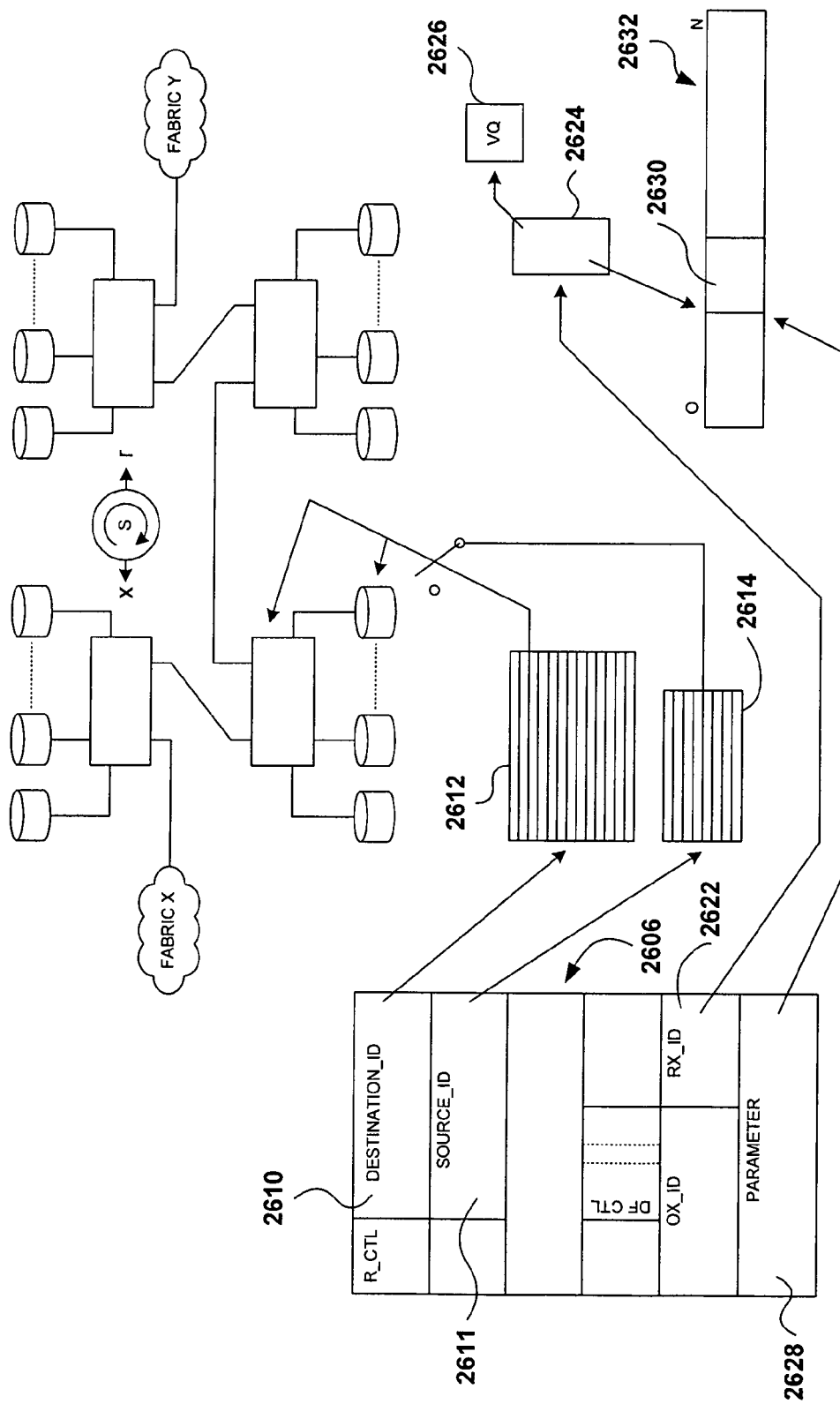

FIG. 26C illustrates FC-frame-header fields involved with the routing of an FCP-DATA frame. The D_ID and S_ID fields 2610 and 2611 and internal tables 2612 and 2614 are used, as with routing of FCP-CMND frames, to specify a particular storage-shelf router within a storage shelf 2616 and a particular disk interconnected to the storage-shelf router, and to authorize 2620 transfer of the data to a disk. However, because FCP_DATA frames may be part of multi-FCP_DATA-frame WRITE sequence, additional fields of the FC-frame header 2606 are employed to direct the FCP_DATA frame within the storage-shelf router, once the routing logic has determined that the FC_DATA frame is directed to a disk local to the storage-shelf router. As shown in FIG. 26C, the RX_ID field 2622 contains a value originally generated by the storage-shelf router, during processing of the FCP_CMND frame that specified the WRITE command associated with the FCP_DATA frame, that specifies a context 2624 for the WRITE command, in turn specifying a virtual queue 2626 by which the data can be transferred from the FC layer to the SATA-port layer via the GSMS. In addition, the parameter field 2628 of the FC-frame header 2606 contains a relative offset for the data, indicating the position 2630 of the data contained in the FCP_DATA frame within the total sequential length of data 2632 transferred by the WRITE command. The context 2624 stores an expected relative offset for the next FCP_DATA frame, which can be used to check the FCP_DATA frame for proper sequencing. If the stored, expected relative offset does match the values of the parameter field, then the FCP_DATA frame has been received out-of-order, and error handling needs to be invoked.

Figure 26D:
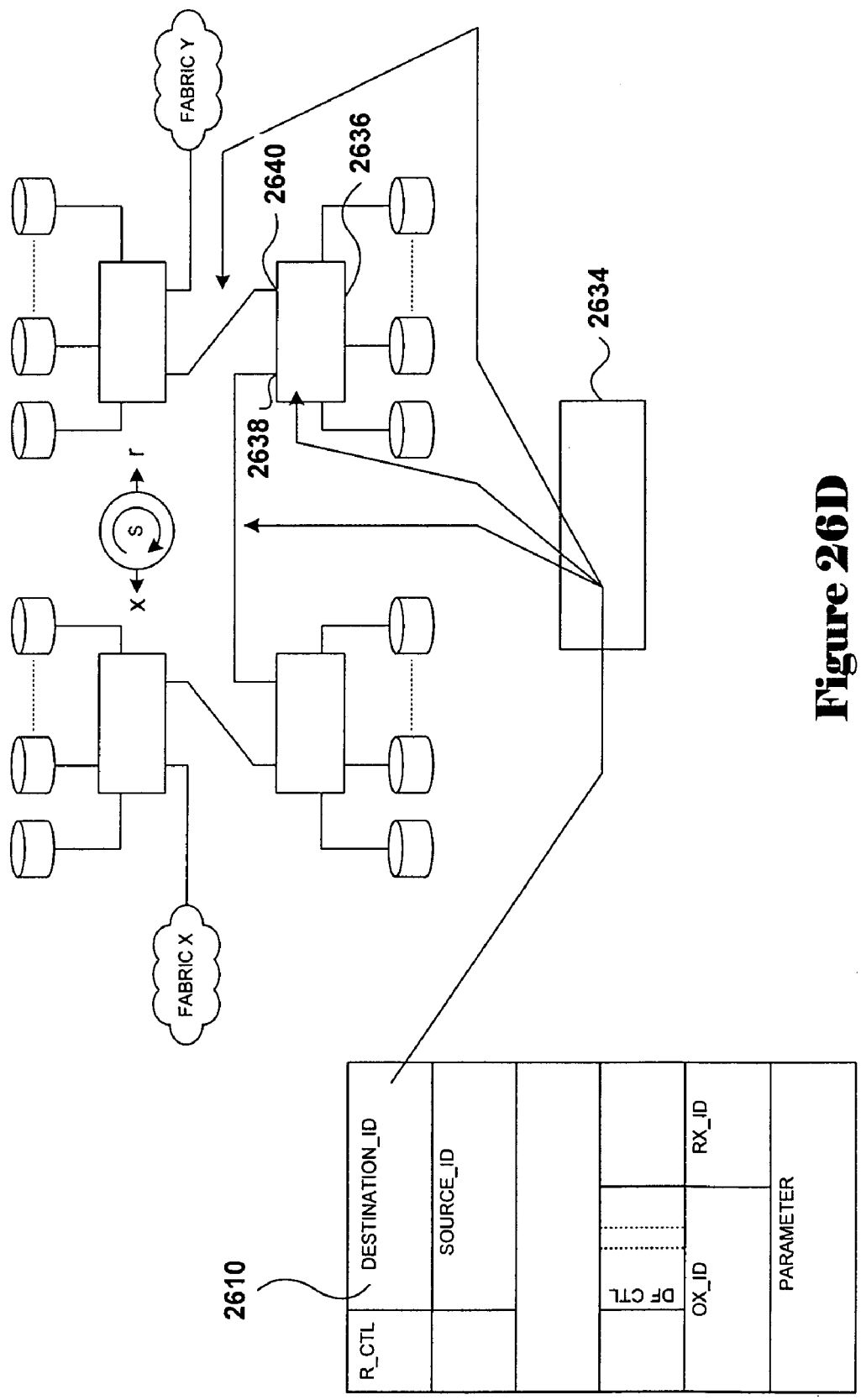

FIG. 26D illustrates FC-frame-header fields involved with the routing of an internally generated management frame. In the case of a management frame, the lowest-order byte of the D_ID field 2610 contains a router number specifying a particular storage-shelf router within a storage shelf. The router number contained in the D_ID field is compared with a local-router number contained in a register 2634, to be discussed below, to determine whether the management frame is directed to the storage-shelf router, for example storage-shelf router 2636, or whether the management frame is directed to another storage-shelf router within the storage shelf, accessible through the X-fabric-associated FC port 2638 or the Y-fabric-associated FC port 2640.

Figure 26E:
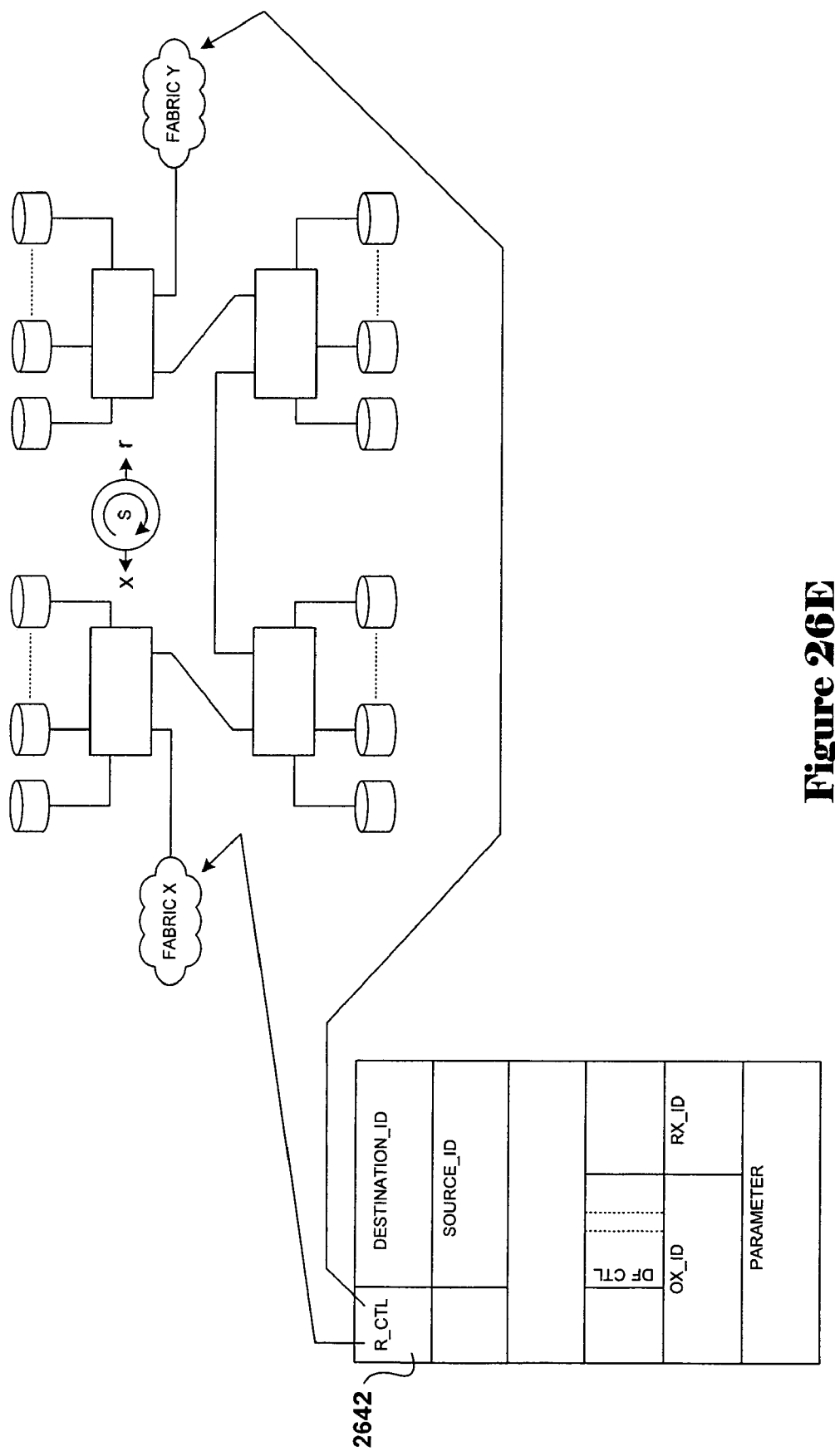

Finally, FIG. 26E illustrates FC-frame-header fields involved with the routing of an received FCP_TRANSFER_RDY and FCP_RESPONSE frames. IN the case of FCP_TRANSFER_RDY and FCP_RESPONSE frames, the routing logic immediately recognizes the frame as directed to a remote entity, typically a disk-array controller, by another storage-shelf router. Thus, the routing logic needs only to inspect the R_CTL field 2642 of the FC-frame header to determine that the frame must be transmitted back to the X fabric or the Y fabric.

Figure 27:
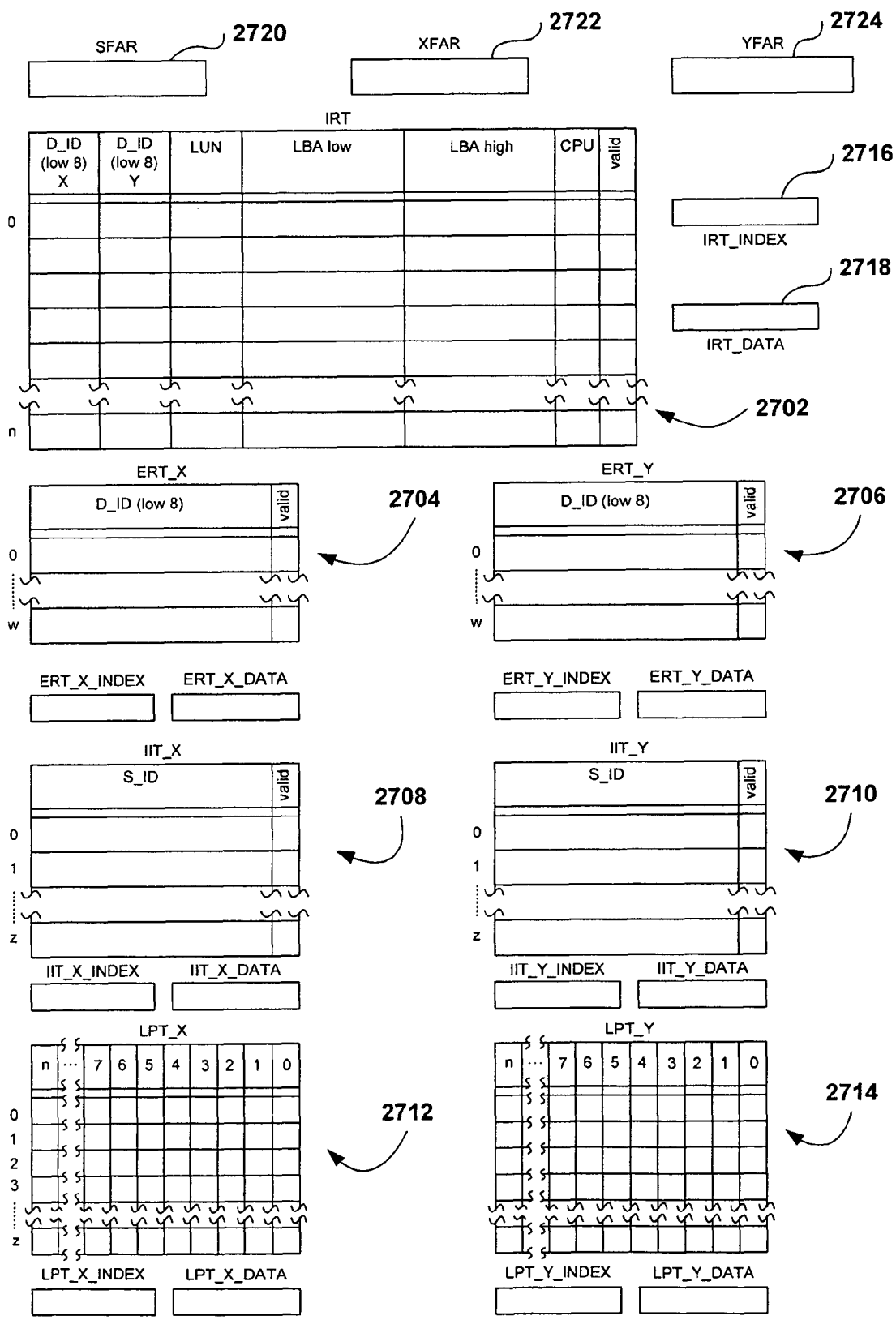
FIG. 27 illustrates seven main routing tables maintained within the storage-shelf router to facilitate routing of FC frames by the routing layer.

FIG. 27 illustrates the seven main routing tables maintained within the storage-shelf router to facilitate routing of FC frames by the routing logic. These tables include the internal routing table ("IRT") 2702, X-fabric and Y-fabric external routing tables ("ERTX") and ("ERT_Y") 2704 and 2706, respectively, X-fabric and Y-fabric initiator/target tables ("ITT_X") and ("ITT Y") 2708 and 2710, and X-fabric and Y-fabric login pair tables ("LPT_X") and ("LPT_Y") 2712 and 2714, respectively. Each of these seven routing tables is associated with an index and a data register, such as index and data registers ("IRT_INDEX") and ("IRT DATA") 2716 and 2718. The contents of the tables can be accessed by a CPU by writing a value indicating a particular field in the table into the index register, and reading the contents of the field from, or writing new contents for the field into, the data register. In addition, there are three registers SFAR 2720, XFAR 2722, and YFAR 2724 that are used to store the router number and the high two bytes of the D_ID corresponding to the storage-shelf router address with respect to the X, and Y fabrics, respectively. This allows for more compact IRT, ERT_X and ERT_Y tables, which need only to store the low-order byte of the D_IDs.

The IRT table 2702 includes a row for each disk drive connected to the storage-shelf router or, in other words, for each local disk drive. The row includes the AL_PA assigned to the disk drive, contained in the low-order byte of the D_ID field of a frame directed to the disk drive, the LUN number for the disk drive, the range of logical block addresses contained within the disk drive, a CPU field indicating which of the two CPUs manages I/O directed the disk drive, and a valid bit indicating whether or not the row represents a valid entry in the table. The valid bit is convenient when less than the maximum possible number of disk drives is connected to the storage-shelf router.

The ERT_X and ERT_Y tables 2704 and 2706 contain the lower byte of valid D_IDs that address disk drives not local to the storage-shelf router, but local to the storage shelf. These tables can be used to short-circuit needless internal FC frame forwarding, as discussed below.

The X-fabric and Y-fabric ITT tables 2708 and 2710 include the full S_ID corresponding to remote FC originators currently logged in with the storage-shelf router and able to initiate FC exchanges with the storage-shelf router, and with disk drives interconnected to the storage-shelf router. The login-pair tables 2712 and 2714 are essentially sparse matrices with bit values turned on in cells corresponding to remote-originator and local-disk-drive pairs that are currently logged in for FCP exchanges. The login tables 2712 and 2714 thus provide indications of valid logins representing an ongoing interconnection between a remote entity, such as a disk-array controller, and a local disk drive interconnected to the storage-shelf router.

Figure 28:
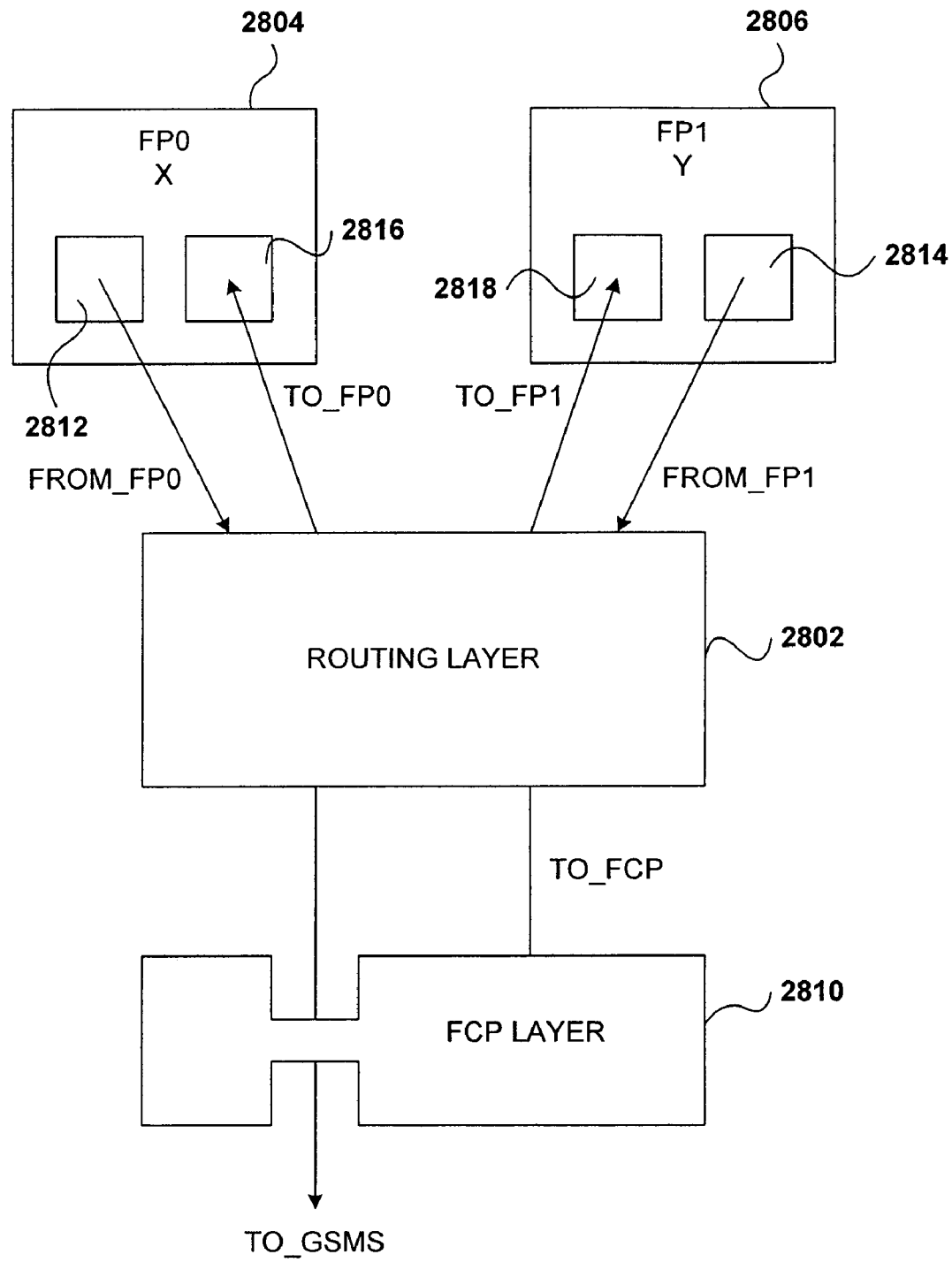
FIG. 28 provides a simplified routing topology and routing-destination nomenclature used in the flow-control diagrams.

Next, the routing logic that constitutes the routing layer of a storage-shelf router is described with reference to a series of detailed flow-control diagrams. FIG. 28 provides a simplified routing topology and routing-destination nomenclature used in the flow-control diagrams. FIGS. 29-35 are a hierarchical series of flow-control diagrams describing the routing layer logic.

As shown on FIG. 28, the routing layer 2802 is concerned with forwarding incoming FC frames from the FC ports 2804 and 2806 either directly back to an FC port, to the FCP layer 2810 for processing by FCP logic and firmware executing on a CPU, or relatively directly to the GSMS layer, in the case of data frames for which contexts have been established. The routing layer receives incoming FC frames from input FIFOs 2812 and 2814 within the FC ports, designated "From_FP0" "From_FP1," respectively. The routing layer may direct an FC frame back to an FC port by writing the FC frame to one of the output FIFOs 2816 and 2818, designated "To_FP0" and "To_FP1," respectively. The routing layer may forward an FCP_DATA frame relatively directly to the GSMS layer via a virtual queue, a process referred to as "To_GSMS," and may forward an FC frame to the FCP layer 2810 for processing, referred to as "To_FCP." The designations "From_FP0," "From_FP1," "To_FP0," "To_FP1," "To_GSMS," and "To_FCP" are employed in the flow-control diagrams as shorthand notation for the processes of reading from, and writing to FIFOs, data transfer through the GSMS virtual queue mechanism, and state-machine-mediated transfer through a shared-memory interface to CPUs.

Figure 29:
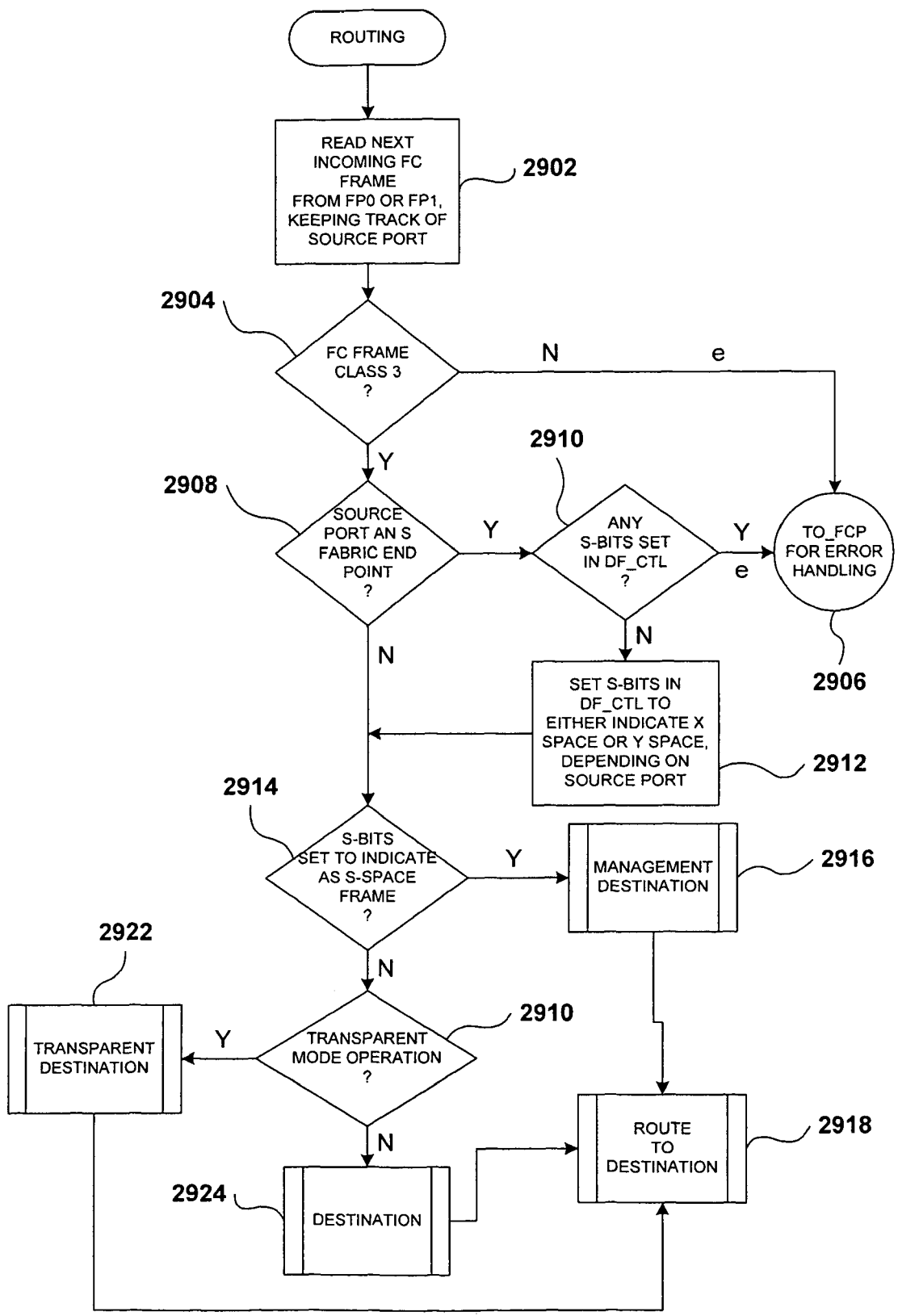
FIGS. 29-35 are a hierarchical series of flow-control diagrams describing the routing layer logic.

FIG. 29 is the first, and highest level, flow-control diagram representing the routing layer logic. The routing layer logic is described as set of decisions made in order to direct an incoming FC frame to its appropriate destination. In a functioning storage router, the routing logic described with respect to FIGS. 29-35 is invoked as incoming FC frame is processed. The routing logic resides within state machines and logic circuits of a storage-shelf router. The storage-shelf router is designed to avoid, as much as possible, store-and-forward, data-copying types of internal data transfer, instead streamlined so that frames can be routed, using information in the frame headers, even as they are being input into the FIFOs of the FC ports. In other words, the routing logic may be invoked as soon as the frame header is available for reading from the FIFO, and the frame may be routed, and initial data contained in the frame forwarded to its destination, in parallel with reception of the remaining data by the FC port. The storage-shelf router includes arbitration logic to ensure fair handling of the two different input FIFOs of the two FC ports, so that FC frames incoming from both the X fabric and Y fabric are handled in timely fashion, and neither the X fabric nor the Y fabric experiences unnecessary FC-frame handling delays, or starvation. The routing logic is invoked by signals generated by FC ports indicating the availability of a newly arrived frame in a FIFO.

In step 2902, the routing layer logic ("RLL") reads the next incoming FC frame from one of the input FIFOs of the FC ports, designated "From_FP0" and "From_FP1," respectively. In step 2904, the routing layer logic determines whether or not the FC frame is a class-3 FC frame. Only class-3 FC frames are supported by the described embodiment of the storage-shelf router. If the FC frame is not a class-3 FC frame, then the FC frame is directed to the FCP layer, To_FCP, for error processing, in step 2906. Note that, in this and subsequent flow-control diagrams, a lower-case "e" associated with a flow arrow indicates that the flow represented by the flow arrow occurs in order to handle an error condition. If the FC frame is a class-3 FC frame, as determined in step 2904, the RLL next determines, in step 2908, whether the FC port from which the FC frame was received is an S-fabric endpoint, or, in other words, an X-fabric or Y-fabric node. A storage-shelf router can determine whether or not specific ports are endpoints with respect to the S fabric, or are, in other words, X-fabric or Y-fabric nodes from configurable settings. The FC-frame header contains the port address of the source port, as discussed above.

If the source port of the FC frame is an S-fabric endpoint, indicating that the FC frame has been received from an entity external to the local S fabric, then the RLL determines, in step 2910, whether any of the S bits are set within the DF_CTL field of FC frame header. If so, then an error has occurred, and the FC frame is directed to the FCP layer, To_FCP, for error processing in step 2906. If not, then appropriate S bits are set to indicate whether the FC frame belongs to the X fabric, or X space, or to the Y fabric, or Y space in step 2912. Note that one of the two FC ports corresponds to the X fabric, and other of the two FC ports corresponds to the Y fabric, regardless of the position of the storage-shelf router within the set of interconnected storage-shelf routers within a storage shelf. As noted above, the association between FC ports and the X and T fabrics is configurable. Next, the RLL determines, in step 2914, whether the S bits are set to indicate that the frame is an S-fabric frame. If so, then the sublogic "Management Destination" is invoked, in step 2916, to determine the destination for the frame, after which the sublogic "Route To Destination" is called, in step 2918, to actually route the FC frame to the destination determined in step 2916. If the FC frame is not an S-fabric management frame, as determined in step 2914, then, in step 2920, the RLL determines whether or not the RLL is currently operating in transparent mode, described above as a mode in which each disk drive has its own FC node address. If the storage-shelf router is operating in transparent mode, then the sublogic "Transparent Destination" is called, in step 2922, in order to determination the destination for the frame, and then the sublogic "Route To Destination" is called in step 2918 to actually route the frame to its destination. Otherwise the sublogic "Destination" is called, in step 2924, to determination the destination for the frame, after which it is routed to its destination via a call to the sublogic "Route To Destination" in step 2918.

Figure 30:
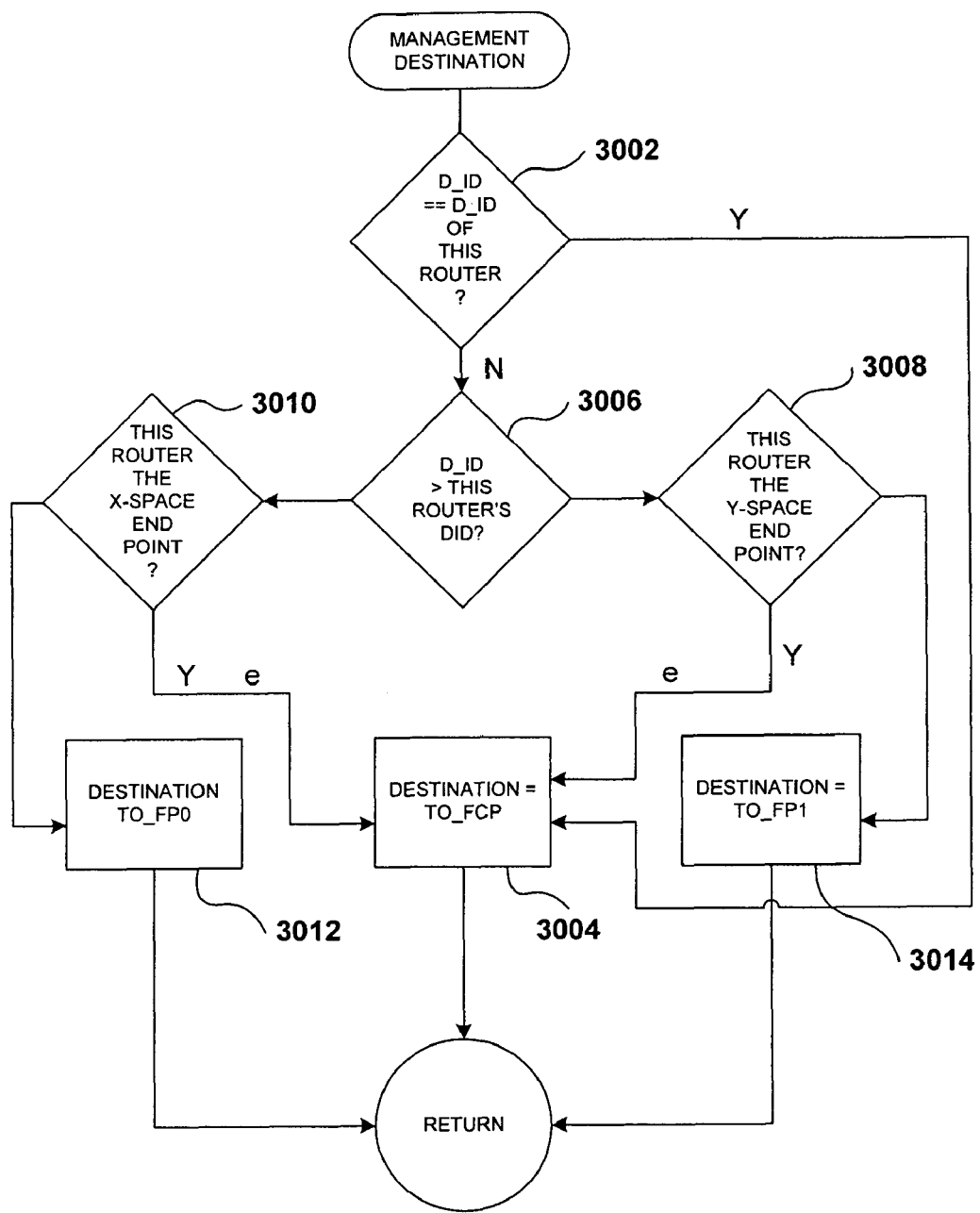

FIG. 30 is a flow-control diagram representation of the sublogic "Management Destination," called from step 2916 of FIG. 29. In step 3002, the RLL determines whether the storage-shelf router number stored in the D_ID in the header of the FC frame is equal to that of the storage-shelf router. This determination can be made using the router number assigned to the storage-shelf router within the storage shelf, and stored in the SFAR register. If the router number contained in the D_ID matches the router number in the SFAR register, as determined in step 3002, then a variable "destination" is set to the value "To_FCP" in step 3004, indicating that the frame should be sent to the FCP layer. If the router numbers do not match, then, in step 3006, the RLL determines whether the router number in the D_ID of the FC frame is greater than the storage-shelf router's router number. If the router number in the D_ID of the FC frame is greater than that of the storage-shelf router stored in the SFAR register, then control flows to step 3008. Otherwise control flows to step 3010. In both steps 3008 and 3010, the RRL determines if the frame has reached an S-fabric endpoint within the storage shelf. If so, then the management frame was either incorrectly addressed or mistakenly not fielded by the appropriate destination, and so, in both cases, the destination is set to "To_FCP," in step 3004, so that the frame will be processed by the CPU as an erroneously received frame. However, in both steps 3008 and 3010, if the current storage-shelf router is not an S-fabric endpoint, then the destination is set to "To_FP0," in step 3012, in the case that the router number in the D_ID is less than the current router's router number, and the destination is set to "To_FP1" in step 3014, if the router number in the D_ID is greater than that of the current storage-shelf router. It should be noted again that the numeric identification of storage-routers within a storage shelf is monotonically ascending, with respect the X fabric, and monotonically descending, with respect to the Y fabric.

Figure 31:
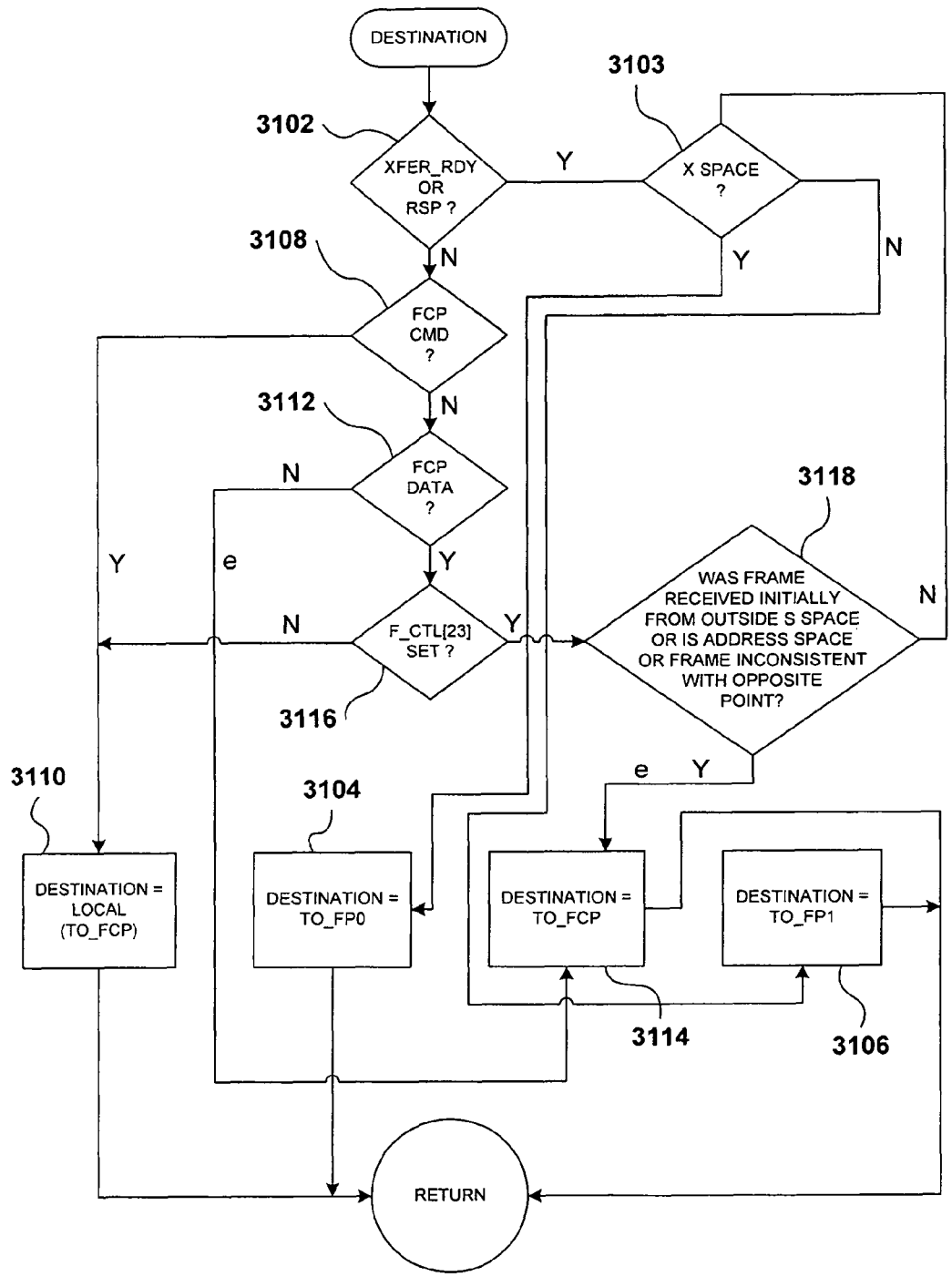

FIG. 31 is a flow-control-diagram representation of the sublogic "Destination," called from step 2924 in FIG. 29. This sublogic determines the destination for an FC frame when the storage-shelf router is not operating in transparent mode or, in other words, when the storage-shelf router is mapping multiple disk drives to an AL_PA. In step 3102, the RLL determines if the frame is an XFER_RDY or RSP frame. These frames need to be sent back to the disk-array controller. If so, then, in step 3102, the RLL determines whether the frame belongs to the X fabric. If the frame does belong to the X fabric then the variable "destination" is set to the value "To_FP0," in step 3104, to direct the frame to the X FC port. If the frame is a Y-fabric frame, as determined in step 3102, then the variable "destination" is set to "To_FP1," in step 3106, in order to direct the frame to the Y FC port. If the frame is not an XFER_RDY or RSP frame, as determined in step 3102, then, in step 3108, the RLL determines whether the frame is an FCP_CMND frame. If so, then the variable "destination" is set to "To_FCP," in step 3110, indicating that the frame is an FCP_CMND frame directed a LUN local to the storage-shelf router, and that the frame needs to be directed to the FCP layer for firmware processing in order to establish a context for the FCP command. If the frame is not an FCP_CMND frame, as determined in step 3108, then, in step 3112, the RLL determines whether or not the frame is an FCP_DATA frame. If the frame is not a data frame, then a variable "destination" is set to "To_FCP," in step 3114, to invoke error handling by which the firmware determines what type of frame has been received and how the frame should be handled. If the frame is an FCP_DATA frame, as determined in step 3112, then, in step 3116, the RLL determines whether or not the frame was sent by a responder or by an originator. If the frame was sent by an originator, then the variable "destination" is set "To_FCP," in step 3110, to direct the frame to FCP-layer processing. If a data frame was sent by a responder, then, in step 3118, the RLL determines whether the frame was received initially from outside the S fabric or if the S-bit-encoded fabric indication within the frame header is inconsistent with the port opposite from which the frame was received. If either condition is true, then the frame has been received in error, and the variable "destination" is set to "To_FCP," in step 3114, to direct the frame to the CPU for error processing. Otherwise, control flows to step 3102, for direction to either the X port or the Y port.

Figure 32:
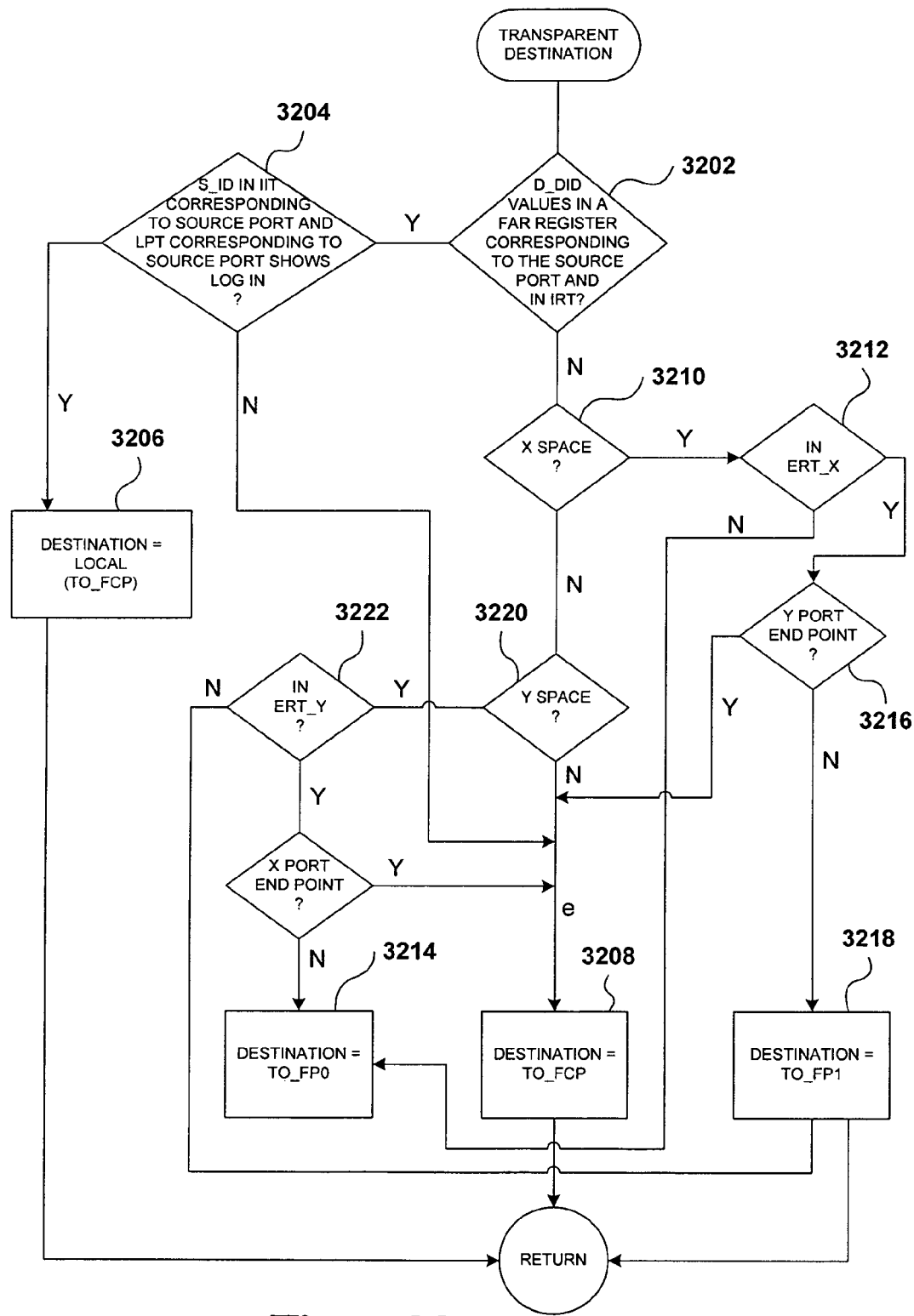

FIG. 32 is a flow-control-diagram representation of the sublogic "Transparent Destination," called from step 2922 in FIG. 29. This sublogic determines destinations for FC frames when the storage-shelf router is operating in transparent mode, in which each disk drive has its own AL_PA. In step 3202, the RLL determines whether or not the high two bytes of the D_ID field of the header in the FC frame are equivalent to the contents of the XFAR or YFAR register corresponding to the source port in which the frame was received, and whether the low byte of the D_ID field contains an AL_PA contained in the IRT table indicating that the AL_PA has been assigned to a local disk drive. If so, then the FC frame was directed to the current storage-shelf router. Otherwise, the FC frame is directed to another storage shelf or storage-shelf router. In the case that the FC frame is directed to the current storage-shelf router, then, in step 3204, the RLL determines whether the originator of the FC frame is a remote entity identified as an external FC originator currently capable of initiating FC exchanges with disk drives interconnected with the storage-shelf router, by checking to see if the S_ID corresponds to an S_ID contained in the appropriate IIT table, and, if the S_ID is found in the appropriate ITT table, the RLL further checks the appropriate LPT table to see if the remote entity associated with the S_ID contained in FC-frame header is currently logged in with respect to the disk to which the frame is directed. If the S_ID represents a remote entity currently logged in, and capable of undertaking FC exchanges with the disk drive, interconnected with the storage-shelf router, to which the frame is directed, as determined in step 3204, then, in step 3206, the variable "destination" is set to "To_FCP," in order to direct the frame to the FCP layer for processing. If, by contrast either the S_ID is not in the appropriate IIT table, or the source and disk drive to which the FC frame is directed is not currently logged in, as indicated by the appropriate LPT table, then the variable "destination" is set to "To_FCP" in step 3208 in order direct the frame to the FCP layer for error handling.

If the D_ID field does not match the contents of the appropriate FAR registers, as determined in step 3202, then, in step 3210, the RLL determines whether or not the frame is an X-fabric frame. If so, then, in step 3212, the RLL determines whether or not the frame is directed to another storage-shelf router within the storage shelf. If not, then the variable "destination" is set to "To_FP0" to return the frame to the external X fabric for forwarding to another storage shelf in step 3214. If the ERT_X table contains an entry indicating that the destination of the frame is a disk drive attached to another storage-shelf router within the storage shelf, as determined in step 3212, then, in step 3216, the RLL determines whether or not the current storage-shelf router represents the Y-fabric endpoint. If so, then the frame was not correctly processed, and cannot be sent into the Y fabric, and therefore the variable "destination" is set to the value "To_FCP," in step 3208, so that the frame can be directed to the FCP layer for error handling. Otherwise, the variable destination is set to "To_FP1," in step 3218, to forward the frame on to subsequent storage-shelf routers within the storage shelf via the S fabric. If the received frame is not an X-fabric frame, as determined in step 3210, then, in step 3220, the RLL determines whether or not the received frame is a Y-fabric frame. If so, then the frame is processed symmetrically and equivalently to processing for X-fabric frames, beginning in step 3222. Otherwise, the variable "destination" is set to "To_FCP," in step 3208, to direct the frame to the FCP layer for error handling.

Figure 33:
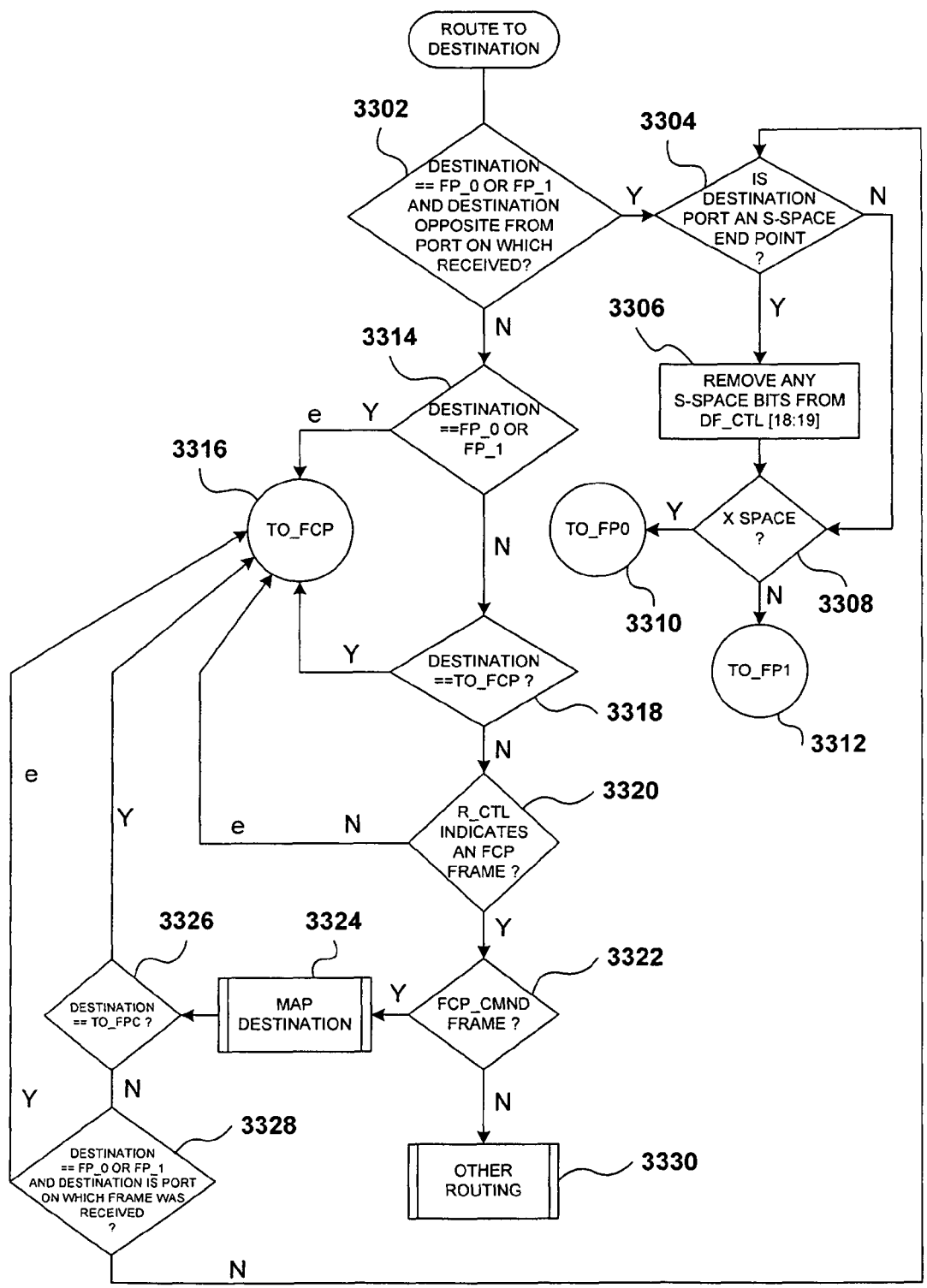

FIG. 33 is a flow-control-diagram representation of the sublogic "Route To Destination" called from step 2918 in FIG. 29. This sublogic directs received FC frames to the destinations determined in previously invoked logic. In step 3302, the RLL determines whether the value of the variable "destination" is "To_FP0" or "To_FP1." If so, in the same step, the RLL determines whether the destination is associated with the port opposite the port on which the FC frame was received. If so, then, in step 3304, the RLL determines whether the destination indicated by the contents of the variable "destination" is a queue associated with a port representing an S-fabric endpoint. If so, then in step 3306, any S-space bits set within the DF_CTL field of the FC-frame header are cleared prior to transmitting the frame out of the local S fabric. In step 3308, the RLL determines to which of the X fabric or Y fabric the frame belongs, and queues to frame to the appropriate output queue in steps 3310 or 3312. If the contents of the variable "destination" either do not indicate the FP0 or FP1 ports, or the destination is not opposite from the port on which the FC frame was received, as determined in step 3302, then, in step 3314, the RLL determines whether or not the contents of the variable "destination" indicate that the frame should be directed to one of the FC ports. If the frame should be directed to one of the FC ports, then the frame is directed to the FCP layer in step 3316, for error processing by the FCP layer. If the contents of the variable "destination" indicate that the frame is directed to the FCP layer, "To_FCP," as determined by the RLL in step 3318, then the frame is directed to the FCP layer in step 3316. Otherwise, the RLL checks, in step 3320, whether the R_CTL field of the FC-frame header indicates that the frame is an FCP frame. If not, then the frame is directed to the FCP layer in step 3316, for error handling. Otherwise, in step 3322, the RLL determines whether or not the frame is an FCP_CMND frame. If so, then the sublogic "Map Destination" is called, in step 3324, after which the RLL determines whether or not the contents of the variable "destination" remain equal to "To_FCP" in step 3326. If so, then the frame is directed to the FCP layer, in step 3316. Otherwise, if the contents of the variable "destination" now indicate forwarding of the frame to one of the two FC ports and the FC port destination is the same FC port on which the frame was received, as determined in step 3328, the frame is directed to the FCP layer, in step 3316, for error handling. Otherwise, control flows to step 3304, for queuing the frame to one of the two FCP ports. If the frame is not an FCP_CMND frame, as determined in step 3322, then the sublogic "Other Routing" is called in step 3330.

Figure 34:
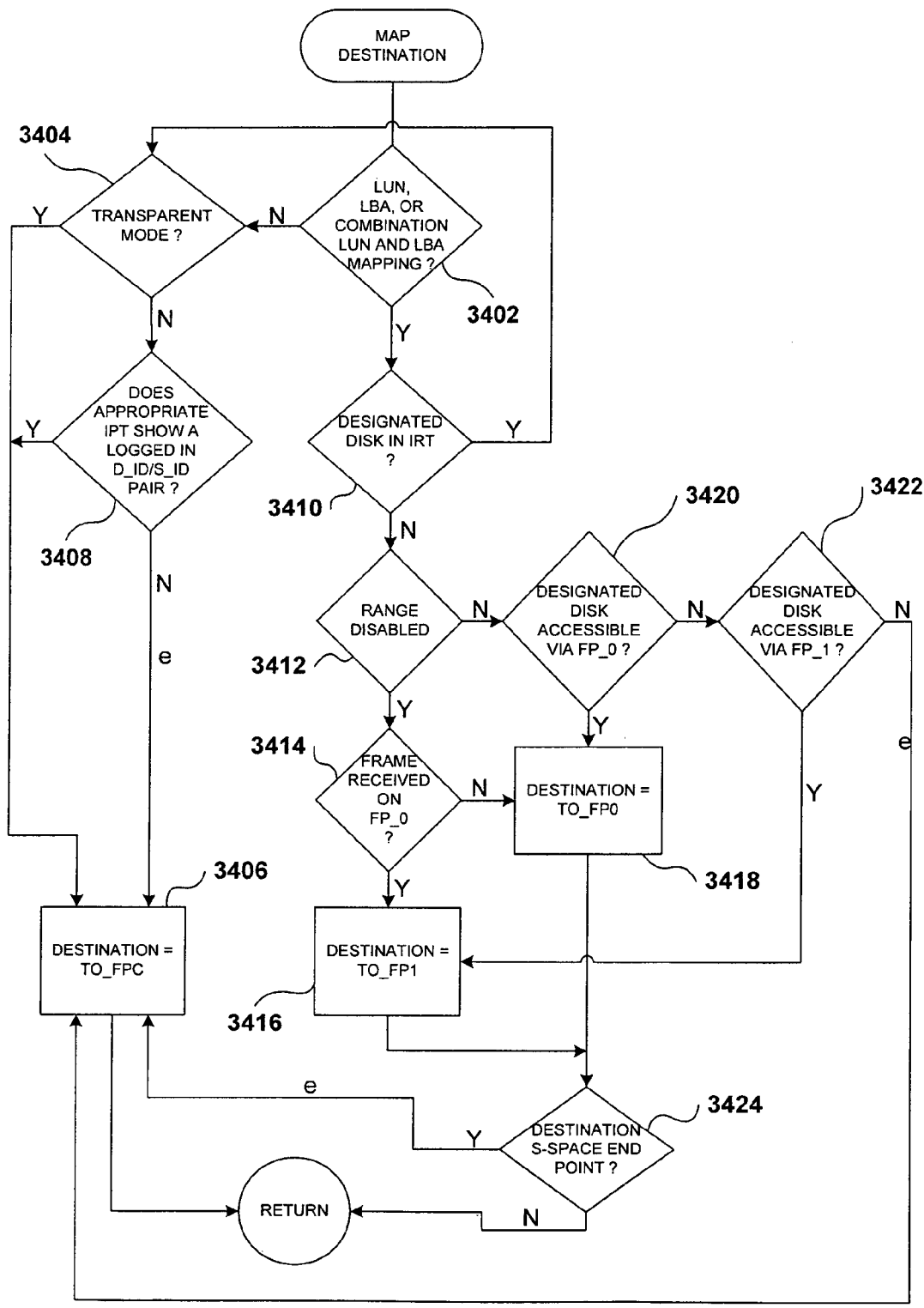

FIG. 34 is a flow-control-diagram representation of the sublogic "Map Destination," called in step 3324. The RLL first determines, in step 3402, whether LUN, LBA, or a combination of LUN and LBA mapping is currently being carried out by the storage-shelf router. If not, then the RLL determines, in step 3404, whether the storage-shelf router is currently operating in transparent mode. If so, then the value of the variable "destination" is set to "To_FCP" in step 3406. If the storage-shelf router is not operating in transparent mode, as determined in step 3404, then the RLL determines, in step 3408, whether the appropriate LPT table indicates that the source of the frame is logged in for exchanging data with the destination of the frame. If so, then the variable "destination" is set to "To_FCP" in step 3406. Otherwise, the destination is also set to "To_FCP" in step 3406 in order to direct the frame to the CPU for error processing. If LUN, LBA, or a combination of LUN and LBA mapping is being carried out by the storage-shelf router, then the RLL determines, in step 3410, whether the designated destination disk has an associated entry in the IRT table. If so, then control flows to step 3404. Otherwise, in step 3412, the RLL determines whether or not range checking has been disabled. If range checking is disabled, then, in step 3414, the RLL determines if the frame was received on the FP0 port. If so, then the variable "destination" is set to "To_FP1" in step 3416. Otherwise, the contents of the variable "destination" is set to "To_FP0" in step 3418. If range checking is enabled, then, in step 3420, the RLL determines whether the designated destination disk is accessible via the FP0 port. If so, then control flows to step 3418. Otherwise, in step 3422, the RLL determines whether the designated destination disk is accessible via the FC port FP1. If so, then control flows step 3416. Otherwise, the variable "destination" is set to "To_FCP" in step 3406 for error handling purposes. In a final step, for frames mapped to one of the two FC ports in either steps 3416 or 3418, the RLL, in step 3424, determines whether the port to which the frame is currently directed is an S-space endpoint. If so, then the value of the variable "destination" is set to "To_FCP" in step 3406 in order to direct the frame to the FCP for error processing.

Figure 35:
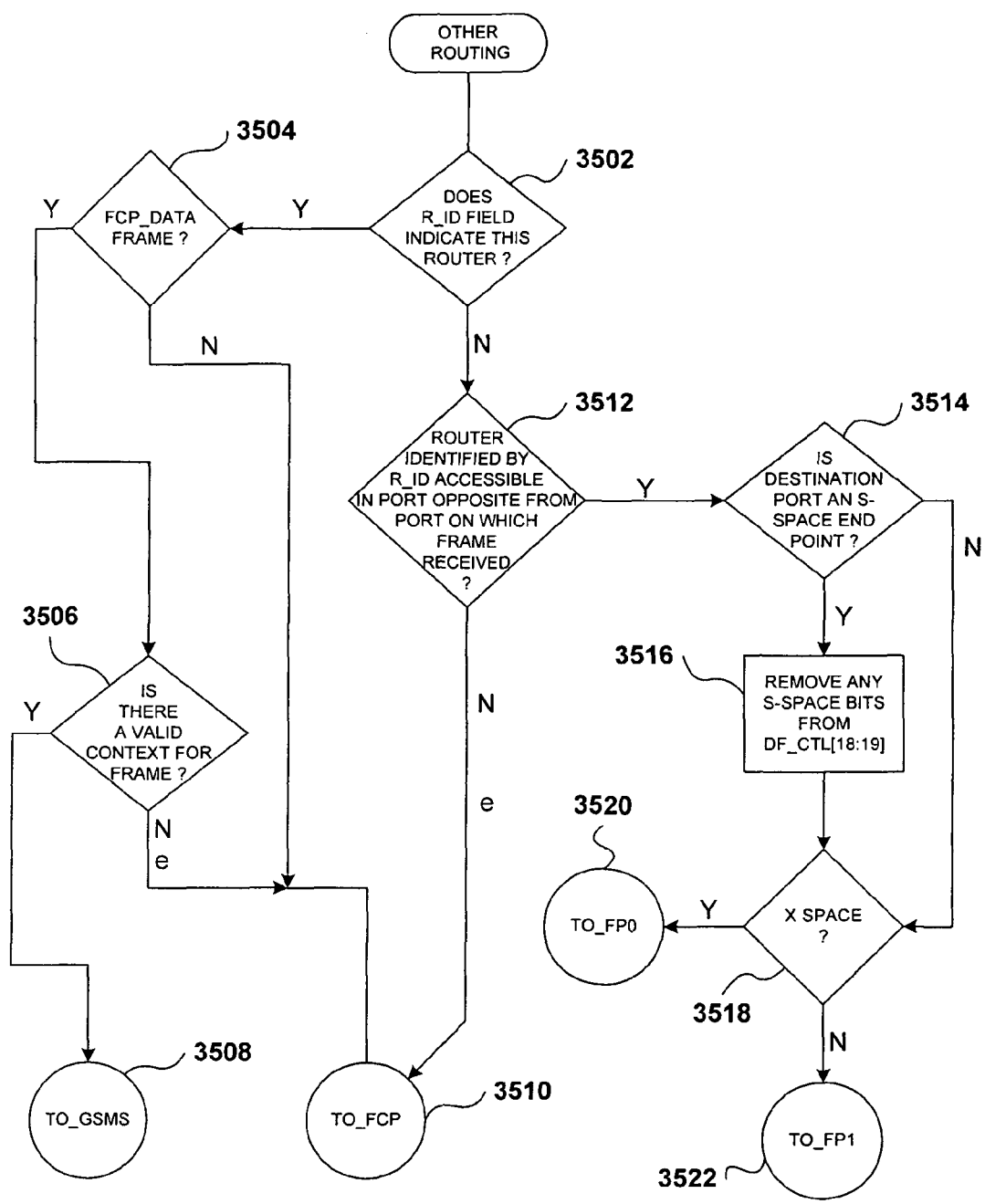

FIG. 35 is a flow-control-diagram representation of the sublogic "Other Routing," in step 3330 of FIG. 33. In step 3502, the RLL determines whether the RX_ID field of the frame indicates that the current storage-shelf router, or a disk drive connected to it, is the FC responder for the frame. If so, then in step 3504, the RLL determines whether or not the frame is an FCP_DATA frame. If so, then in step 3506, the RLL determines whether or not there is a valid context for the frame. If so, then the frame is directed to the GSMS, "To_GSMS," in step 3508, for transfer of the data to an SATA port, as discussed above. Otherwise, the frame is directed, in step 3510, to the FCP layer for error processing. If the RX_ID field of the FC-frame header does not indicate this storage-shelf router as the FC responder for the frame, as determined in step 3502, then, in step 3512, the RLL determines whether the storage-shelf router identified by the RX_ID field within the FC-frame header is accessible via the port opposite from the port on which the frame was received. If not, then the frame is queued to the queue "To_FCP" for error processing by the FCP layer. Otherwise in the case that the RX_ID identifies a storage-shelf router accessible from the port opposite from the port on which the frame was received, the RLL, in step 3514, determines whether that port is an S-fabric endpoint. If so, then in step 3516, the RLL removes any S-space bits set in the DF_CTL field of the FC frame header. In step 3518, the RLL determines to which of the X fabric and Y fabric the frame belongs and, in either step 3520 or 3522, queues the same to the queue appropriate for the fabric to which the frame belongs.

SCSI Command/ATA Command Translation

As discussed above, a the storage-shelf router that represents one embodiment of the present invention fields FCP_CMND frames, directed by the disk-array control to the storage-shelf router as if the FCP_CMND frames were directed to FC disk drives, and translates the SCSI commands within the FCP_CMND frames into one or more ATA commands than can transmitted to an SATA disk drive to carry out the SCSI command. Table 5, below, indicates the correspondence between SCSI commands received by the storage-shelf router and the ATA commands used to carry out the SCSI commands:

TABLE 5

| SCSI Command | ATA Command to which SCSI Command is Mapped |
| --- | --- |
| TEST UNIT READY | CHECK POWER MODE |
| REQUEST SENSE | |
| FORMAT UNIT | PMA WRITE |
| INQUIRY | IDENTIFY DEVICE |
| MODE SELECT | SET FEATURES |
| MODE SENSE | IDENTIFY DEVICE |
| START UNIT | IDLE IMMEDIATE |
| STOP UNIT | SLEEP |
| RECEIVE DIAGNOSTIC RESULTS | |
| SEND DIAGNOSTIC | EXECUTE DEVICE DIAGNOSTICS |
| READ CAPACITY | IDENTIFY DEVICE |
| READ | DMA READ |
| WRITE | DMA WRITE |
| SEEK | SEEK |
| WRITE AND VERIFY | DMA WRITE/READ VERIFY SECTORS |
| VERIFY | READ VERIFY SECTORS |
| WRITE BUFFER | DOWNLOAD MIRCOCODE |
| WRITE SAME | DMA WRITE |

Virtual Disk Formatting

In various embodiments, a storage-shelf router, or a number of storage-shelf routers, within a storage shelf may provide virtual disk formatting in order to allow disk-array controllers and other external processing entities to interface to an expected disk-formatting convention for disks within the storage shelf, despite the fact that a different, unexpected disk-formatting convention is actually employed by storage-shelf disk drives. Virtual disk formatting allows the use of more economical disk drives, such as ATA disk drives, without requiring disk-array controllers to be re-implemented in order to interface with ATA and SATA-disk-formatting conventions. In addition, a storage-shelf router, or a number of storage-shelf routers together, can apply different disk-formatting conventions within the storage shelf in order to incorporate additional information within disk sectors, such as additional error-detection and error-correction information, without exposing external computing entities, such as disk-array controllers, to non-standard and unexpected disk-formatting conventions.

Figure 36A:
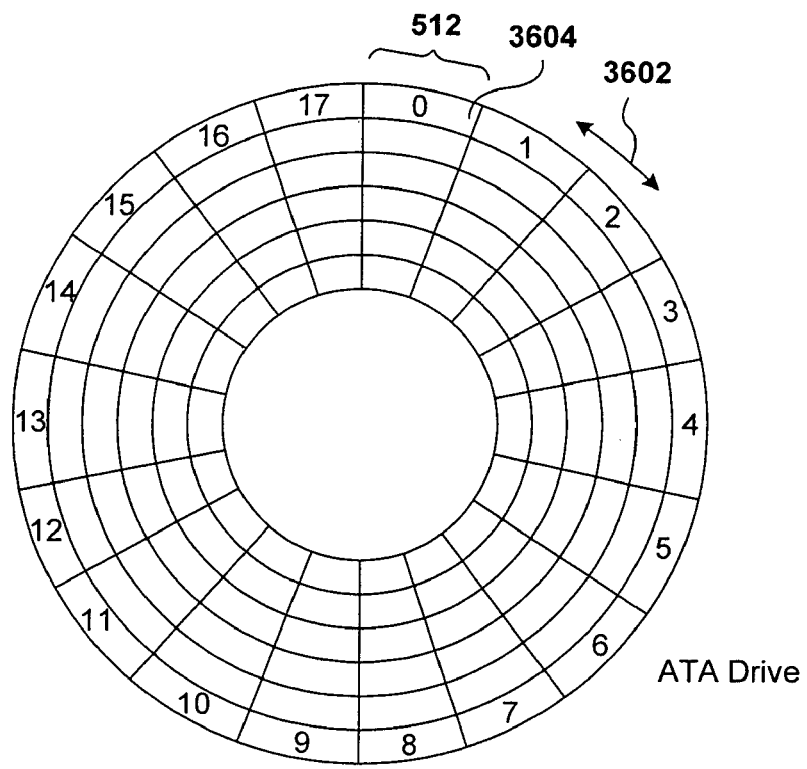
FIGS. 36A-B illustrate disk-formatting conventions employed by ATA and SATA disk drives and by FC disk drives.
Figure 36B:
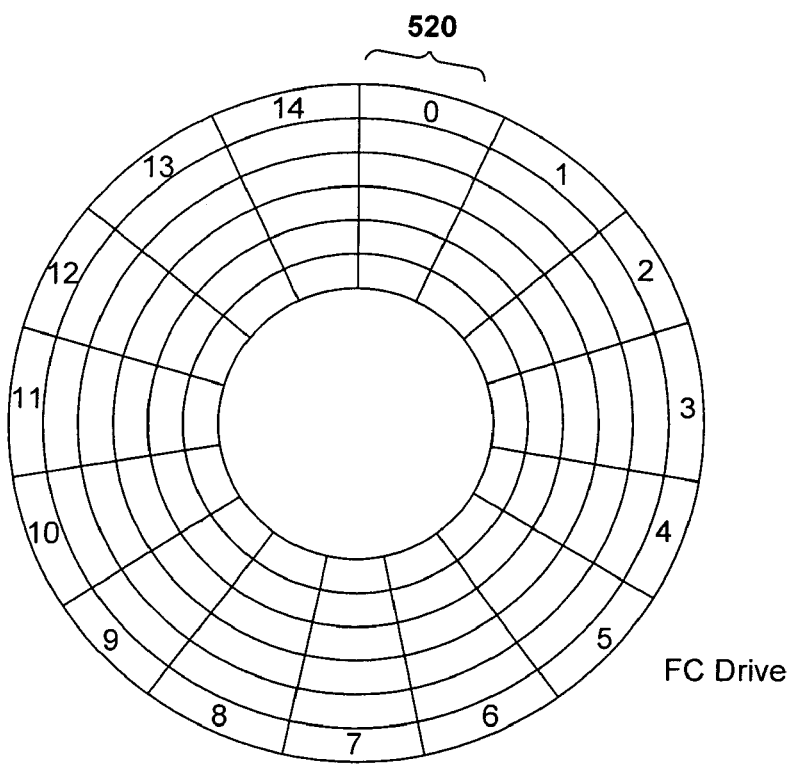

FIGS. 36A-B illustrate disk-formatting conventions employed by ATA disk drives and by FC disk drives. As shown in FIG. 36A, a disk drive is conceptually considered to consist of a number of tracks that are each divided into sectors. A track is a circular band on the surface of a disk platter, such as track 3602, an outer-circumferential band on an ATA disk-drive platter. Each track is divided into radial sections, called sectors, such as sector 3604, the first sector of the first track 3602. In general, disk access operations occur at the granularity of sectors. Modern disk drives may include a number of parallel-oriented platters. All like-numbered tracks on both sides of all of the parallel platters together compose a cylinder. In ATA disk drives, as illustrated in FIG. 36A, each sector of each track generally contains a data payload of 512 bytes. The sectors contain additional information, including a sector number and error-detection and error-correction information. This additional information is generally maintained and used by the disk-drive controller, and may not be externally accessible. This additional information is not relevant to the current invention. Therefore, sectors will be discussed with respect to the number of bytes of data payload included in the sectors.

FIG. 36B shows the conceptual track-and-sector layout for an FC disk drive. FC disk drives may employ 520-byte sectors, rather than the 512-byte sectors employed by ATA disk drives. Comparing the conceptual layout for an ATA or SATA disk drive, shown in FIG. 36A, to that for a FC disk drive, shown in FIG. 36B, it can be seen that, although both layouts in FIGS. 36A-B support an essentially equivalent number of data bytes, the ATA-disk drive format provides a larger number of smaller sectors within each track than the FC disk drive. In general, however, ATA disks and FC disks may not provide an essentially equal number of bytes, and FC disk may also be formatted with 512-byte sectors. It should be noted that FIGS. 36A-B illustrate disk formatting conventions at a simplified, conceptual level. In reality, disk drives may include many thousands or tens of thousands of tracks, each track containing a large number of sectors.

The storage-shelf router that, in various embodiments, is the subject of the present invention allows economical ATA disk drives to be employed within storage shelves of a fiber-channel-based disk array. However, certain currently available FC-based controllers may be implemented to interface exclusively with disk drives supporting 520-byte sectors. Although the manufacturer of an ATA or SATA-based storage shelf may elect to require currently-non-ATA-compatible disk-array controllers to be enhanced in order to interface to 512-byte-sector-containing ATA or SATA disk drives, a more feasible approach is to implement storage-shelf routers to support virtual disk formatting. Virtual disk formatting provides, to external entities such as disk-array controllers, the illusion of a storage shelf containing disk drives formatted to the FC-disk-drive, 520-byte-sector formatting convention, with the storage-shelf router or storage-shelf routers within the storage shelf handling the mapping of 520-byte-sector-based disk-access commands to the 512-byte-sector formatting employed by the ATA disk drives within the storage shelf.

Figure 37A:
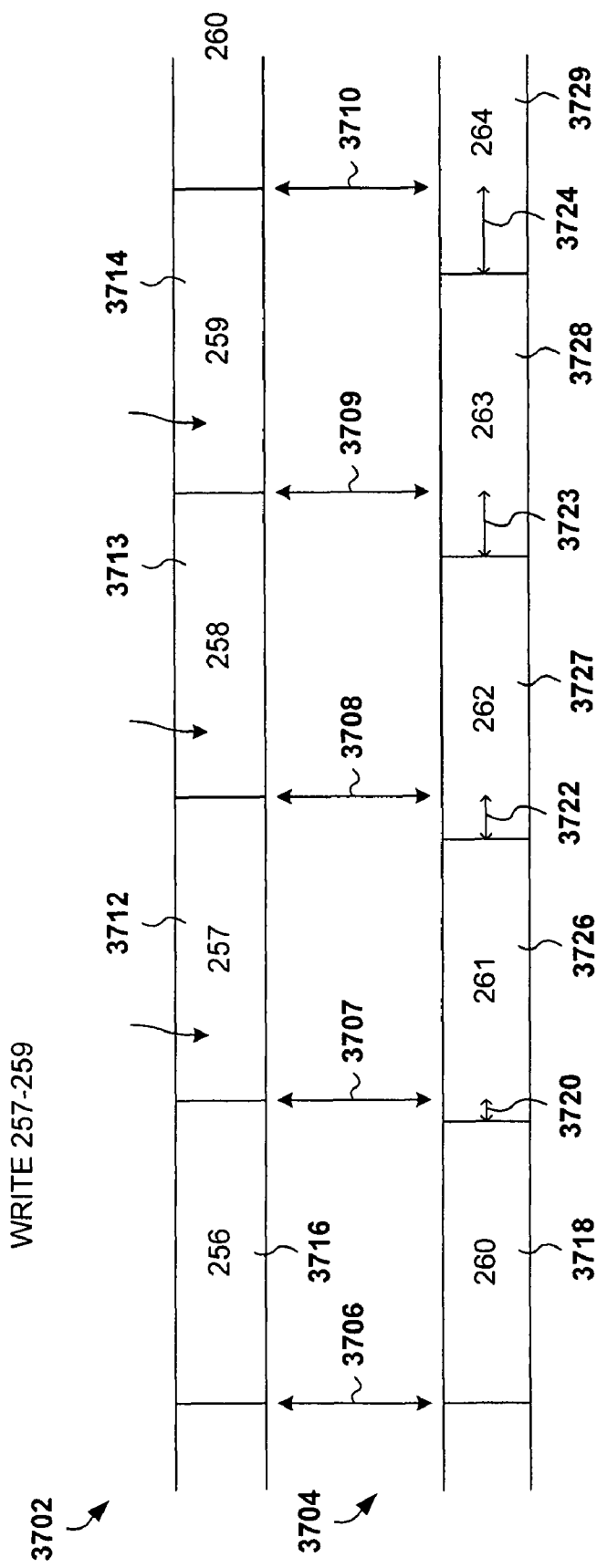
Figure 37B:
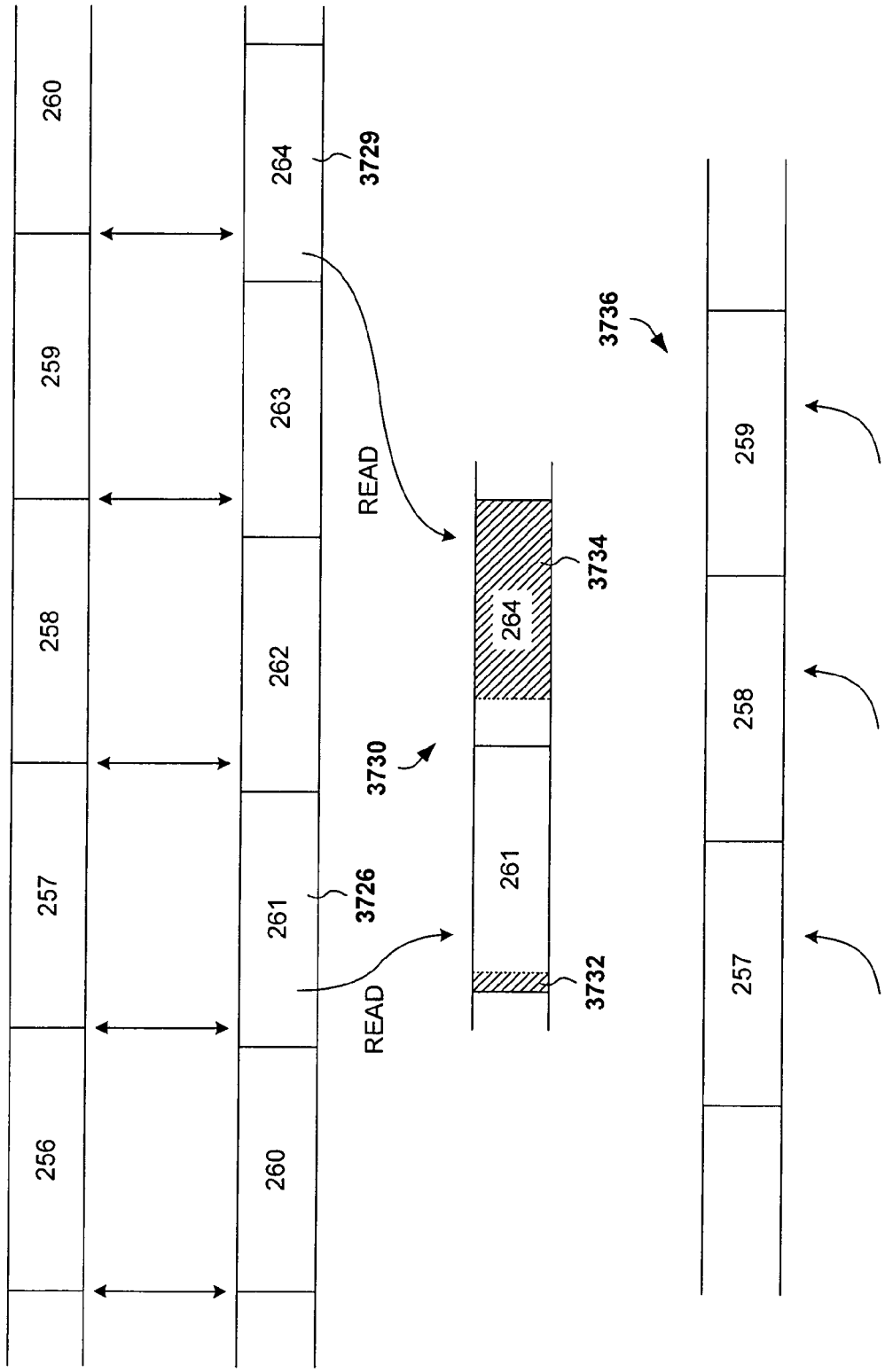
Figure 37D:
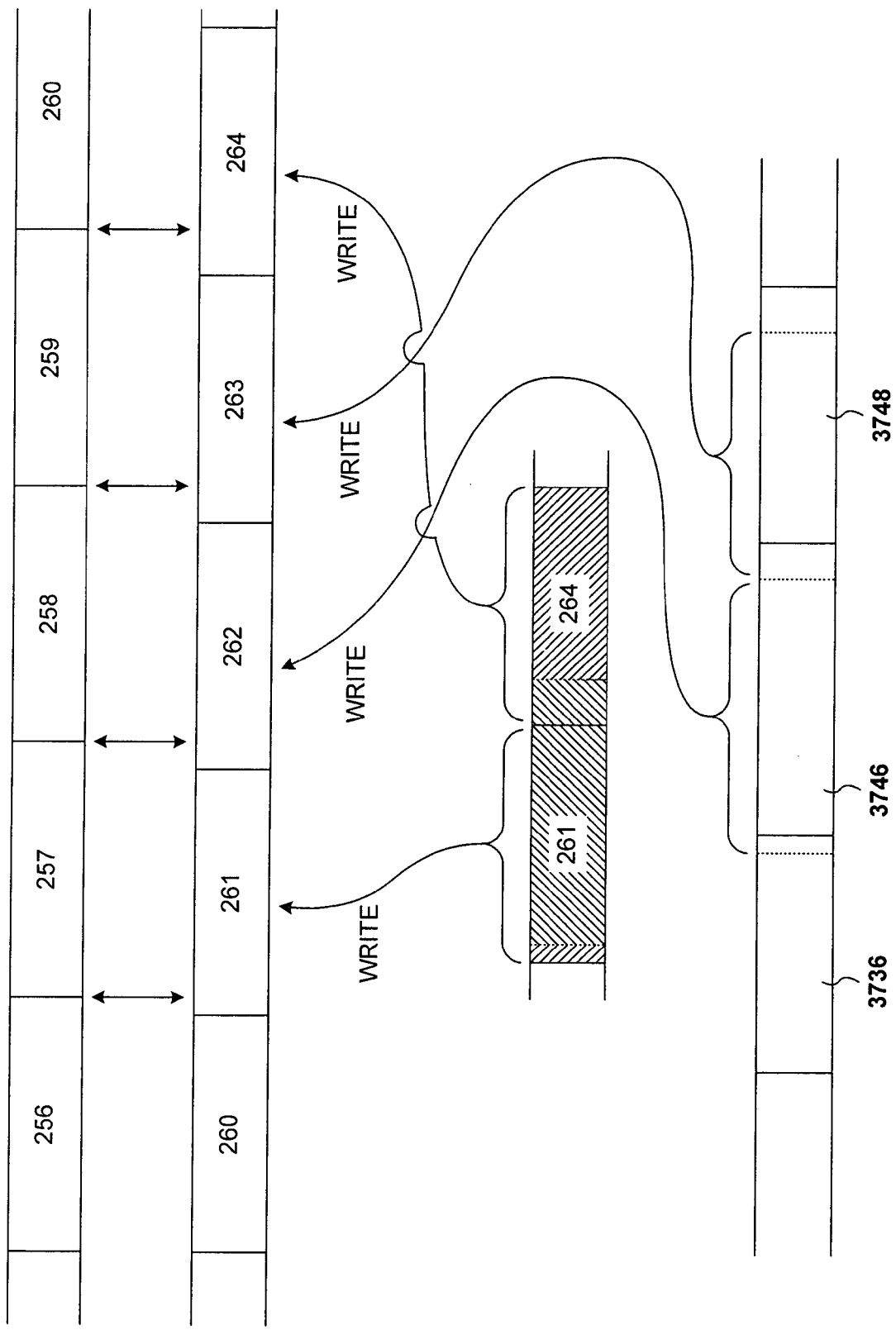

FIGS. 37A-D illustrate the virtual-disk-formatting implementation for handling a 520-byte WRITE access by an external entity, such as a disk-array controller, to a storage-shelf-internal 512-byte-based disk drive. As shown in FIG. 37A, external processing entities, such as disk-array controllers, view the disk to which a WRITE access is targeted as being formatted in 520-byte-sectors (3702 in FIG. 37A), although the internal disk drive is actually formatted in 512-byte-sectors (3704 in FIG. 37A). The storage-shelf router is responsible for maintaining a mapping, represented in FIG. 37A by vertical arrows 3706-3710, between the logical 520-byte-sector-based formatting 3702 and the actual 512-byte-sector formatting 3704. FIGS. 37B-D illustrate operations carried out by the storage-shelf router in order to complete a WRITE operation specifying virtual, 520-byte sectors 257-259 3712-3714 to the 512-byte-sector-based internal disk drive 3704. Assuming a sector-numbering convention in which the first sector of a disk drive is considered to be sector 0, and all subsequent sectors have monotonically increasing sector numbers, the virtual 520-byte sector 256 3716 begins at the beginning byte of the 512-byte sector 260 3718 on the actual disk drive, since 256×520=260×512=133,120. In other words, virtual 520-byte sector 256 and actual 512-byte sector 260 both begin with byte number 133,120. Although the beginning of virtual sector 256 and actual sector 260 mapped to the same byte address, 3706, virtual sector 256 extends past the end of actual sector 260, indicated by the mapping arrow 3707 in FIG. 37A. Therefore, the beginning of virtual sector 257 is offset from the beginning of actual sector 261 by a displacement of eight bytes 3720, and the beginnings of virtual sectors 258-260 are offset from the beginnings of actual sectors 262-264 by 16-byte, 24-byte, and 32-byte offsets 3722-3724. Therefore, in order to write virtual sectors 257-259 to the disk drive, the storage-shelf router needs to write data supplied by an external processing entity for virtual sectors 257-259 to actual disk sectors 261-264 (3726-3729).

FIG. 37B illustrates a first phase of the WRITE-operation processing carried out by the storage-shelf router in a virtual-formatting environment. As shown in FIG. 37B, the storage-shelf router first reads actual disk sectors 261 (3726) and 264 (3729) into a memory buffer 3730. The crosshatched portions of the data in the memory buffer 3732 and 3734 correspond to data read from the disk drive that is included in virtual sectors ditinct from the virtual sectors to which the WRITE access is addressed. Sectors 261 and 264 (3726 and 3729, respectively) are referred to as "boundary sectors," since they include the virtual sector boundaries for the access operation. The storage-shelf router concurrently receives the data to be written to virtual sectors 257-259 (3712-3714 in FIG. 37A, respectively) in a second memory buffer 3736.

FIG. 37C shows a second phase of storage-shelf router processing of a WRITE access. In FIG. 37C, the cross-hatched portions of the received data 3738 and 3740 are written to portions 3742 and 3744, respectively, of the buffered data read from the actual disk drive, shown in FIG. 37B.

FIG. 37D illustrates a final phase of the storage-shelf-router implementation of a WRITE access. In FIG. 37D, the buffered data prepared in memory buffer 3730 for actual disk sectors 261 and 264, along with the portions of the received data in the second memory buffer 3736 corresponding to actual disk sectors 262 and 263 (3746 and 3748, respectively), are all written to actual disk sectors 261-264. Note that the non-boundary disk sectors 262 and 263 can be written directly from the received-data buffer 3736.

Summarizing the storage-shelf-router implemented WRITE access in a virtual formatting environment, illustrated in FIGS. 37A-D, the storage-shelf router generally needs to first read the boundary sectors from the actual disk drive, map received data into the boundary sectors in memory, and then WRITE the boundary sectors and all non-boundary sectors to the disk drive. Therefore, in general, a 520-byte sector-based virtual write operation of n sectors is implemented by the storage-shelf router using two actual-disk-sector reads and 2+n−1 actual-disk-sector writes:

WRITE I/O(n virtual 520 sectors)→2 reads+2 writes+ (n−1)writes with a correspondingly decreased write efficiency of:

$$\text{WRITE I/O Efficiency} = \frac{n}{4 + (n-1)} \times 100$$

assuming that the virtual sectors are relatively close in size to actual disk sectors.

Figure 38A:
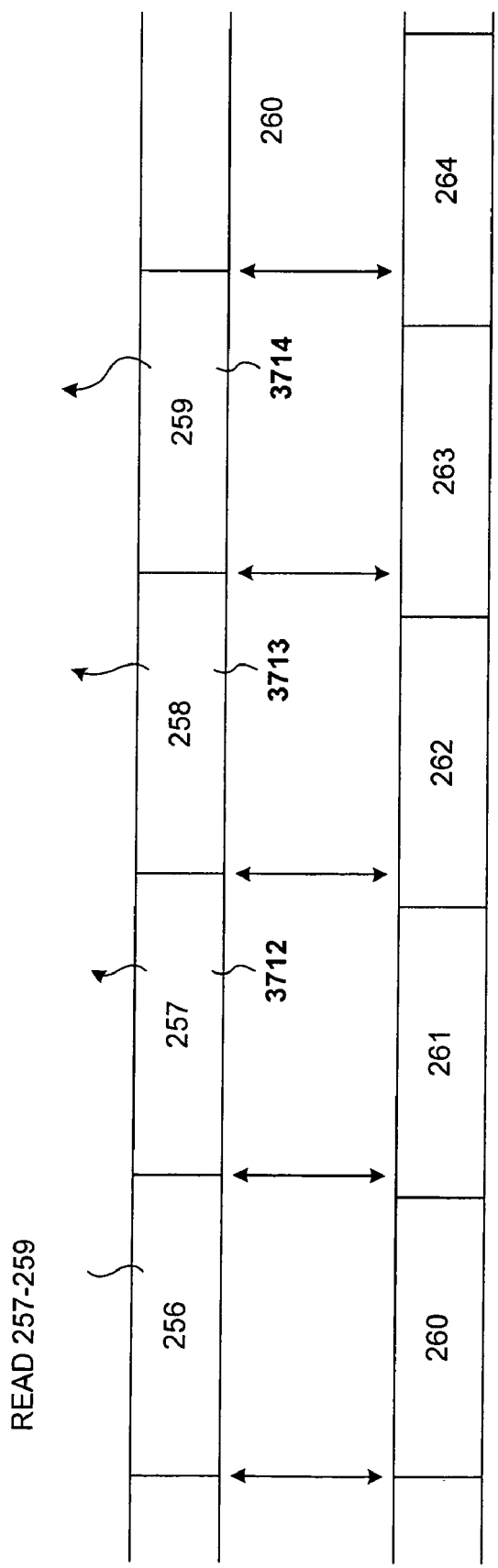
FIGS. 38A-B illustrate implementation of a 520-byte-sector-based virtual READ operation by a storage-shelf router.
Figure 38B:
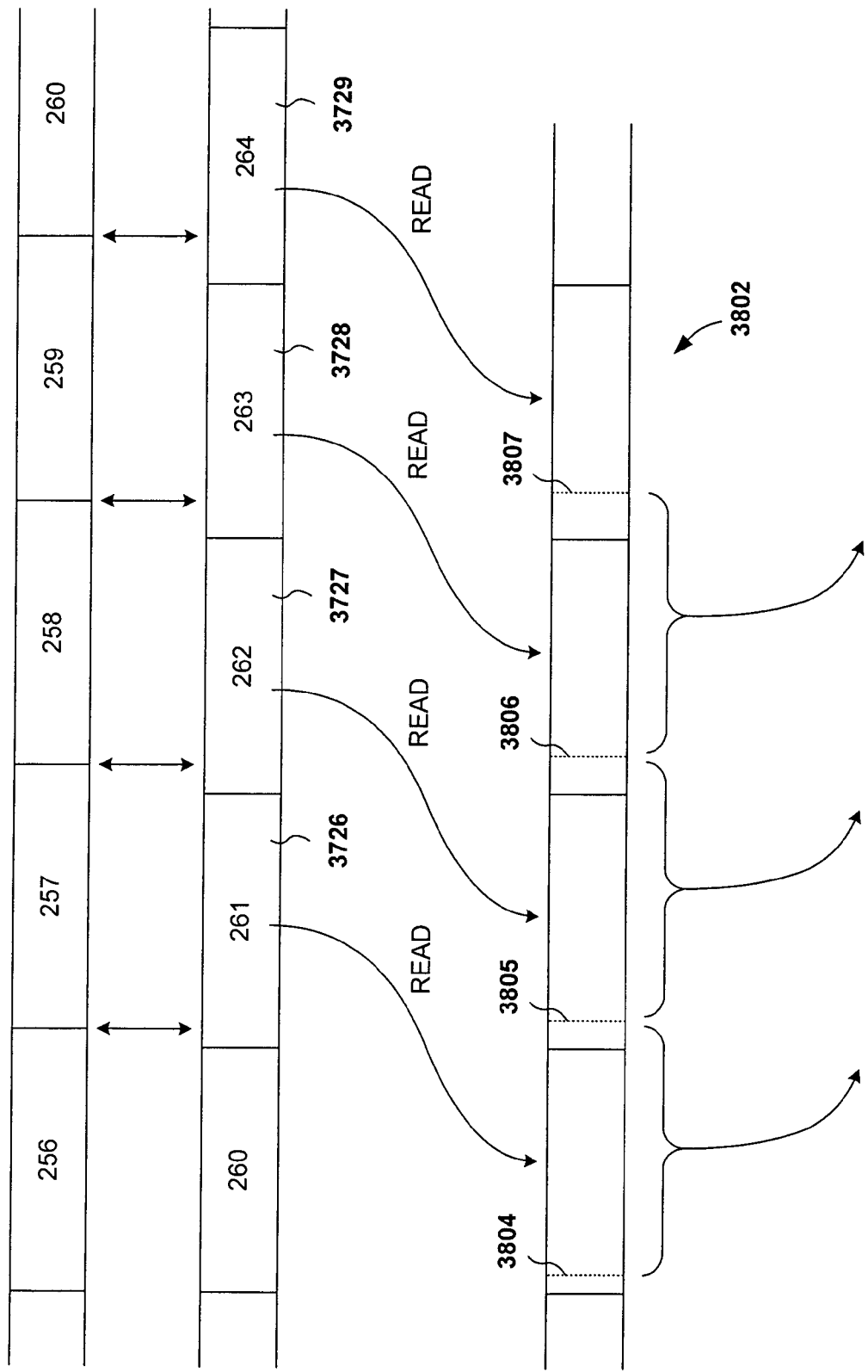

FIGS. 38A-B illustrate implementation of a virtual, 520-byte-sector-based READ operation by a storage-shelf router. FIG. 38A illustrates the same mapping between virtual 520-byte-based sectors and the 512-byte-sectors of an actual disk drive as illustrated in FIG. 37A, with the exception that, in FIG. 38A, an external processing entity, such as a disk-array controller, has requested a read of virtual sectors 257-259 (3712-3714, respectively). FIG. 38B illustrates the operations carried out by the storage-shelf router in order to implement a READ access directed to virtual sectors 257-259. The storage-shelf router first determines the actual disk sectors that contain the data requested by the external processing entity, which include boundary sectors 261 and 264 (3726 and 3729, respectively) and non-boundary sectors 262 and 263 (3727 and 3728, respectively). Once the storage-shelf router has identified the actual disk sectors containing the data to be accessed, the storage-shelf router reads those sectors into a memory buffer 3802. The storage-shelf router then identifies the virtual-sector boundaries 3804-3807 within the memory buffer and returns the data corresponding to the virtual sectors within the memory buffer 3802 to the requesting external processing entity, discarding any memory-buffer data preceding the first byte of the first virtual-sector 3804 and following the final byte of the final virtual sector 3807.

The illustration of the implementation of virtual disk formatting in FIGS. 37A-D and 38A-B is a high-level, conceptual illustration. Internally, the storage-shelf router employs the various data transmission pathways, discussed in previous subsections, in order to receive data from incoming FC_DATA packets, route the data through the storage-shelf router to an SATA port for transmission to a particular SATA disk drive, receive data from the SATA disk drive at a particular SATA port, route the data back through the storage-shelf router and transmit the data and status information in FC_DATA and FC STATUS packets transmitted back to the external processing entity. While several discrete memory buffers are shown in FIGS. 37B-D and 38D, the actual processing of data by the storage-shelf router may be accomplished with minimum data storage, using the virtual-queue mechanisms and other data-transport mechanisms described in previous subsections. The memory buffers shown in FIGS. 37B-D and 38B are intended to illustrate data processing by the storage-shelf router at a conceptual level, rather than at the previously discussed detailed level of data manipulation and transmission carried out within a storage-shelf router.

To summarize the read operation illustrated in FIGS. 38A-B, the storage-shelf router needs to read n plus 1 disk sectors in order to carry out a virtual READ of n virtual sectors, with a correspondingly decreased read efficiency, as expressed in the following equations:

READ I/O(n virtual 520 sectors)→1 reads+n reads with a correspondingly decreased read efficiency of:

$$\text{READ I/O Efficiency} = \frac{n}{n+1} \times 100$$

assuming that the virtual sectors are relatively close in size to actual disk sectors.

Figure 39:
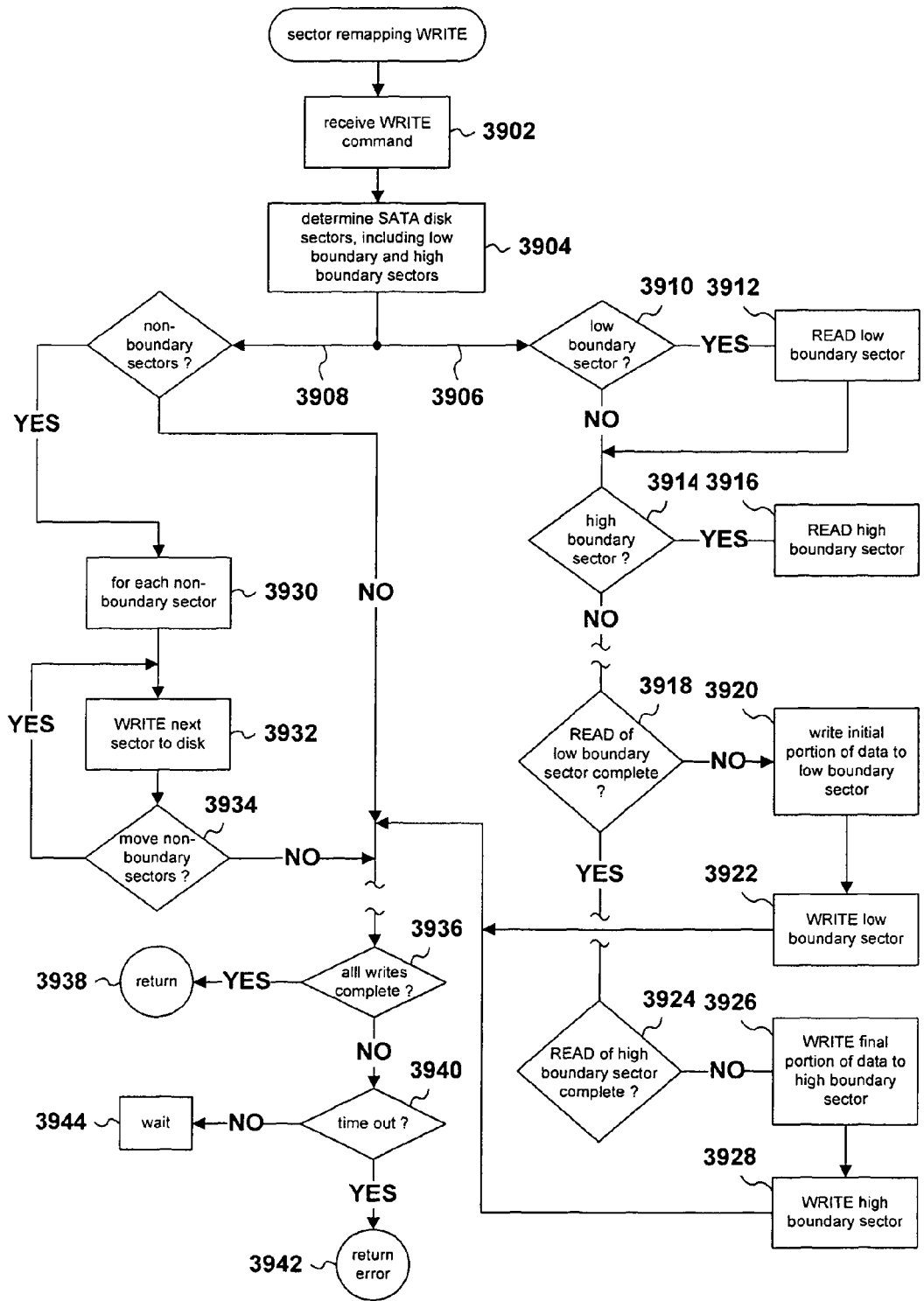
FIG. 39 is a control-flow diagram illustrating storage-shelf-router implementation of a virtual WRITE operation, as illustrated in FIGS. 37A-D.

FIG. 39 is a control-flow diagram showing the implementation, by a storage-shelf router, of a WRITE operation of a number of virtual sectors, as illustrated in FIGS. 37A-D. First, in step 3902, the storage-shelf router receives a WRITE command from an external processing entity specifying virtual sectors. Next, in step 3904, the storage-shelf router determines the actual disk sectors to be written, including the low-boundary and high-boundary sectors. Next, the storage-shelf router may undertake, in parallel, processing of the boundary sectors 3906 and processing of the non-boundary sectors 3908. Processing of the boundary sectors includes determining, in step 3910, whether there is a low-boundary sector associated with the received WRITE command. If so, then a read of the low-boundary sector is initiated in step 3912. Similarly, in step 3914, the storage-shelf router determines if there is a high-boundary sector involved in the WRITE operation, and, if so, initiates a READ operation for the high-boundary sector in step 3916. Note that, when the beginning of a virtual sector coincides with the beginning of an actual disk sector, as for virtual sector 256 and actual disk sector 260 in FIG. 37A, then no low-boundary sector is involved in the WRITE operation. Similarly, when the end of the high virtual sector coincides with the end of an actual disk sector, then there is no high-boundary sector involved in the WRITE operation.

When the READ operation of the low-boundary sector completes, as detected in step 3918, the storage-shelf router writes the initial portion of the received data associated with the WRITE command to the low-boundary sector in step 3920, and initiates a WRITE of the low-boundary sector to the disk drive, in step 3922. Similarly, when the storage-shelf router detects completion of the read of the high-boundary sector, in step 3924, the storage-shelf router writes the final portion of the received data into a memory buffer including the data read from the high-boundary sector, step 3926, and initiates a WRITE of the high boundary sector to the disk drive, in step 3928. In a one embodiment of the present invention, the disk sectors are written to disk in order from lowest sector to highest sector. For non-boundary sectors, the storage-shelf router writes each non-boundary sector, in step 3932, to the disk drive as part of the for-loop including steps 3930, 3932, and 3934. When the storage-shelf router detects an event associated with the virtual WRITE operation, the storage-shelf router, step 3936, determines whether all initiated WRITE operations have completed. If so, then the WRITE operation has successfully completed in step 3938. Otherwise, the storage-shelf router determines whether the WRITE operation of the virtual sectors has timed out, in step 3940. If so, then error condition obtains in step 3942. Otherwise, the storage-shelf router continues to wait, in step 3944, for completion of all WRITE operations.

Figure 40:
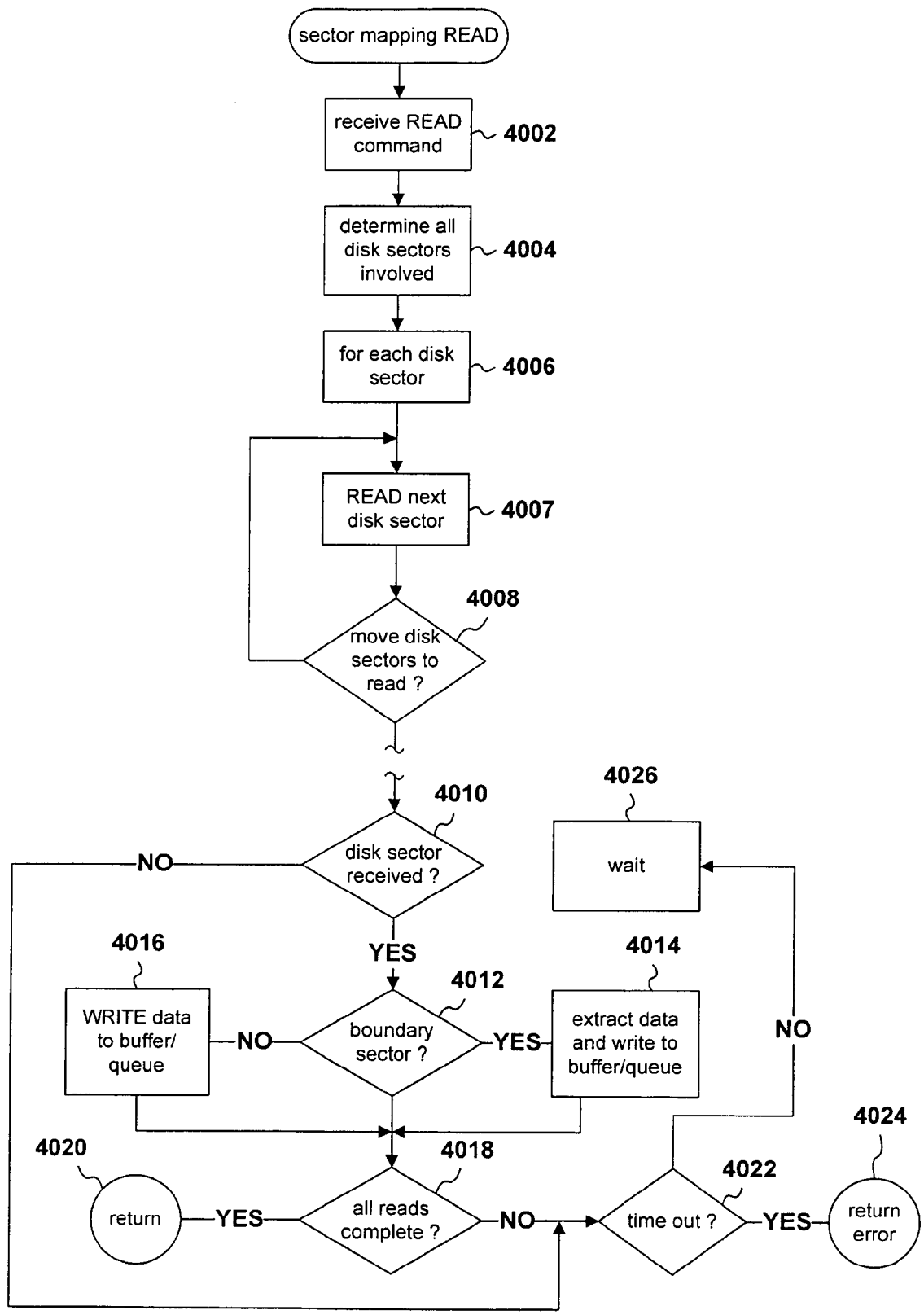
FIG. 40 is a control-flow diagram illustrating storage-shelf-router implementation of a virtual READ operation, as illustrated in FIGS. 38A-B.
Figure 4I:
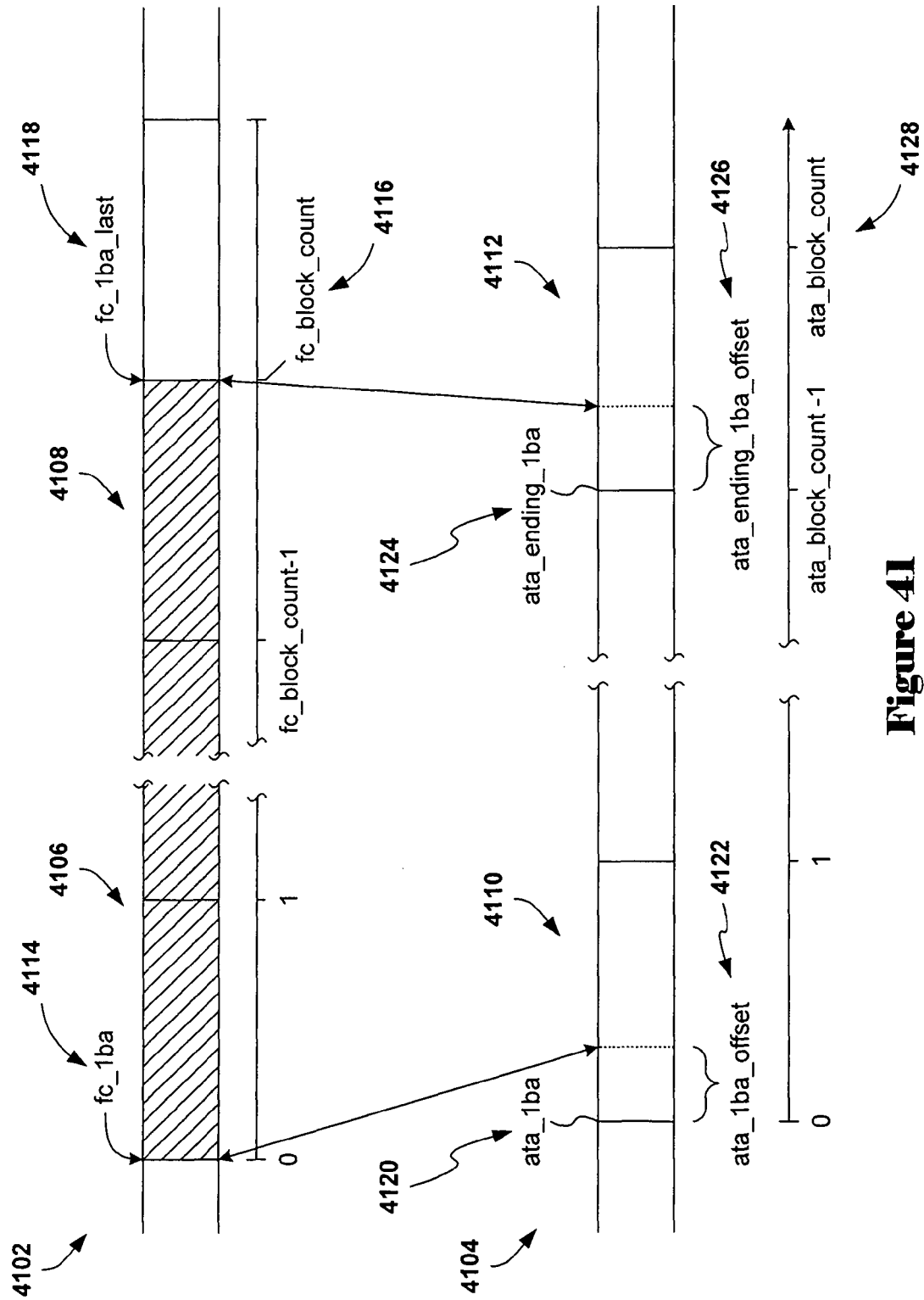

FIG. 40 is a control-flow diagram for implementation by a storage-shelf router of a READ operation directed to one or more virtual sectors, as illustrated in FIGS. 38A-B. In step 4002, the storage-shelf router receives the read command from an external processing entity. In step 4004, the storage-shelf router determines the identities of all actual disk sectors involved in the read operation, including the boundary sectors. Next, in the for-loop composing steps 4006-4008, the storage-shelf router reads each actual disk sector involved in the read operation. When the storage-shelf router detects occurrence of an event associated with the virtual READ operation, the storage-shelf router determines, in step 4010, whether a disk sector requested via a READ operation has been received. If so, then in step 4012, the storage-shelf router determines whether a boundary-sector READ has completed. If so, then in step 4014, the storage-shelf router extracts from the boundary sector the data relevant to the virtual READ operation and writes that data to a buffer or queue for eventual transmission to the requesting processing entity. If the received sector is not a boundary sector, then the storage-shelf router, in step 4016, simply writes the received data to an appropriate position within a buffer or queue for eventual transmission to the requesting processing entity. If all reads have successfully completed, as determined in step 4018, then the virtual READ operation successfully terminates in step 4020, of course providing that the data read from the disk drive is successfully transmitted back to the processing entity. Otherwise, the storage-shelf router determines whether a timeout has occurred, in step 4022. If so, then an error condition obtains, in step 4024. Otherwise, the storage-shelf router continues to wait, in step 4026, for completion of another READ operation.

The mapping of 520-byte FC-disk-drive sectors to 512-byte ATA-disk-drive sectors, in one embodiment of the virtual formatting method and system of the present invention, can be efficiently computed. FIG. 41 illustrates the calculated values needed to carry out the virtual formatting method and system representing one embodiment of the present invention. In FIG. 41, the top-most, horizontal band of sectors 4102 represents virtually mapped, 520-byte sectors, and the bottom horizontal band 4104 represents physical, 512-byte ATA sectors. FIG. 41 illustrates mapping virtual sectors 4106 through 4108 to physical sectors 4110 through 4112. For the example shown in FIG. 41, assume that virtual sectors 400 409 are to be mapped to corresponding physical sectors. The logical block address ("LBA") of the first virtual sector, "fc_lba" 4114, therefore has the value "400," and the number of virtual blocks to be mapped, "fc_block_count" 4116, is therefore 10. The calculated value "fc_lba_last" 4118 is "410," the LBA of the first virtual sector following the virtual sector range to be mapped. The logical block address of the first physical sector including data for the virtual sectors to be mapped, "ata_lba" 4120, is computed as:

$$ata\_lba = fc\_lba + (fc\_lba >> 6)$$

using familiar C-language syntax and operators. In the example, the computed value for ata_lba is "406." This calculation can be understood as adding to the LBA of the first virtual sector a number of physical sectors computed as the total number of virtual sectors preceding the first virtual sector divided by 64, since each continuous set of 64 virtual sectors exactly maps into a corresponding contiguous set of 65 physical sectors, or, in other words:

$$64*520 = 65*512 = 33280$$

The offset from the beginning of the first physical sector to the byte within the first physical sector corresponding to the first byte of the first virtual sector, "ata_lba_offset" 4122, is computed as follows:

$$ata\_lba\_offset = (fc\_lba \& 63) << 3$$

In the example, the value calculated for ata_lba_offset is "128." This computation can be understood as determining the number of 8-byte shifts within the first physical block needed, 8 bytes being the difference in virtual sector and physical sector lengths, with the number of virtual sectors following the starting virtual sector LBA divided by 64 corresponding to the number of 8-byte shifts needed. The last, physical, boundary-block LBA, "ata_ending_lba" 4124, is computed as:

$$ata\_ending\_lba = fc\_lba\_last + (fc\_lba\_last >> 6)$$

In the example, the calculated value for ata_ending_lba is "416." The above computation is equivalent to that for the first physical sector "ata_lba." The offset within the last, physical boundary block corresponding to the first byte not within the virtual sectors, "ata_ending_lba_offset" 4126, is computed as:

$$ata\_ending\_lba\_offset = (fc\_lba\_last \& 63) << 3$$

In the example, the calculated value for ata_ending_lba_offset is "208." If the computed values for ata_ending_lba_offset is "0," then:

$$ata\_ending\_lba = ata\_ending\_lba - 1$$

since the final byte of the virtual sectors corresponds to the final byte of a physical sector, and no last, partially relevant, boundary sector needs to be accessed. In the example, the value for ata_ending_lba is unchanged by this final step. The number of physical blocks corresponding to the virtual sectors, "ata_block_count," is finally computed as:

$$ata\_block\_count = ata\_ending\_lba - ata\_lba + 1$$

In the example, the calculated value for ata_block_count is "11." It should be noted that similar, but different, calculations can be made in the case that the virtual sectors are smaller than the physical sectors. Any size virtual sectors can be mapped to any size of physical sectors by the method of the present invention.

Figure 42:
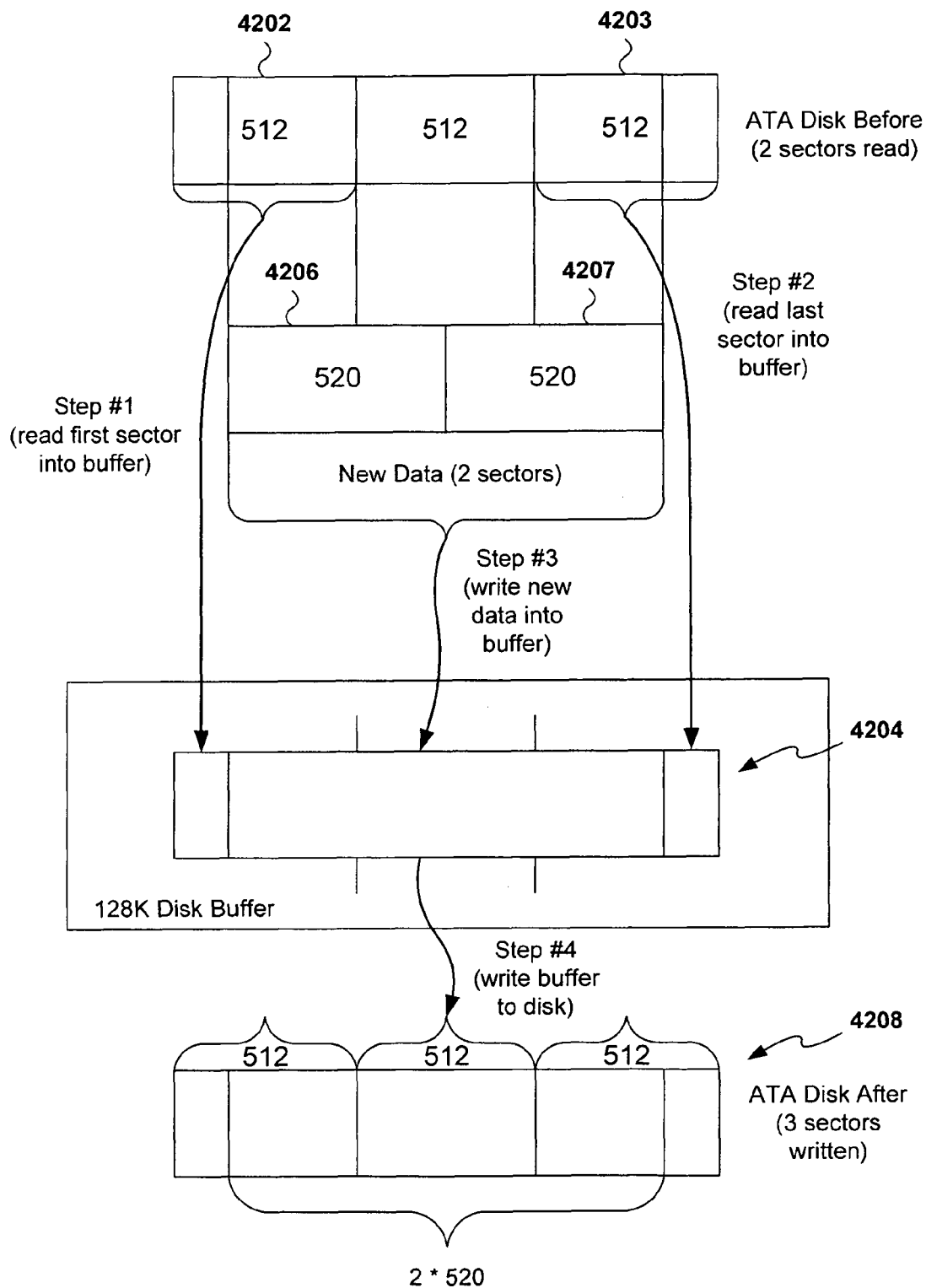
FIG. 42 illustrates a virtual sector WRITE in a discrete virtual formatting implementation that represents one embodiment of the present invention.

FIG. 42 illustrates a virtual sector WRITE in a discrete virtual formatting implementation that represents one embodiment of the present invention. The discrete virtual formatting implementation involves a firmware/software implementation of the storage-router functionality within a storage-router-like component that employs a general-purpose processor and stored firmware/software routines for providing the storage-router interface provided by the integrated-circuit storage-router implementation that represents one embodiment of the present invention. As shown in FIG. 42, the physical boundary sectors 4202-4203 are read into a 128K disk buffer 4204, and the received contents of the virtual sectors 4206-4207 are written into the 128K disk buffer 4204, overwriting portions of the physical boundary data corresponding to virtual sector data. The contents of the 128K disk buffer 4204 are then written to the ATA disk drive 4208. Thus, virtual disk formatting can be carried out using a software/firmware/general-processor-based component.

Figure 43:
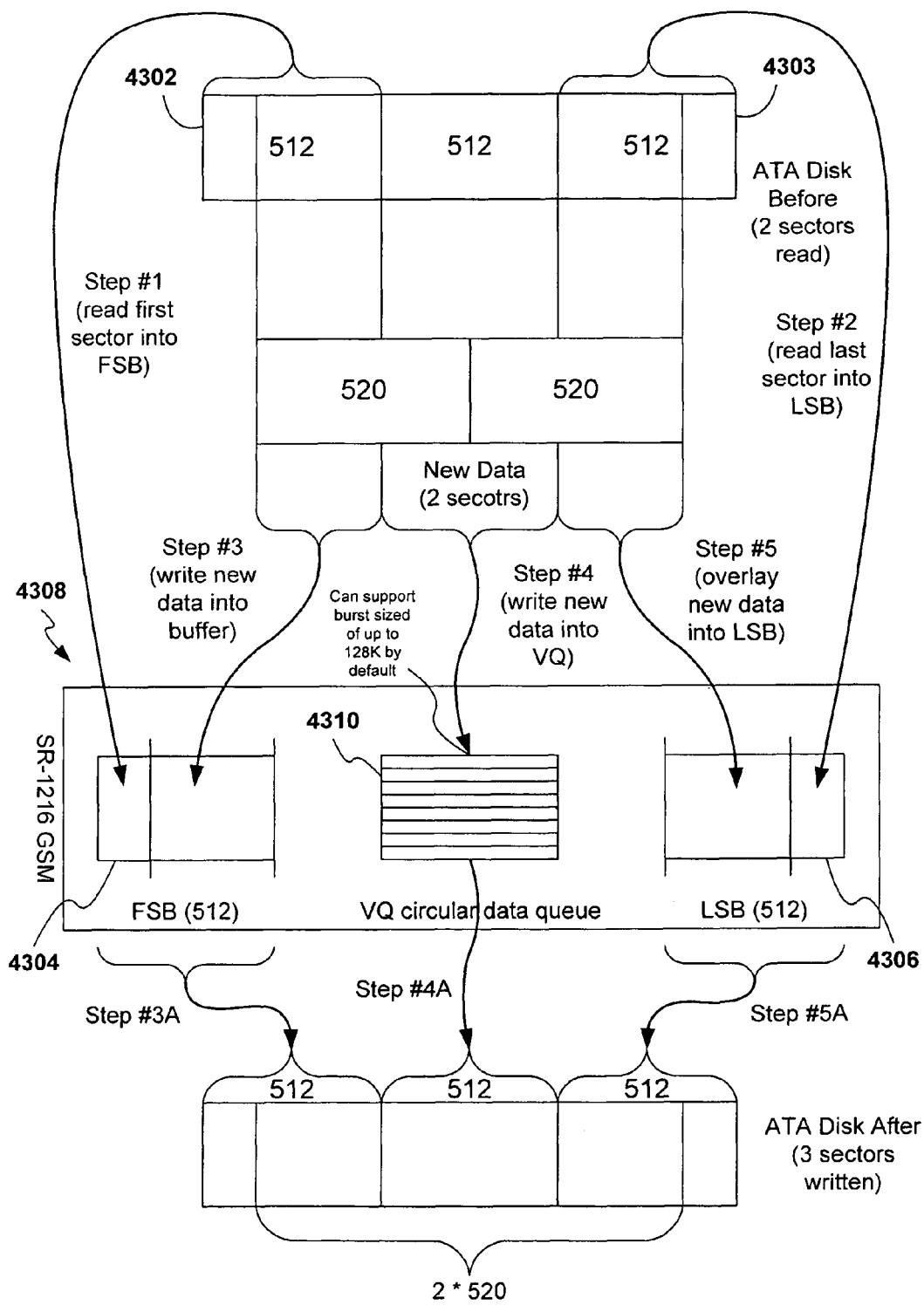
FIG. 43 illustrates a virtual sector WRITE in a storage-shelf-based discrete virtual formatting implementation that represents one embodiment of the present invention.

FIG. 43 illustrates a virtual sector WRITE in an integrated-circuit storage-shelf-based virtual formatting implementation that represents one embodiment of the present invention. As shown in FIG. 43, the physical boundary sectors 4302-4303 are read into a first sector buffer ("FSB") 4304 and a last sector buffer ("LSB") 4306 within the GSM 4308, the FSB and LSB are overlaid with the virtual sector data, and the remaining virtual sector data is set up for transfer through a virtual queue 4310 within the GSM 408 associated with the FSB and LSB. The contents of the FSB and LSB and data directed to the virtual queue are then transferred to the ATA disk by the data transfer mechanisms discussed in previous subsections.

Note that the control-flow diagrams in FIGS. 39-40 represent fairly high, conceptual illustration of storage-shelf operations associated with virtual WRITE and virtual READ commands. In particular, the details of data flow and disk operations, detailed in above sections, are not repeated, in the interest of brevity and clarity.

The virtual disk formatting described with reference to FIGS. 36-43 allows, as discussed above, a storage-shelf router to provide an illusion to external computing entities, such as disk-array controllers, that the storage shelf managed by the storage-shelf router contains 520-byte-sector FC disk drives while, in fact, the storage shelf actually contains 512-byte-sector ATA or SATA disk drives. Similarly, virtual disk formatting can be used by the storage-shelf router to provide an interface to any type of disk formatting expected or desired by external entities, despite the local disk formatting employed within the storage shelf. If, for example, a new, extremely economical 1024-byte-sector disk drive becomes available, the virtual disk formatting technique allows a storage-shelf router to map virtual 520-byte-sector-based access operations, or 512-byte-sector-based access operations, to the new, 1024-byte-sector-based disk drives. In addition, multiple layers of virtual disk formatting may be employed by the storage-shelf router in order to provide or enhance error-detection and error-correction capabilities of disk drives that rely on added information stored within each sector of the disk drive.

Figure 44:
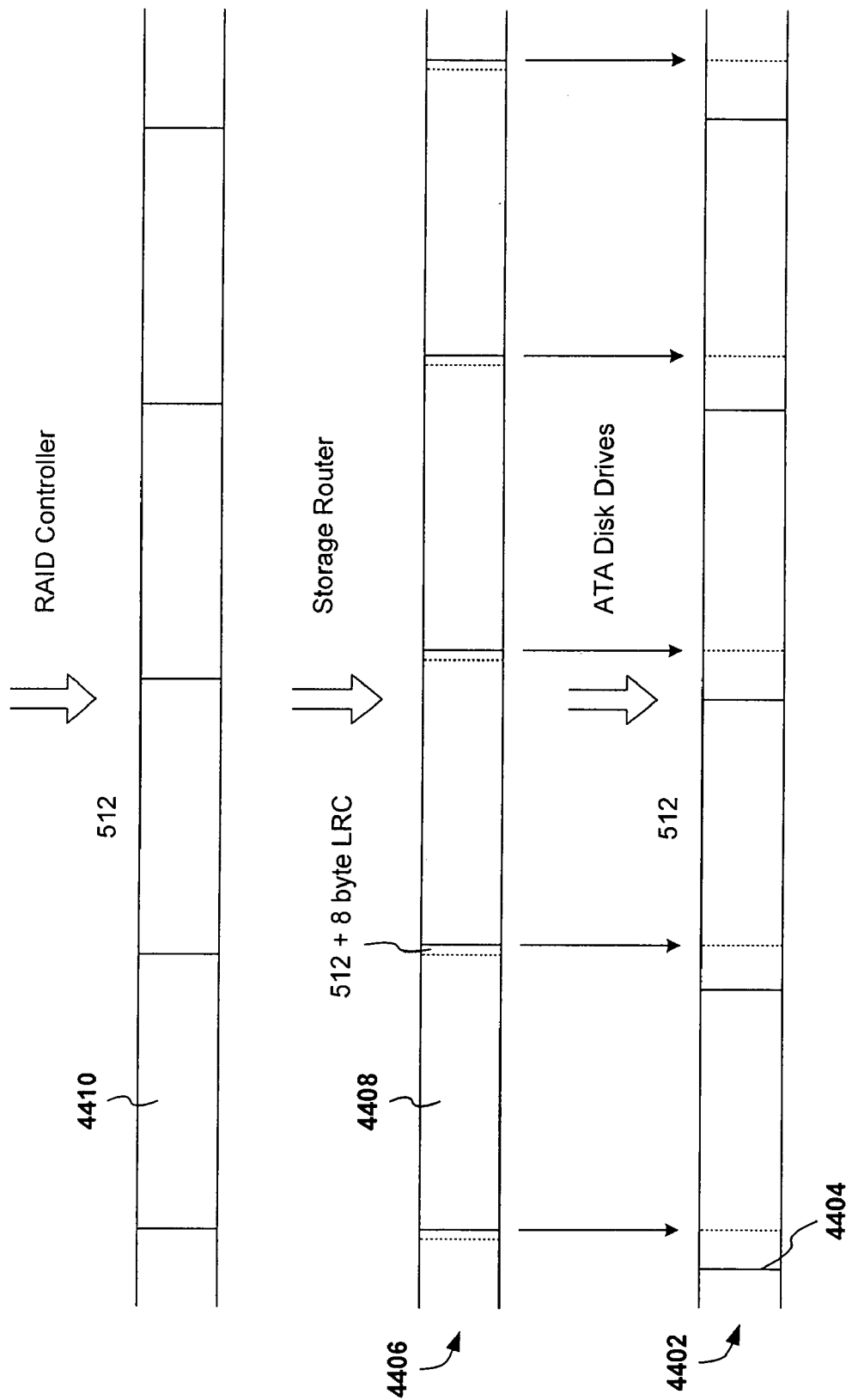
FIG. 44 illustrates a two-level virtual disk formatting technique that allows a storage-shelf router to enhance the error-detection capabilities of ATA and SATA disk drives.

FIG. 44 illustrates a two-layer virtual disk formatting technique that allows a storage-shelf router to enhance the error-detection capabilities of ATA disk drives. In FIG. 44, the ATA disk drives employ 512-byte sectors, indicated by a linear subsequence of sectors 4402 with solid vertical lines, such as solid vertical line 4404, representing 512-byte sector boundaries. The storage-shelf router, as illustrated in FIG. 44 by a short subsequence 4406 of 512-byte sectors, uses the above-discussed virtual disk formatting technique to map 520-byte sectors to the underlying disk-drive-supported 512-byte sectors. Each 520-byte virtual sector, such as virtual sector 4408, includes a 512-byte payload and an additional eight-byte longitudinal redundancy code ("LRC") field appended to the 512-byte payload. In other words, the storage-shelf router employs a first virtual disk formatting layer to map 520-byte sectors to underlying 512-byte sectors of ATA disk drives. However, in this embodiment, the storage-shelf router employs a second virtual disk formatting level to map externally visible, 512-byte, second-level-virtual sectors, such as virtual sector 4410, to 520-byte first-level-virtual sectors, such as first-level virtual sector 4408, which are in turn mapped by the storage-shelf router to 512-byte disk sectors. This two-tiered virtualization allows the storage-shelf router to insert the additional eight-byte LRC fields at the end of each sector. Although an external processing entity, such as a disk-array controller, interfaces to the second-level virtual disk formatting layer supporting 512-byte sectors, the same formatting used by the disk drives, the external processing entity views less total sectors within a disk drive than the actual number of sectors supported by the disk drive, since the storage-shelf router stores the additional eight-byte LRC fields on the disk drive for each sector. Moreover, the external entity is not aware of the LRC fields included in the disk sectors.

FIG. 45 illustrates the content of an LRC field included by the storage-shelf router in each first-level virtual 520-byte sector in the two-virtual-level embodiment illustrated in FIG. 44. As shown in FIG. 45, the first 512 bytes of a 520-byte virtual sector 4502 are payload or data bites. The final eight bytes of the LRC field include two reserved bytes 4504, a cyclic redundancy check ("CRC") subfield comprising two bytes 4506, and a logical block address 4508 stored in the final four bytes. The CRC field includes a CRC value computed by the well-known CRC-CCITT technique. Computation of this value is described below, in greater detail. The logical block address ("LBA") is a sector address associated with the virtual sector.

The contents of the LRC field allows the storage-shelf router to detect various types of errors that arise in ATA disk drives despite the hardware-level ECC information and disk-drive controller techniques employed to detect various data-corruption errors. For example, a READ request specifying a particular sector within a disk drive may occasionally result in returning data by the disk-drive controller associated with a different sector. The LBA within the LRC field allows the storage-shelf router to detect such errors. In addition, the disk drive may suffer various levels of data corruption. The hardware-supplied ECC mechanisms may detect one-bit or two-bit parity errors, but the CRC values stored in the CRC field 4506 can detect, depending on the technique employed to compute the CRC value, all one-bit, two-bit, and three-bit errors as well runs of errors of certain length ranges. In other words, the CRC value provides enhanced error-detection capabilities. By employing the two-tiered virtual disk formatting technique illustrated in FIG. 44, the storage-shelf router is able to detect a broad range of error conditions that would be otherwise undetectable by the storage-shelf router, and to do so in a manner transparent to external processing entities, such as disk-array controllers. As mentioned above, the only non-transparent characteristic observable by the external processing entity is a smaller number of sectors accessible for a particular disk drive.

FIG. 46 illustrates computation of a CRC value. As shown in FIG. 46, the payload or data bytes 4602 and the LBA field 4604 of a 520-byte virtual sector are together considered to represent a very large number. That very large number is divided, using modulo-2 division, by a particular constant 4606, with the remainder from the modulo-2 division taken as the initial CRC value 4608. Note that the constant is a seventeen-bit number, and therefore the remainder from modulo-2 division is at most 16 bits in length, and therefore fits within the two-byte CRC field. The initial CRC value is subject to an EXCLUSIVE OR ("XOR") operation with the constant value "FFFF" (hexadecimal notation) to produce the final CRC value 4610. The constant 4606 is carefully chosen for algebraic properties that ensure that small changes made to the large number comprising the data bytes 4602 and LBA field 4604 result in a different remainder, or initial CRC value, following modulo-2 division by the constant. Different CRC computational techniques may employ different constants, each with different algebraic properties that provide slightly different error-detection capabilities.

Figure 47:
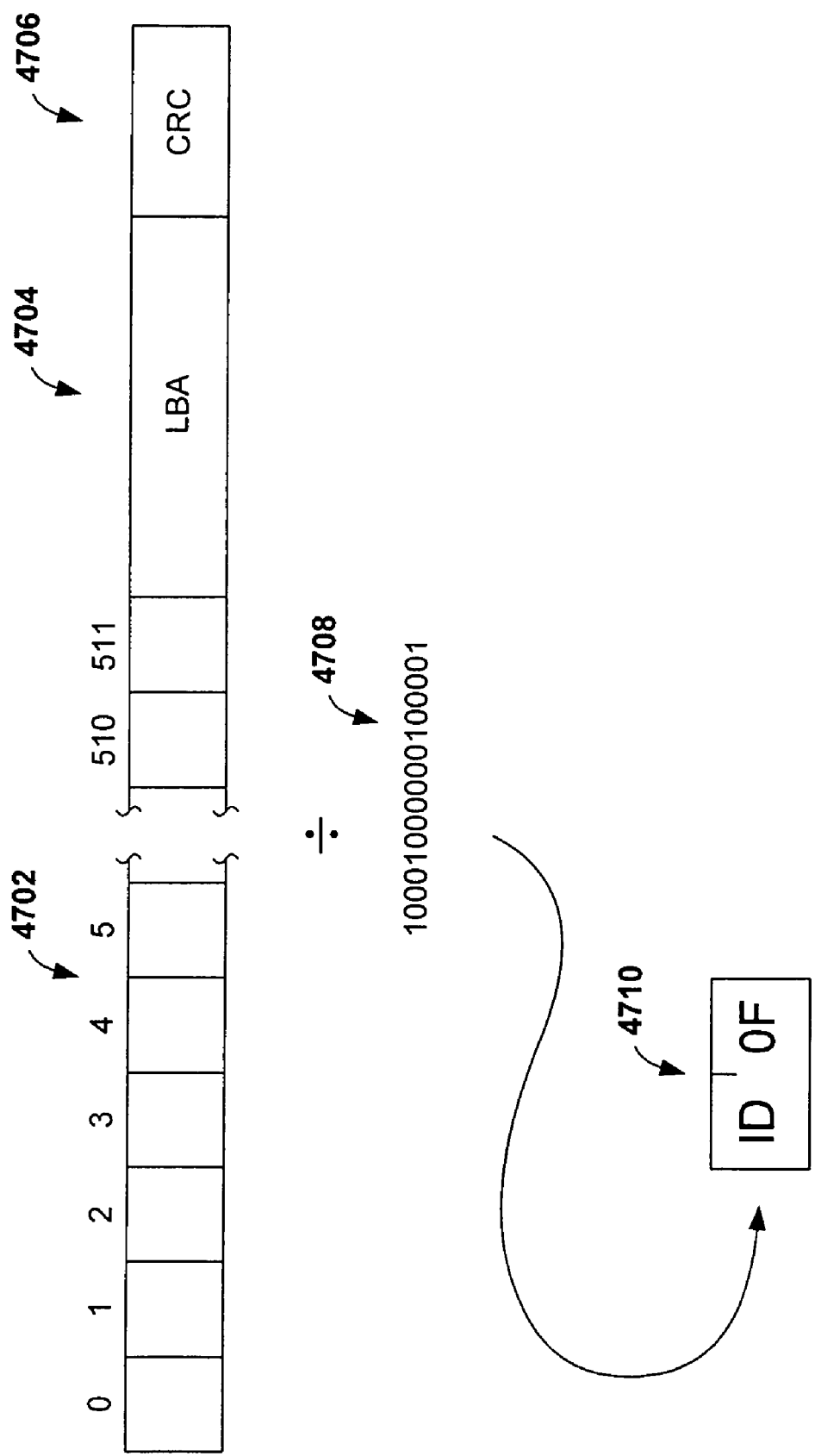
FIG. 47 illustrates a technique by which the contents of a virtual sector are checked with respect to the CRC field included in the LRC field of the virtual sector in order to detect errors.

FIG. 47 illustrates a technique by which the contents of a virtual sector are checked with respect to the CRC field included in the LRC field of the virtual sector in order to detect errors. For example, when the storage-shelf router reads the contents of a virtual sector from two disk sectors, the storage-shelf router can check the contents of the virtual sector with respect to the CRC field to determine whether any detectable errors have occurred in storing or reading the information contained within the virtual sector. When a virtual sector is read from a disk, the storage-shelf router combines the data bytes 4702, the LBA field 4704, and the CRC field 4706 together to form a very large number. The very large number is divided, by modulo-2 division, by the same constant number 4708 employed to compute the CRC value, and the remainder is employed as a check value 4710. When the CRC-CCITT technique is employed, the check value 4710 is "1D0F" (hexadecimal) when the retrieved data, LBA, and CRC fields are identical to the data and LBA for which the initial CRC value was computed. In other words, when the check value 4710 has the constant value "1D0F," then the storage-shelf router is confident that no errors have occurred in the storage and retrieval of the virtual sector. Of course, the CRC technique is not infallible, and there is a very slight chance of silent errors. Note that the constant check value occurs because appending the initially calculated CRC to the data and LBA is equivalent to multiplying the number comprising the data and LBA by $2^{16}$, and because the number comprising the data, LBA, and initially calculated CRC is, by the CRC-CCITT technique, guaranteed to be evenly divisible by the constant value 4708.

Figure 48:
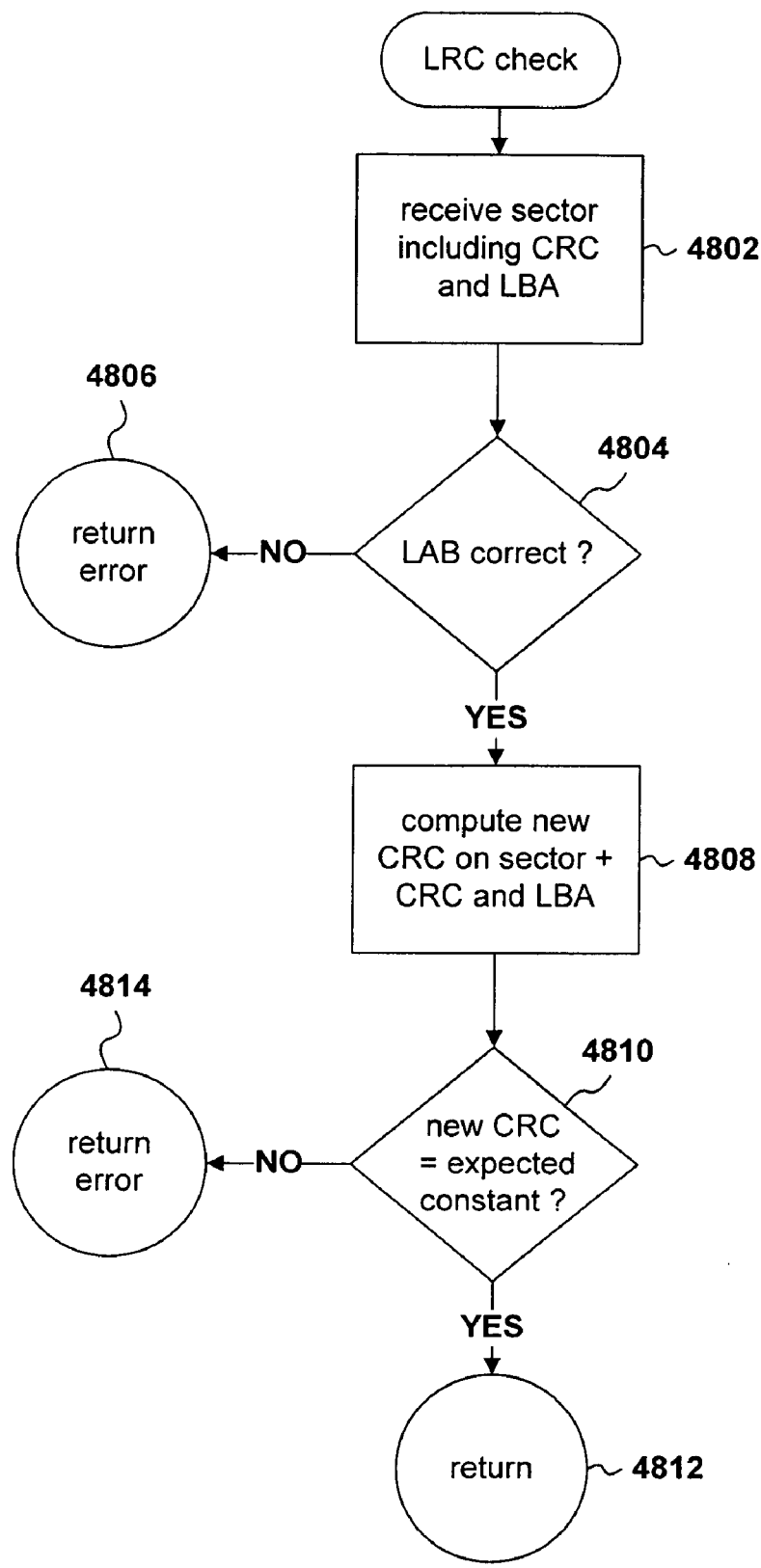
FIG. 48 is a control-flow diagram illustrating a complete LRC check technique employed by the storage-shelf router to check a retrieved virtual sector for errors.

FIG. 48 is a control-flow diagram illustrating the complete LRC check technique employed by the storage-shelf router to check a retrieved virtual sector for errors. In step 4802, the storage-shelf router receives the retrieved virtual sector, including the CRC and LBA fields. In step 4804, the storage-shelf router determines whether the LBA value in the retrieved virtual sector corresponds to the expected LBA value. If not, an error is returned in step 4806. Otherwise, in step 4808, the storage-shelf router computes the new CRC value based on the data, LBA, and CRC fields of the retrieved virtual sector, as discussed above with reference to FIG. 44. If the newly calculated CRC value equals the expected constant "1D0F" (hexadecimal) as determined in step 4810, then the storage-shelf router returns an indication of a successful check in step 4812. Otherwise, the storage-shelf router returns an error, in step 4814.

Figure 49:
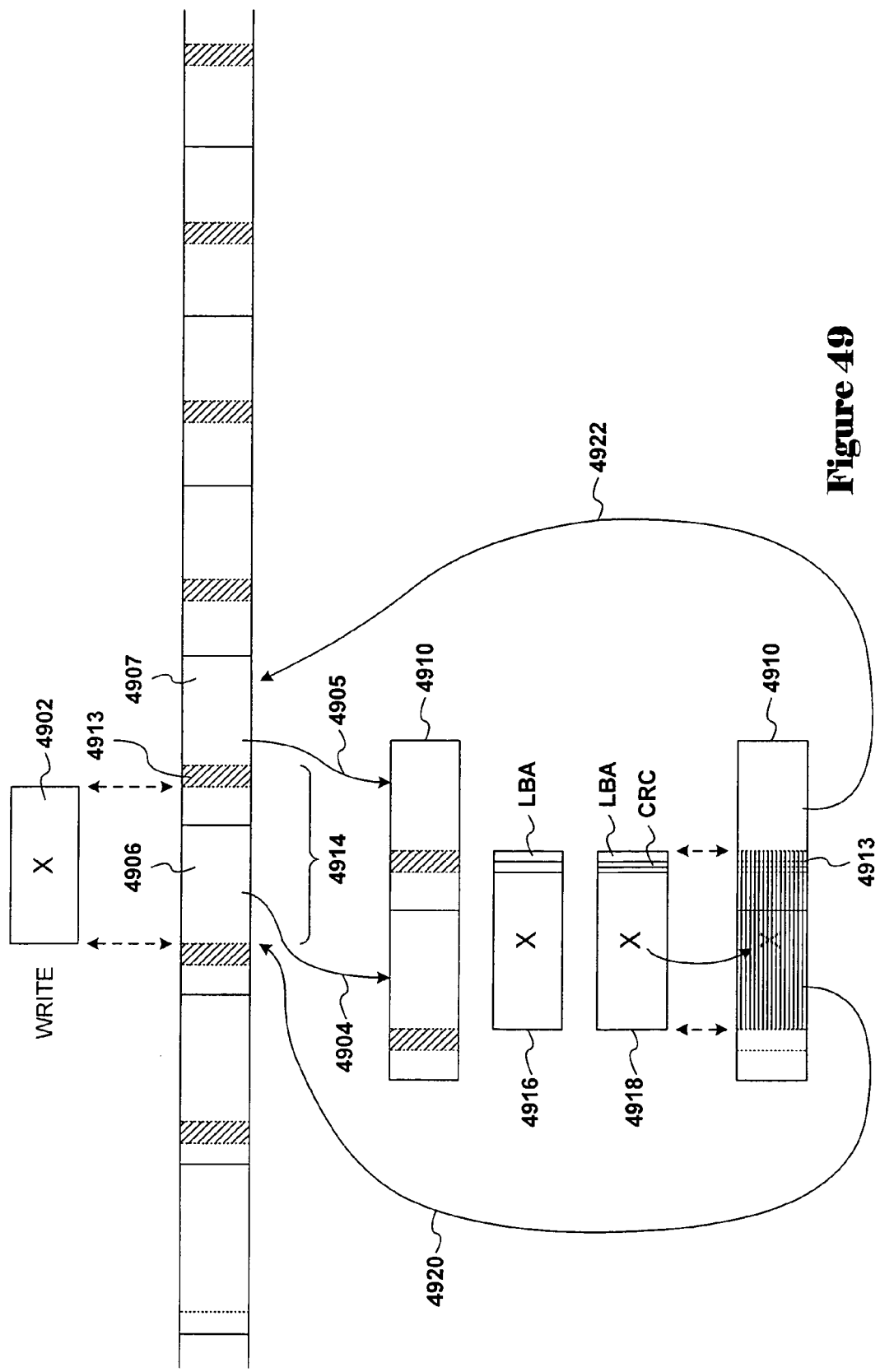
FIG. 49 illustrates a deferred LRC check.

The storage-shelf router may carry out either full LRC checks or deferred LRC checks during WRITE operations. FIG. 49 illustrates the deferred LRC check. As shown in FIG. 49, and as discussed earlier, when a single, second-level virtual 512-byte sector 4902 is written by the storage-shelf router to a disk drive, the storage-shelf router must first read 4904-4905 the two boundary sectors 4906-4907 associated with the second-level virtual sector 4902 into memory 4910. The boundary sectors 4906-4907 generally each includes an LRC field, 4912 and 4913. The second LRC field 4913 occurs within the first-level 520-byte virtual sector 4914 corresponding to the second-level virtual sector 4902. In deferred LRC mode, the storage-shelf router inserts the data and LBA value into a buffer 4916, carries out the CRC computation and inserts the computed CRC into the CRC field 4918, and then writes the resulting first-level virtual sector into the memory buffer 4910. The contents of the memory buffer then are returned to the disk drive via two WRITE operations 4920 and 4922. Note that the contents of the LRC field 4913 associated with the first-level virtual sector are assumed to be valid. However, the two WRITE operations also write data and an LRC field corresponding to neighboring first-level virtual sectors back to the disk drive. Rather than checking that this data and additional LRC field is valid, the storage-shelf router simply defers checking of neighboring first-level virtual sectors until the neighboring first-level virtual levels are subsequently read.

Figure 50:
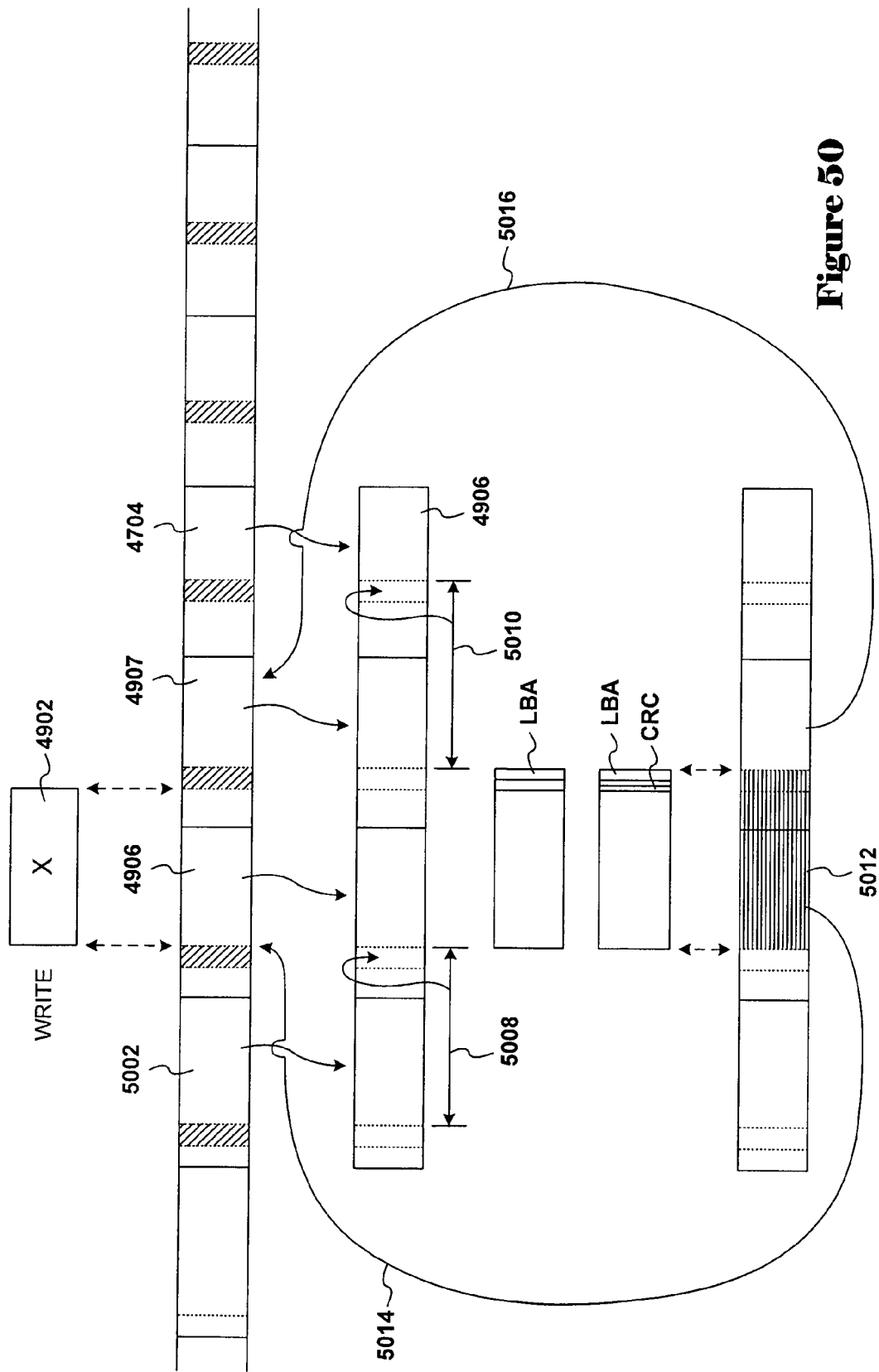
FIG. 50 illustrates a full LRC check of a write operation on a received second-level 512-byte virtual sector.

FIG. 50 illustrates a full LRC check of a WRITE operation on a received second-level 512-byte virtual sector. Comparison of FIG. 50 to FIG. 49 reveals that, in the full LRC check, the storage-shelf router reads not only the boundary sectors 4906 and 4907 that bracket the second-level virtual sector 4902, but also reads the next-neighbor sectors 5002 and 5004 of the boundary sectors 4906 and 4907 into a memory buffer 5006. This allows the storage-shelf router to check that the lower and upper neighboring first-level 520-byte virtual sectors 5008 and 5010 are error free, by using the LRC check method described with reference to FIG. 48, before proceeding to write the received second-level virtual sector 4902 into the memory buffer 5012 and then write the two boundary sectors back to the disk drive 5014 and 5016. The full LRC check therefore requires two additional writes and involves a correspondingly decreased write efficiency, as described by the following equations:

WRITE I/O(n virtual 520 sectors)→4 reads+2 writes+ (n−1)writes with a correspondingly decreased write efficiency of:

$$\text{WRITE I/O Efficiency} = \frac{n}{6 + (n-1)} \times 100$$

assuming that the virtual sectors are relatively close in size to actual disk sectors.

The storage-shelf router may employ various additional techniques to detect problems and correct problems transparent to external processing entities. For example, should the storage-shelf router fail to successfully read the lower-boundary sector 4906 in FIG. 50, the storage-shelf router may nonetheless write the portion of the lower boundary sector received in the second-level virtual sector 4912 to the lower boundary sector on the disk, and return a "recovered error" status to the disk-array controller. Subsequently, when the preceding virtual sector is accessed, the disk-array controller trigger data recover from a mirror copy of the sectors involved in order to retrieve that portion of the original lower-boundary sector that was not read during the previous write operation, and write the data to the disk drive, correcting the error. Thus, an LRC failure can be circumvented by the storage-shelf router.

Although the present invention has been described in terms of a particular embodiment, it is not intended that the invention be limited to this embodiment. Modifications within the spirit of the invention will be apparent to those skilled in the art. For example, as discussed above, the virtual disk formatting technique that represents various embodiments of the present invention can be used by the storage-shelf router to provide an almost limitless number of virtual disk format interfaces to external processing entities, and thus isolate internal disk formats from the external processing entities. Any size virtual sectors can be mapped to any size physical sectors by the method of the present invention. Not only does this allow the storage-shelf router to include additional error-detection information in each sector and to employ disk drives that use formatting conventions unanticipated by external processing entities, the virtual disk formatting technique may be used for a variety of other purposes. For example, virtual disk formatting may allow a storage-shelf router to encode virtual sector payloads into expanded, encoded payloads in order to provide extremely secure data storage. As another example, the storage-shelf router might use virtual disk formatting to store sufficient, redundant data within a disk drive to allow the storage-shelf router not only to detect, but to correct many types of data errors that occur within individual sectors and even errors that occur across sector boundaries. As with any hardware implementation, an almost limitless number of different hardware, firmware, and software components can be designed to implement many different embodiments and types of embodiments in virtual disk formatting. A vast number of optimizations are available to those ordinarily skilled in the art, depending on the design and capabilities of the storage-shelf router, internal disk drives, and other components of the storage shelf.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

The invention claimed is:

1. A virtual disk formatting system comprising:
a number of mass-storage devices having physical sectors of a first sector length; and
a routing component that provides a virtual disk interface to the mass-storage components by mapping access operations, received from external entities, directed to a virtual disk having virtual sectors of a second sector length to the number of mass-storage devices without introducing padding data into physical sectors or into virtual sectors to align the initial bytes of virtual sectors and physical sectors.

2. The virtual disk formatting system of claim 1 wherein the routing component is an integrated-circuit storage-shelf router.

3. The virtual disk formatting system of claim 2 wherein the storage-shelf router provides a fibre-channel-disk-based virtual disk formatting interface to external entities and maps fibre-channel-disk-based access operations to a number of ATA disk drives included in a storage shelf containing the storage-shelf router.

4. The virtual routing system of claim 1 wherein the routing component includes a processor and firmware/software programs that carry out virtual disk formatting.

5. The virtual disk formatting system of claim 1 wherein virtual sectors are mapped onto contiguous physical sectors, allowing the physical sector and byte address of the first byte of a virtual sector to be calculated, when the second sector length is greater than the first sector length, as:

$$fsl = \text{first sector length}$$
$$ssl = \text{second sector length}$$
$$\text{modulus} = (\text{smallest number evenly divisible by both } fsl \text{ and } ssl)/ssl$$
$$\text{difference} = ssl - fsl$$
$$\text{physical sector} = \text{virtual sector} + \left(\frac{\text{virtual sector}}{\text{modulus}}\right)$$
$$\text{physical byte address} = \text{remainder}\left(\frac{\text{virtual sector}}{\text{modulus}}\right) \times \text{difference}$$

and, when the second sector length is less than the first sector the physical sector and byte address of the first byte of a virtual sector is calculated, as:

$$fsl = \text{first sector length}$$
$$ssl = \text{second sector length}$$
$$\text{modulus} = (\text{smallest number evenly divisible by both } fsl \text{ and } ssl)/ssl$$
$$\text{difference} = fsl - ssl$$
$$\text{physical sector} = \text{virtual sector} + \left(\frac{\text{virtual sector}}{\text{modulus}}\right)$$
$$\text{physical byte address} = $$
$$\text{remainder}\left(fsl - \text{remainder}\left(\frac{\text{virtual sector}}{\text{modulus}}\right) \times \text{difference}\right)/fsl.$$

6. The virtual disk formatting system of claim 5 wherein, when the modulus and difference are both evenly divided by 2, the division and multiplication operations can be replaced with shift operations, and the remainder operation can be replaced by a bit-wise and operation.

7. A virtual disk formatting system comprising:
a mass-storage device having physical sectors that each contains a data payload of a first data length and additional information, including one or more of a sector number, error-detection, and error-correction information; and
a virtual disk interface to the mass-storage device, implemented in an integrated circuit, that maps access operations, received from external entities by the virtual disk interface, directed to a virtual disk having virtual sectors containing a data payload of a second data length by contiguously mapping an array of virtual-sector data payloads to a contiguous array of physical-sector data payloads without introducing padding data into physical-sector data payloads or into virtual-sector data payloads to align the initial bytes of virtual sectors and physical sectors.

8. The virtual disk formatting system of claim 1 wherein the virtual disk interface is incorporated within an integrated-circuit storage-shelf router.

9. The virtual disk formatting system of claim 8 wherein the storage-shelf router provides a fibre-channel-disk-based virtual disk formatting interface to external entities and maps fibre-channel-disk-based access operations to a number of ATA disk drives included in a storage shelf containing the storage-shelf router.

10. The virtual disk formatting system of claim 8 wherein storage-shelf router includes a processor and firmware/software programs that carry out virtual disk formatting.

11. The virtual disk formatting system of claim 7 wherein contiguous virtual sectors are mapped onto contiguous physical sectors, allowing the physical sector and byte address of the first byte of a virtual sector to be calculated, when the second sector length is greater than the first sector length, as:

$$fsl = \text{first sector length}$$
$$ssl = \text{second sector length}$$
$$\text{modulus} = (\text{smallest number evenly divisible by both } fsl \text{ and } ssl)/ssl$$
$$\text{difference} = ssl - fsl$$

-continued $$\text{physical sector} = \text{virtual sector} + \left(\frac{\text{virtual sector}}{\text{modulus}}\right)$$

$$\text{physical byte address} = \text{remainder}\left(\frac{\text{virtual sector}}{\text{modulus}}\right) \times \text{difference}$$

and, when the second sector length is less than the first sector the physical sector and byte address of the first byte of a virtual sector is calculated, as:

$$fsl = \text{first sector length}$$
$$ssl = \text{second sector length}$$
$$\text{modulus} = (\text{smallest number evenly divisible by both } fsl \text{ and } ssl)/ssl$$

-continued $$\text{difference} = fsl - ssl$$

$$\text{physical sector} = \text{virtual sector} + \left(\frac{\text{virtual sector}}{\text{modulus}}\right)$$

$$\text{physical byte address} =$$
$$\text{remainder}\left(fsl - \text{remainder}\left(\frac{\text{virtual sector}}{\text{modulus}}\right) \times \text{difference}\right)\bigg/ fsl.$$

12. The virtual disk formatting system of claim 11 wherein, when the modulus and difference are both evenly divided by 2, the division and multiplication operations can be replaced with shift operations, and the remainder operation can be replaced by a bit-wise and operation.

* * * * *